(12) United States Patent
Ghassabian

(10) Patent No.: US 9,158,388 B2
(45) Date of Patent: Oct. 13, 2015

(54) DATA ENTRY SYSTEM

(75) Inventor: Firooz Ghassabian, Great Neck, NY (US)

(73) Assignee: Keyless Systems Ltd., Jerusalem (IL)

( * ) Notice: Subject to any disclaimer, the term of this patent is extended or adjusted under 35 U.S.C. 154(b) by 1301 days.

(21) Appl. No.: 12/324,450

(22) Filed: Nov. 26, 2008

(65) Prior Publication Data

US 2009/0199092 A1 Aug. 6, 2009

Related U.S. Application Data

(63) Continuation of application No. 11/455,012, filed on Jun. 16, 2006, now abandoned.

(60) Provisional application No. 60/797,405, filed on May 2, 2006, provisional application No. 60/786,835, filed (Continued)

(51) Int. Cl.

| G06F 3/048 | (2013.01) |
|---|---|
| G06F 3/023 | (2006.01) |
| G06F 3/01 | (2006.01) |
| G06F 3/038 | (2013.01) |
| G06F 3/0488 | (2013.01) |

(52) U.S. Cl.
CPC ............ G06F 3/0237 (2013.01); G06F 3/014 (2013.01); G06F 3/0236 (2013.01); G06F 3/038 (2013.01); G06F 3/04883 (2013.01); G06F 3/04886 (2013.01); G06F 2203/0381 (2013.01)

(58) Field of Classification Search
USPC .......................... 715/773, 780, 816, 863, 864
See application file for complete search history.

(56) References Cited

U.S. PATENT DOCUMENTS

| 4,769,845 A | 9/1988 | Nakamura |
| 5,017,030 A | 5/1991 | Crews |
| 5,305,205 A | 4/1994 | Weber et al. |
| 5,311,175 A | 5/1994 | Waldman |

(Continued)

FOREIGN PATENT DOCUMENTS

| CN | 1015859 | 3/1992 |
| CN | 1131764 | 9/1996 |

(Continued)

OTHER PUBLICATIONS

Mona Singh of Ericsson, Inc.; Method for aiding speech recognition; Nov. 10, 2000.

(Continued)

*Primary Examiner* — Thanh Vu
(74) *Attorney, Agent, or Firm* — Dekel Patent Ltd.; David Klein

(57) ABSTRACT

A data entry system includes a plurality of keys each of which has two or more symbols associated with each key and a means for receiving a second specific input from a user. A third correction key is provided, where a user enters a desired input by pressing one or more of the plurality of keys corresponding to the symbols required for the desired input and further provides a second specific input also relating to at least a portion of the desired input, such that the system produces a response to the desired input by predicting the desired input based on the symbols pressed by the user and based on the second specific input. If the produced response is different than the desired input, the user may press the correction key to scroll through additional less frequent responses from the system also matching the symbols pressed and the second specific input.

4 Claims, 27 Drawing Sheets

Related U.S. Application Data on Mar. 28, 2006, provisional application No. 60/741,556, filed on Nov. 30, 2005, provisional application No. 60/737,813, filed on Nov. 17, 2005, provisional application No. 60/732,829, filed on Nov. 1, 2005, provisional application No. 60/727,158, filed on Oct. 14, 2005, provisional application No. 60/724,368, filed on Oct. 6, 2005, provisional application No. 60/718,949, filed on Sep. 20, 2005, provisional application No. 60/710,352, filed on Aug. 22, 2005, provisional application No. 60/704,531, filed on Aug. 1, 2005, provisional application No. 60/704,243, filed on Jul. 29, 2005, provisional application No. 60/697,394, filed on Jul. 6, 2005, provisional application No. 60/695,841, filed on Jun. 30, 2005, provisional application No. 60/695,840, filed on Jun. 29, 2005, provisional application No. 60/693,176, filed on Jun. 23, 2005, provisional application No. 60/691,107, filed on Jun. 16, 2005.

(56) References Cited

U.S. PATENT DOCUMENTS

| | | |
|---|---|---|
| 5,467,324 A | 11/1995 | Houlihan |
| 5,473,726 A | 12/1995 | Marshall |
| 5,659,611 A | 8/1997 | Saksa |
| 5,675,687 A | 10/1997 | Wood |
| 5,689,547 A | 11/1997 | Molne |
| 5,767,842 A | 6/1998 | Korth |
| 5,790,103 A | 8/1998 | Willner |
| 5,797,089 A | 8/1998 | Nguyen |
| 5,818,437 A | 10/1998 | Grover et al. |
| 5,867,149 A | 2/1999 | Jaeger |
| 5,901,222 A | 5/1999 | Macor |
| 5,936,556 A | 8/1999 | Sakita |
| 5,943,625 A | 8/1999 | Yeom et al. |
| 5,952,585 A | 9/1999 | Trantzas et al. |
| 5,953,541 A | 9/1999 | King et al. |
| 5,982,302 A | 11/1999 | Ure |
| 6,003,072 A | 12/1999 | Gerritsen et al. |
| 6,011,554 A | 1/2000 | King et al. |
| 6,029,068 A | 2/2000 | Takahashi et al. |
| 6,043,761 A | 3/2000 | Burrell |
| 6,073,033 A | 6/2000 | Campo |
| 6,128,514 A | 10/2000 | Griffith et al. |
| 6,144,358 A | 11/2000 | Narayanaswamy et al. |
| 6,216,017 B1 | 4/2001 | Lee et al. |
| 6,223,059 B1 | 4/2001 | Haestrup |
| 6,226,501 B1 | 5/2001 | Weadon et al. |
| 6,246,570 B1 | 6/2001 | Kim |
| 6,259,771 B1 | 7/2001 | Kredo et al. |
| 6,278,384 B1 | 8/2001 | Ide |
| 6,286,064 B1 | 9/2001 | King et al. |
| 6,295,052 B1 | 9/2001 | Kato et al. |
| 6,326,952 B1 | 12/2001 | Amro et al. |
| 6,337,914 B1 | 1/2002 | Phillipps |
| 6,346,894 B1 | 2/2002 | Connolly et al. |
| 6,356,258 B1 | 3/2002 | Kato et al. |
| 6,356,866 B1 | 3/2002 | Pratley et al. |
| 6,359,572 B1 | 3/2002 | Vale |
| 6,385,582 B1 | 5/2002 | Iwata |
| 6,392,640 B1 | 5/2002 | Will |
| 6,445,381 B1 | 9/2002 | Chou |
| 6,542,090 B1 | 4/2003 | Tadano et al. |
| 6,560,320 B1 | 5/2003 | Paleiov et al. |
| 6,587,818 B2 | 7/2003 | Kanevsky et al. |
| 6,734,881 B1 | 5/2004 | Will |
| 6,868,140 B2 | 3/2005 | Myers et al. |
| 6,885,317 B1 | 4/2005 | Gutowitz |
| 6,894,679 B2 | 5/2005 | Suzuki |
| 6,925,154 B2 | 8/2005 | Gao et al. |
| 6,927,908 B2 | 8/2005 | Stark |
| 7,020,270 B1 | 3/2006 | Ghassabian |
| 7,027,990 B2 | 4/2006 | Sussman |
| 7,055,219 B2 | 6/2006 | Shiba |
| 7,143,043 B1 | 11/2006 | Vandermeijden |
| 7,145,554 B2 | 12/2006 | Bachmann |
| 7,170,496 B2 | 1/2007 | Middleton |
| 7,174,195 B2 | 2/2007 | Nagamine |
| 7,181,240 B2 | 2/2007 | Kawamoto |
| 7,218,249 B2 | 5/2007 | Chadha |
| 7,260,529 B1 | 8/2007 | Lengen |
| 7,382,871 B1 | 6/2008 | Ure |
| 2001/0018351 A1 | 8/2001 | Hino et al. |
| 2001/0030668 A1 | 10/2001 | Erten et al. |
| 2001/0048413 A1 | 12/2001 | Tabata |
| 2002/0065662 A1 | 5/2002 | Sherman |
| 2002/0180698 A1 | 12/2002 | Kaelbling |
| 2003/0030573 A1 | 2/2003 | Ure |
| 2003/0048262 A1 | 3/2003 | Wu et al. |
| 2003/0122784 A1 | 7/2003 | Shkolnikov |
| 2003/0193478 A1 | 10/2003 | Ng et al. |
| 2003/0204403 A1 | 10/2003 | Browning |
| 2003/0216915 A1 | 11/2003 | Xie |
| 2004/0049388 A1 | 3/2004 | Roth et al. |
| 2004/0056844 A1 | 3/2004 | Gutowitz et al. |
| 2004/0204011 A1 | 10/2004 | Lyustin et al. |
| 2005/0084079 A1 | 4/2005 | Lang |
| 2005/0131687 A1* | 6/2005 | Sorrentino ............... 704/235 |
| 2005/0181777 A1 | 8/2005 | Kim |
| 2006/0073818 A1 | 4/2006 | Scott |
| 2006/0172764 A1 | 8/2006 | Makino |
| 2006/0190256 A1* | 8/2006 | Stephanick et al. ......... 704/252 |
| 2007/0200827 A1 | 8/2007 | Samal |
| 2008/0045247 A1 | 2/2008 | Wilson |
| 2008/0109432 A1 | 5/2008 | Ostergaard et al. |

FOREIGN PATENT DOCUMENTS

| | | |
|---|---|---|
| CN | 1153353 | 2/1997 |
| EP | 0810515 | 3/1997 |
| EP | 0840287 | 5/1998 |
| EP | 0898223 | 2/1999 |
| EP | 0949578 | 10/1999 |
| EP | 1109384 | 6/2001 |
| EP | 1164774 | 12/2001 |
| EP | 1271900 | 1/2003 |
| EP | 1383034 | 1/2004 |
| EP | 1699065 | 9/2006 |
| FR | 2840488 | 12/2003 |
| GB | 1320895 | 6/1973 |
| GB | 2360622 | 9/2001 |
| GB | 2378554 | 2/2003 |
| GB | 2406476 | 3/2005 |
| JP | 3007007 U | 1/1991 |
| JP | 3156627 | 4/1991 |
| JP | 4330830 | 11/1992 |
| JP | 7160387 | 6/1995 |
| JP | 8275239 | 10/1996 |
| JP | 10319879 | 4/1998 |
| JP | 11134096 | 5/1999 |
| JP | 11095792 | 9/1999 |
| JP | 11184609 | 9/1999 |
| JP | 11039078 | 12/1999 |
| JP | 2000068882 | 3/2000 |
| JP | 2000069149 | 3/2000 |
| JP | 2000152202 | 5/2000 |
| JP | 2000242402 | 8/2000 |
| JP | 2000349865 | 12/2000 |
| JP | 2001016635 | 1/2001 |
| JP | 2001109740 | 4/2001 |
| WO | WO 97/04580 | 6/1997 |
| WO | WO 97/16935 | 9/1997 |
| WO | WO 98/35481 | 8/1998 |
| WO | WO 98/58346 | 12/1998 |
| WO | WO 99/15952 | 4/1999 |
| WO | WO 99/25152 | 5/1999 |
| WO | WO 01/31788 | 5/2001 |
| WO | WO 01/82043 | 11/2001 |
| WO | WO 02/08880 | 1/2002 |
| WO | WO 02/061558 | 8/2002 |

(56) References Cited

FOREIGN PATENT DOCUMENTS

| | | |
|---|---|---|
| WO | WO 03/007288 | 1/2003 |
| WO | WO 2004/095414 | 4/2004 |
| WO | WO 2005/122401 | 12/2005 |

OTHER PUBLICATIONS

European Search Report from corresponding European Application No. 08806962.0 dated Nov. 17, 2010.

* cited by examiner

| 1 | ABC | DEF |
|---|---|---|
| GHI | JKL | MNO |
| PQRS | TUV | WXYZ |
| * | 0 | # |

Fig. 1a

| EFJZ | AVGS |
|---|---|
| UNKBH | ITXR |
| YCPQL | OMDW |

Fig. 1b

| TAHRJB | NIDQCP |
|---|---|
| MFEZWXK | SYUGVLO |

Fig. 1c

```
                              12609
                   12605      ┌─────────┬─────────┐    12606
                     \        │ TAHRJB  │ NIDQCP  │   /
                              ├─────────┼─────────┤
                    12607     │ MFEZWXK │ SYUGVLO │
                      \       └─────────┴─────────┘    12608
12603   12601  12602                                  /
   \      |      \
       24223  click      641
       24223  quick     6069
      ┌24224  coins     1412 ┐
      │24224  doing    28815 │
      │24224  dying     2844 │
      │24224  pupil     2322 ┘      12604
       24231  climb     2242
       24231  quiet     6428
       24233  cliff     1579
      ┌24234  codes     1272 ┐
      │24234  docks      798 │
      │24234  ducks      726 ┘
      ┌24243  clive     1040 ┐
      │24243  cycle     3256 │
      │24243  noise     4656 ┘
       24244  noisy     1023
       24311  clear    25641
       24312  clean     6537
       24313  clerk     1953
       24314  poets      942
       24322  comic     1195
       24324  downs      643
       24331  power    32164
       24332  dozen     2738
       24332  queen     8058
       24334  comes    16005              12600
       24334  poems     1607
```

Fig. 2

| EFKMWXZ | ABTHQR |
|---------|--------|
| YOUGLVS | IDJNPC |

Fig. 6a

| EFKMWXZ | ABTYQR |
|---------|--------|
| HOUGLVS | IDJNPC |

| 1 | This is an i |
| --- | --- |
| | in |
| 2 | This is an in |
| | into |
| 3 | This is an cut |
| | into |
| 4 | This is an into |
| | information |
| 5 | This is an informati |
| | information |
| 6 | This is an informativ |
| | informative |
| 7 | This is an informative |
| | informatively |

| 1 | This is an i |
| --- | --- |
| | in |
| 2 | This is an in |
| | into |
| 3 | This is an udf   14331 |
| | information |
| 4 | This is an informati |
| | information |
| 5 | This is an informativ |
| | informative |
| 6 | This is an informative |
| | informatively |

Fig. 19d

DATA ENTRY SYSTEM

RELATED APPLICATIONS

This application is related to prior PCT Patent Application Nos. PCT/US00/29647, filed on Oct. 27, 2000; PCT/US02/22385, filed on Jul. 12, 2001; PCT/US04/12082, filed on Apr. 19, 2004; and PCT/US05/19582, filed on Jun. 3, 2005 the entirety of which are incorporated herein by reference.

Further, the present invention is related to and claims the benefit of priority from U.S. Provisional Patent Application No. 60/691,107, filed on Jun. 16, 2005; in U.S. Provisional Patent Application No. 60/693,176, filed on Jun. 23, 2005, in U.S. Provisional Patent Application No. 60/695,840, filed on Jun. 29, 2005; in U.S. Provisional Patent Application No. 60/695,841, filed on Jun. 30, 2005; in U.S. Provisional Patent Application No. 60/697,394, filed on Jul. 6, 2005; in U.S. Provisional Patent Application No. 60/704,243, filed on Jul. 29, 2005; in U.S. Provisional Patent Application No. 60/704,531, filed on Aug. 1, 2005; in U.S. Provisional Patent Application No. 60/710,352, filed on Aug. 22, 2005; in U.S. Provisional Patent Application No. 60/718,949, filed on Sep. 20, 2005; in the U.S. Provisional Patent Application No. 60/724,368, filed on Oct. 6, 2005; in the U.S. Provisional Patent Application No. 60/727,158, filed on Oct. 14, 2005; in the U.S. Provisional Patent Application No. 60/732,829, filed on Nov. 1, 2005; in the U.S. Provisional Patent Application No. 60/737,813, filed on Nov. 17, 2005; in the U.S. Provisional Patent Application No. 60/741,556, filed on Nov. 30, 2005; in the U.S. Provisional Patent Application No. 60/786,835, filed on Mar. 28, 2006; and in U.S. Provisional Patent Application No. 60/797,405 filed on May 2, 2005, the entirety of which are incorporated by reference herein.

FIELD OF THE INVENTION

The present invention is related to data entry. More particularly, the present invention is directed to a data entry system with features for entering data using an improved method of prediction and key press/glide voice interaction.

BACKGROUND

Typical systems and methods for electronically entering characters include the use of standard keyboards such as a QWERTY keyboard and the like. However, as modern electronic devices have become smaller, new methods have been developed in order to enter desired characters.

On such method is to use a multi-press system on a standard telephonic numeric keypad, whereby multiple alphanumeric characters are assigned to the same key. One drawback with such a system is that it requires multiple pressing of single keys in order to enter certain characters, thereby increasing the overall number of key presses, slowing the character entry process.

A second method to accommodate the entering of characters on the ever smaller devices has been to simply miniaturize the standard QWERTY keypad onto the devices. However, such miniaturized keypads are often clumsy and do not afford sufficient space between the keys, causing multiple key presses when only a single press is desired.

Yet another attempt to accommodate the entering of characters on smaller electronic devices, is the use of voice recognition software. Such methods have been in use for some time, but suffer from a number of drawbacks. Most notably, voice recognition software suffers from the inability to distinguish homonyms, and often requires significant advance input for the system to recognize a particular speaker, their mannerisms and speech habits. Also, voice recognition software, in attempting to alleviate these problems, has grown large and requires a good deal of processing, not particularly suitable for the limited energy and processing capabilities of smaller electronic devices, such a mobile phones and text pagers.

OBJECTS AND SUMMARY

As such it is an object of the present invention to provide an improvement over the previously disclosed data entry systems by providing additional enhanced features for predicting and disambiguation using various input means including improved keypads, prediction and voice technologies, among other devices. Furthermore, it is an object of the preset invention to provide an improved data entry prediction and key press/glide with voice methods. Even further, it is object of the present invention to improve upon the correction capabilities in such data entry systems.

To this end, the present invention, among other embodiments is drawn to a data entry system having a plurality of input receiving means for at least entering arbitrary characters, where each receiving means is assigned more than one character, such that a user uses the input receiving means to enter a desired input.

A second input receiving means for receiving a second input, where the second input is a precise character or characters from the desired input; wherein the system provides a predictive output based on input from at least said plurality of input receiving means. If the predictive output is different from the desired input and the first letter of the desired input is different than the first letter of the predictive output, the user may enter a predefined correction signal to provide a first character of the desired input, such that the system may provide a second predictive output is based on the previously provided input from the user and the correction signal.

BRIEF DESCRIPTION OF THE DRAWINGS

In the drawings, in which like reference characters denote similar elements throughout the several views:

FIGS. 1a through 1c show exemplary keypads having different numbers of keys that may be used with the data entry system, in accordance with one embodiment of the invention;

FIG. 2 illustrates four keys of an exemplary keypad and a corresponding database of words used with the data entry system, in accordance with one embodiment of the invention;

FIGS. 6a to 6b show exemplary assignment of letters to four keys of a keypad that may be used with the data entry systems, in accordance with one embodiment of the invention;

FIGS. 19c through 19d show the outputs presented to the user, in accordance with embodiment of the invention;

DETAILED DESCRIPTION

Figure 3:
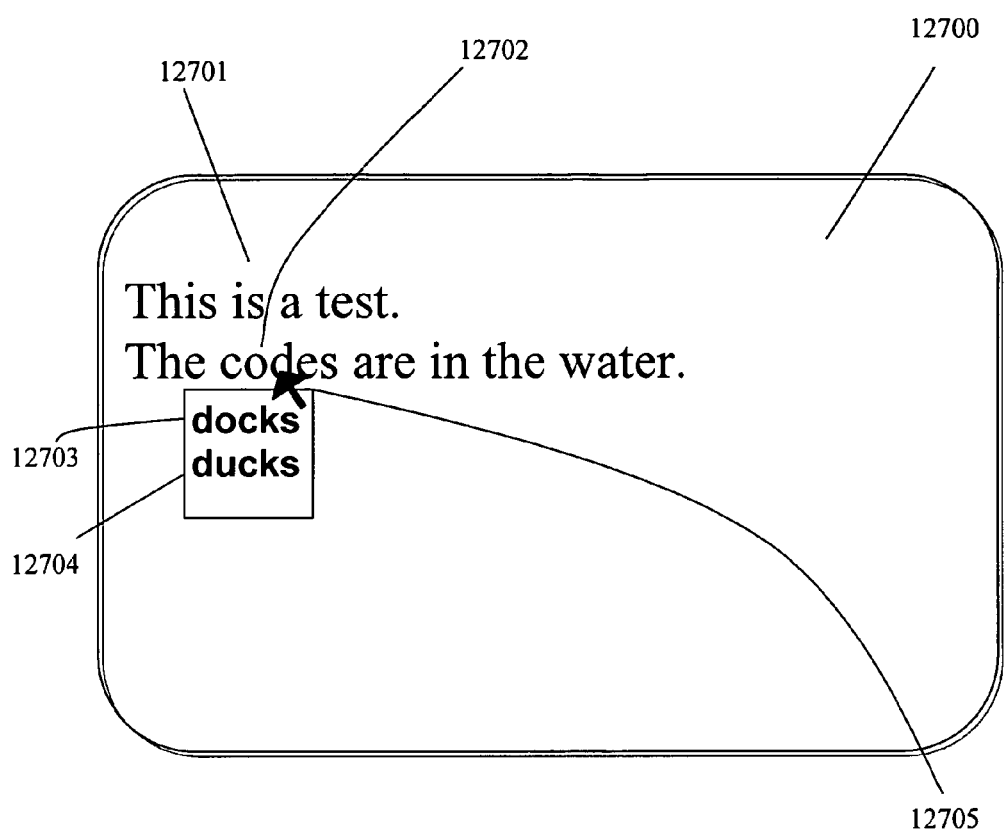
FIG. 3 shows a number of words proposed on the screen of an electronic device, in accordance with one embodiment of the invention.

A data entry system according to the present invention discloses a system for entering at least arbitrary characters/text, using a (e.g. keypad having) reduced number of (e.g. hard, soft, virtually duplicated, etc.) keys. The data entry system may use a number of symbols comprising at least the letters of the alphabet of at least one language and wherein the symbols may be distributively assigned to the keys such that at least two of the letters may be assigned to at least one key.

In this systems an (e.g. predefined) interaction such as a pressing action on a key may, ambiguously, correspond to any of the symbols/letters assigned to the key (e.g. in this patent application, the key may be called "ambiguous" and the interaction may be called "ambiguous" interaction). As described before, for example, in order to enter one of the symbols (e.g. such as a letter) assigned to a key, the user may provide a predefined interaction with the key such as a pressing action on the key and provide a speech information corresponding to the symbol (e.g. such as speaking (e.g. the appellation of) the letter) for selecting the symbol (e.g. letter) among the symbols (e.g. letters) that are assigned to (the interaction with) the key, and wherein the speech information may be detected and analyzed based on at least one of, the user's voice and/or the user's lips movements.

It must be noted that the number of symbols may includes substantially all of the elementary symbols, such as alphanumeric characters, punctuation marks, and commands for either the input or editing of a text or the manipulation of a computer. For example, in order to enter a punctuation mark character, the user may press on a corresponding key and speak the character. Other symbols such as macros, portion-of-a-words, etc, may also be distributively assigned to the reduced number of keys.

The absence of speech may also be considered as the speech information, and wherein at least one of the symbols assigned to a key may be entered by providing the predefined interaction with the key in the absence of a speech, the absence of speech being detected by the system. For example, in order to enter a predefined punctuation mark character assigned to a key, the user may use a predefined pressing action of the key corresponding to the character without speaking.

According to one method, the reduced number of keys may duplicate a telephone-type keypad. The letter assignment may resemble to the letter assignment of the telephone-type keypad.

According to another method, letters of the alphabet may be assigned to four keys of the reduced number of keys.

According to one method symbols such as letters having ambiguously resembling predefined speech and that are hard to distinguish from each other through their corresponding speech may separately from each other being assigned to different keys.

Also other related input technologies such the entry of at-least-a-portion-of-a-word (e.g. portion-by-portion data entry system using press/glide action on one or more corresponding keys combined with the corresponding speech information (e.g. the absence of speech may also be predefined to be considered as a speech information)) have been described in detail. Other data entry methods herein, such as full (e.g. hard, soft/on-screen) PC keyboards and/or handwriting recognition systems, may be combined/used with the (e.g. press and speak) data entry systems of the invention to input a text/data.

The data entry systems (e.g. providing precise characters) may be combined with the principles of a word predictive system (e.g. based on pressing actions on ambiguous keys corresponding to the characters/letters of a word and using a database of, words and corresponding key presses information of each word. The principals of word predictive systems is known be people skilled in the art) to provide a highly accurate data/text entry system using (e.g. very) few keys (e.g. wherein obviously at least some of the keys are ambiguous keys), (e.g. and minimizing user's interactions such minimizing user's speech or user's interaction for selecting a word among candidate words). By using the press-and-speak data entry system of the invention the user may provide at least one precise character of a word and press the (ambiguous) keys corresponding to the remaining characters of the word to enter the word. By considering the at least one precise character of the word, and considering the key presses corresponding to the remaining characters of the word, the system more accurately may predict the corresponding word.

The press/glide and speech information (e.g. with/without speaking) data entry systems of the invention may be combined with other data entry systems such as a word predictive system based on key-presses provided on a keypad (having ambiguous keys). The principles of the word predictive systems based on key presses (e.g. only), are known by people skilled in the art. A word of a language may be entered by using the press/glide and speak data entry systems of the invention for entering precisely at least one of the (e.g. preferably, the beginning) letters (e.g. or characters (a word may include characters other than letters, too)) of the word and providing key presses only (without speaking) corresponding to other letters (e.g. or characters) of the word. For example, for entering the word "ball", by using a telephone keypad, a user may enter a beginning letter (e.g. "b") of the word by pressing a key corresponding to the letter and providing a speech corresponding to the letter, and (e.g. then) press the keys corresponding to other letters (e.g. in this example, chain of characters "all") of the word without speaking. In this example, providing a sequence of key presses only (e.g. without speaking) for (e.g. corresponding to) all of the letters (including the letter "b") of the word "ball" may also correspond to the word "call". But because in the above example, the beginning letter "b" is precisely entered, the system does not consider the word "call". According to another example, for entering the word "home" by using the same keypad, the user may first press the keys corresponding to the beginning letters "ho" without speaking. He then may press the key corresponding to the next letter "m" and speak the letter (e.g. precisely entering the letter). Then the user may press the key corresponding to the last letter "e" without speaking. The sequence of key presses may also correspond to the word "gone", but because the system has precisely recognized that the third letter of the desired word is the letter "m", then the word "home" will be selected/entered.

By (e.g. considering a first type of information consisting of) providing precisely at least a (e.g. beginning) letter of a word and (e.g. combined with considering at least a second type of information consisting of) providing the remaining key presses (e.g. key presses corresponding the remaining characters of the word), in most cases the system may find the desired corresponding word within its dictionary of words that match the combined information. In this example, by precisely entering the letter "b", the system selects the word "ball" without the need of further user's interaction (e.g. such as pressing on a "Select" key to scroll over different choices).

It must be noted that according to one method, the user may provide the key presses corresponding to the letters of a word and speak any of the letters during the key presses even if the user's speech is not synchronized (e.g. is not provided simultaneously) with the corresponding key press(es).

According to one embodiment of the invention, a user may provide the key presses corresponding to the letters of a word and speak the word.

The word predictive systems based on key press information use at least a dictionary of words and a corresponding key presses database.

According to one embodiment of the invention, during the entry of a text, the user may enter a word (e.g. a word existing in the dictionary, an out-of-dictionary word, a chain of characters that does not exist in the dictionary of words, etc.) by providing the key presses corresponding to the letters/characters of the word and providing the speech information corresponding to the (e.g. letters of) the word. On the other hand, if the user desires, he may enter a word existing in the dictionary by entering (e.g. providing) the corresponding key presses (e.g. providing key presses only, corresponding to the letters of a word may correspond to a large number of a words (e.g. choices) within the database of the words of the system). For better accuracy and minimizing the number of the choices for example, while pressing the beginning (e.g. and/or middle, and/or last) key(s) (e.g. the key(s) corresponding to the beginning and/or middle, and/or last character(s)) of the word, the user may speak the beginning (e.g. and/or middle, and/or last) letter(s) of the word (e.g. as mentioned before, providing the key press and the speech corresponding to at least one of the letters of a word, may enter, precisely, the at least one letter. Therefore, by considering the at least one precise letter and the key presses corresponding to the remaining characters of the word the number of the choices (e.g. candidate words) may dramatically be reduced. Throughout the application, such systems may be referred to as a "combined data entry system" or rather simply data entry system, such terms being used interchangeably in the context of the present invention unless specifically recited otherwise.

The basic premise of such combined data entry systems have been described previously such as in the references incorporated herein, filed by this inventor, the embodiments of the present invention constitute systems and methods for enhancing such combined data entry systems.

The press-and-speak data entry systems of the invention permitting the entry of text by combining the at-least-a-portion-of a word data entry methods (e.g. mentioned as portion-by-portion data entry system of the invention) have been described in detail in the references incorporated herein, filed by this inventor). According to one embodiment of the word predictive data entry systems of the invention, instead of entering a single character, a user may enter a-portion-of-a-word by using a press/glide and speech data entry system of the invention for entering precisely at least a (e.g. beginning) portion of the word and provide key presses only (e.g. without speaking) corresponding to other letters of the word. For example, in order to enter the word "predefined", the user may enter the portion "pre" by a pressing/gliding action on corresponding key(s) of the keypad and speak the portion, and then press on the keys corresponding to the remaining letters "defined" of the word, without speaking. Obviously, during the key pressing actions corresponding to the remaining characters of the word, if desired the user may provide the speech corresponding to at least some of the characters (e.g. speaking the letters) corresponding the corresponding key presses to precisely enter the at least some of the characters.

As mentioned before, by using the (e.g. the combined) system, the user may enter a portion of a text based on key presses only (e.g. without speaking). For example, the user may know in advance, that the word that he is going to enter may be recognized by the combined system based on its key presses only. In this case the user may not provide any speech during the entry of the word. For example, by using a telephone keypad, the word "array" may be recognized based on the key presses corresponding to its letters only (without the need of speaking any of the letters).

It is understood that the above-mentioned system may be used with a predefined keypad such as a telephone-type keypad, or other keypads such as the keypads described in the references incorporated herein, filed by this inventor. The keypad may have any predefined number of keys. FIGS. 1a to 1c, show three types of keypads having respectively, at least, 12, 6, and 4 keys, as shown and described in previous patent applications. FIG. 1a shows a telephone-type keypad. FIG. 1b shows a keypad having at least six keys wherein six of the keys represent at least the letters of the alphabet of a language. On one hand, the letters are preferably arranged on/assigned to the keys such that letters having ambiguously resembling speech relating to each other are/preferably assigned to different keys (e.g. described in detail previously). On other hand, the letters are arranged such that the key press (e.g. values) corresponding to the words of a (e.g. English) dictionary of words database of the system provides (e.g. corresponds to) minimized (e.g. reducing confusing) groups of words having the same (e.g. sequence of) key presses (e.g. value). FIG. 1c shows a keypad having at least four keys wherein four of the keys represent at least the letters of the alphabet of a language. On one hand, the letters are preferably arranged on/assigned to the keys such that letters having ambiguously resembling speech relating to each other are/ preferably assigned to different keys (e.g. described in detail previously). On other hand, the letters are/may-be arranged such that the key press (e.g. values) corresponding to the words of a (e.g. English) dictionary of words database of the system provides (e.g. corresponds to) minimized (e.g. reducing confusing) groups of words having the same (e.g. sequence of) key presses (e.g. value).

It is understood that using more keys to assign (e.g. represent) smaller (e.g. fewer) number of letters of a language to each of the keys, will minimize the number of selected word candidates corresponding to the key presses (e.g. and speech, if provided) information provided by a user for the entry of a word.

According to one embodiment of the invention, after entering the key presses corresponding to a word and providing speech corresponding to at least one (e.g. beginning) character of the word, an end-of-a-word signal may be provided. The signal may be pressing the "Space" key, so that also to enter a space character at the end of the word. According to another method, another end-of-a-word signal may be provided such that to not include a space character at the end of the word. For example, entering a (e.g. predefined) PC keyboard command or function or a (e.g. predefined) punctuation mark character, after the word may be considered as an end-of-a-word signal.

According to another method, a user may enter a first letter/portion of a word by using the press/glide and speak data entry systems of the invention and provide the key presses corresponding to the remaining characters of the word without speaking, at the end of the key presses (without providing an end-of-a-word signal), the user may proceed to the entry of the next word by entering a first letter/portion of the second word by using the press/glide and speak data entry systems of the invention, the system may be predefined to understand that the second speech corresponds to at least the beginning characters of the next word, and therefore (e.g. key presses starting from) the first key press corresponding to the speech may belong to the next word. This may be considered as an end-of-a-word signal for the first word. Then, according to one predefined method, the system may enter a space character between the words (e.g. automatic spacing procedure). According to another predefined method, the system does not enter a space character between the words (e.g. to attach the words to each other).

According to another method a at least a predefined laps of time of pause between the entry of two words may be considered as an end-of-a-word signal for the first word of the words.

As mentioned above, by using the word predictive system of the invention for entering a word, after a user provides the key presses information (e.g. and eventually additional information for the entry of precise letter(s) such as, the speech information corresponding to at least one of the letters of the word), if the user's information, there may be at least one of at least the three types of feedbacks from the system:

1—the system may relate only one word to the user's information. The word may be inputted as final result.

2—the system may relate a selection of at least two words to the user's provided information. The system may be predefined to present (e.g. highlight) to the user the word that has the highest priority relating to other words within the selection. If the word is the one that user intends to enter, then according to one method, the user may proceed to the entry of the next portion (e.g. word) of the text and the system automatically enters the word. If the inputted word is not the one that user desires to enter, then according to one method, the user may use a selection/correction means such as a selection/correction key by for example, pressing (e.g. and holding) the key and speaking at least some of the (beginning) letters of the desired word such that the system recognizes the word among the words of the selection. It is understood that the user may not again enter the key presses corresponding to the word while speaking the at least some of the (beginning) letters of the desired word. For the correcting method, the system may use the original key presses information and the speech information for the correction procedure. At the end of providing the correction speech information, the user may release the correction key. Pressing (e.g. and holding) the key may inform the system of the beginning (e.g. and ending) of the correcting speech procedure. It is understood that to avoid an unnecessary longer correction speech, the system may present the whole words of the selection to the user so that the user stops speaking before speaking the all of the letters of the selection, if not necessary. It is understood that other means such as a double pressing action, a gliding action, etc, may be used instead of the press (e.g. and-holding) action. According to another method, instead of using a correction/selection key, the user may point with a pointing device such as a stylus a by using a mouse pointer, etc., on the word, and provide the speech information. At the end of the correcting procedure, the user may end the pointing procedure. pointing (e.g. and holding) the pointing means in the pointing situation may inform the system of the beginning (e.g. and ending) of the correcting speech procedure. Instead of speaking the letter(s) of the desired word among the candidate words, the user may speak the word.

According to another method of selection, if the system relates/selects a selection of at least two words to the user's information and (e.g. is predefined to be) presented (e.g. highlighted) word to the user is not the one that user intends to enter, then the user may use a means such as a (e.g. multi-directional) key to navigate within the selected words to select his desired word. Demonstrating and selecting methods using a navigating/switching key for selecting a word among a number of selected word is know by people skilled in the art (e.g. pop-up lists, navigating up and down in the pop-up menu, etc.).

3—The system may not match any word to the user's information provided for the entry of a desired word (e.g. an out-of-dictionary-word), then, according to one method, the user may use the correction means, by for example, pressing (e.g. and-holding) the correction key, and speech the characters (e.g. letters) of the word without providing the corresponding key presses again. The system may use the original key presses information and the speech information during the correction procedure for entering the word. It is understood that if the user desires, the word may (e.g. automatically, or manually) be added to the dictionary.

Priorities (e.g. based on the frequency of use) given/assigned to the words of a dictionary may be an important issue for better acceptance of the combined data entry systems of the invention by the user. The priorities may be assigned such that to minimize the user's intervention for selecting a word among of a group of words selected by the system relating to key presses (e.g. and speech) information provided by the user. As an example, FIG. 2 shows a page of a dictionary of words database 12600. Column 12601 shows some of the words of the database. Column 12602 shows the frequency of use values of the words relating to each other. The frequency of use values may be predefined to be considered as the priority values assigned to the words. Column 12603 shows the key press values assigned to the words based on the key values (e.g. 1, 2, 3, 4) assigned respectively to the keys 12605, 12606, 12607, 12608, of the keypad 12609.

According to one method, for example, in order to enter the word "doing", the user may press the keys 12606, 12608, 12606, 12606, 12608, (e.g. key press value 24224) without speaking. In this example, a group of four words 12604 corresponding to the key presses may be selected by the system. The system may automatically enter the word (e.g. "doing") having the highest priority, unless for example:

If the user intended to enter another word such as the word "coins" according to one method, the user may use a correction/selection means such as the ones described earlier. For example, the user may press and hold a selection/correction key and speak the letter "c". The system may understand that the user intends to enter a word of the selection that begins with the letter "c". The word is the word "coins". According to another method, the user may navigate within a pop-up list provided by the system and comprising the four words to select the word "coins". Still according to another method, the system may first show the word "doing" having the highest priority. The user may press a predefined correction/selection key. The system may show the word "dying" having the second highest priority among the four words. The user may again press the predefined correction/selection key. The system may show the word "pupil" having the third highest priority among the four words. And finally, the user may again press the predefined correction/selection key. The system may show the word "coins" having the fourth highest priority among the four words. The user may confirm the word by for example, proceeding to the entry of the next word.

If the user intended to enter the word "dying", the user may use a correction/selection means such as the ones described earlier. For example, the user may press-and-hold selection/correction key and speak at least the letters "dy" (because two words, "doing" and "dying" start with the same letter "d", speaking more than one letter may be necessary). The system may understand that the user intends to enter a word of the selection starting with the letter "dy". The word is the word "coins".

According to another method, for example, in order to enter the word "coins", the user may press the keys 12606, 12608, 12606, 12606, 12608, (e.g. key press value 24224) and speak at least the letter "c". Only one word (e.g. "coins") within the database may correspond to the key presses and speech. The system may automatically enter the word (e.g. "coins").

According to one method, for example, in order to enter the word "clive", the user may press the keys 12606, 12608, 12606, 12608, 12607, (e.g. key press value 24243) and speak the letter "c". Two words (e.g. "cycle", and "clive") within the database may correspond to the key presses and speech. The system may automatically enter the word (e.g. "cycle") having the highest priority among the two words. The user may use a switching method as mentioned to scroll into the next word. The system, the, shows the second word corresponding to the key press and speech information which is the word "clive" (e.g. although the word "noise" has the highest priority corresponding to the key presses, the word does not start with the letter "c" as was pronounced by the user. Therefore, the system ignores it.).

Below is an exemplary resumes one of the switching/navigating selection embodiments:

Providing key presses of a word without speaking selects all of the corresponding words:
  highest priority word regardless of the beginning letter(s)
  next highest priority word regardless of the beginning letter(s)
  so on
Providing key presses and speaking at least one (e.g. beginning) letter of a word selects a group of the corresponding words starting with the letter(s)
  highest priority word within the group
  next highest priority within the group
  so on According to one embodiment of the invention, a first word among a group of words having the same key presses (e.g. same key press value) may be predefined to be selected by providing corresponding key presses without speech. If a user desires to enter another word within the group having the same key presses value and having the same beginning letter of the first word and having the second highest priority (e.g. lower than the first word, and higher than the other words within the group having the characteristics), the user may provide the key presses and speak the (e.g. at least) beginning letter. For example, to enter the word "doing", the user may provide the corresponding key presses without speaking. Accordingly, in order to enter the word "dying", the user may provide the corresponding key presses and speak the letter "d". According to one embodiment of the invention, if a word having the highest priority is assigned to providing the corresponding key presses without providing a speech information, and the user provides the key presses and erroneously says at least a (beginning) letter of the word and the systems selects another word corresponding to the information (e.g. key presses and speech) provided by the user, then, the system may also include the word corresponding the key presses only in its proposed selection, so that the user may be able to select the word if desired.

After getting familiar with the system, the user may remember a number of words that may be entered based on their corresponding key presses only (e.g. without speech). The user may assign the words to the (e.g. key) interaction only, so that he may enter a word having the same key press value and starting with the same letter to an interaction consisting of providing the key presses and speaking the (beginning) letter(s) of the word (e.g. "doing" without speech, "dying" with at least the speech of the letter "d")

According to one embodiment of the invention, the user may add his desired words to the database of words of the system. He also may change priorities of words (e.g. based on the frequency of use by the user).

The dictionary of words of the system and the priorities of word within it, may also be adapted to the needs of the market segments (e.g. medical, insurance, etc.). The system may also "learn" the words that a user uses and assign priority degrees to the words accordingly.

During data such as text entry the user may consider some parameters so that to minimize some user interactions such as speaking, correction/selection procedures, etc. For example, the user may remember that many of common words, many of long words, etc., may usually be entered based on their key presses alone.

As mentioned in previous patent applications, in the combined (e.g. including the predictive) data entry systems of the invention, for reasons such as ease of use, the punctuation marks or commands represented-by/assigned-to the keys that also represent the letters, may be entered by a different predefined interactions relative to the interaction used for the entry of the letters. For example, a punctuation mark or command may be assigned to pressing two keys, preferably simultaneously (e.g. pressing-and-holding a "shift" key, and pressing the key corresponding to the punctuation mark or command). They may also be assigned to another type of interaction such as a gliding action or a longer single-pressing action (e.g. shorter pressing actions may be used for the entry of letters or other characters included within a word) on a corresponding key. These matters have already been described in detail in the references incorporated herein, filed by this inventor.

According to another method, after entering a word (e.g. by providing an end-of-a-word signal), the user may press a key representing some of the letters of a language and at least a symbol such as a punctuation mark/command, without speaking to enter a predefined punctuation mark or a command assigned to the pressing action in the absence of the speech. These matters have already been described in detail in the references incorporated herein, filed by this inventor.

Based on the correction/selection principles as described, instead of correcting/selecting the words immediately after their entry, a user may proceed to correcting/selecting them later (for example, at the end of entering an entire document, or after taking notes during a meeting and editing/correcting them later).

According to one embodiment of the invention, the system memorizes at least one of, the key presses and their corresponding speech (e.g. the system may also be designed such that to remember the precise letter(s) and ambiguous key presses), provided by the user for the entry of a word. As shown in FIG. 3, if the user desires to change a word (e.g. "codes") proposed by the system based on user's information, by his desired word, he may first visualize the text 12701 on the screen of a corresponding device 12700, then, point 12705 to the undesired word "codes" 12702 (e.g. by for example, using the mouse, or stylus for pointing to or selecting the word). The system may remember the key presses information (e.g. and the speech information. Note that as mentioned in previous applications, not speaking may be considered as a speech information, by the system) previously provided by the user and propose the other word options 12703, 12704 relating to the user's information. The user may either select the desired word "ducks" 12704 among the words proposed by the system by, for example, using a means such as a directional/navigating key (e.g. within a pop-up menu), using a pointer such as the mouse or the stylus, etc., or he may speak at least some of the letters of the desired word so that the system recognizes the word among the other proposed/candidate words (e.g. in this case by referring to the current example, speaking the letters "du" for distinguishing the word "ducks" from the other word "docks" may be sufficient, so that the user may not speak all of the letters of the word "ducks". The system may recognize and print the word before the user ends the corresponding speech) (e.g. also as described in this case, the system may remember the key presses information and may use that, so the user may not have to re-provide key presses for that word). In this example, the user originally had entered only the key presses, therefore the system had selected the word "codes" having the highest priority relating to the key presses. After pointing to the word, the user may speak at least the letters "du" so that the system recognizes and selects the desired words "ducks" among other proposed words (e.g. the word "docks" starts with "d" and the letter "o" as its second letter.

The combined data entry systems of the invention requires key presses corresponding to the words and may require small amount of speech for the entry of the in-dictionary words. As mentioned, for out-of-the-dictionary words the user may enter the words character by character by for example pressing the keys and speaking the characters.

According to one embodiment of the invention, for entering a word (or more words) such as an out-of-the-dictionary word of a document, the user may provide the key presses corresponding to the word without speaking (or speaking the word, or speaking a few letters of the word) and proceed to enter the other words of the document. The system may either match the information corresponding to the (out-of-dictionary) word to an existing word and provides an undesired word, or the system may not be able to match a word of the dictionary to the information. In this case instead of the word, the system may print a chain of characters such as the values of the keys (e.g. or for example a chain of predefined characters such as "*" or "X" characters) that were being pressed (e.g. if the user has also provided the speech corresponding to for example, one or more letters of the out-of-dictionary word, then the system may print the letters and the key press values or other predefined characters relating to the other letters of the word). Later, the user, may bring up the document and point (as described before) to the erroneous/undesired word(s). Then the user may speak the letters corresponding to the word without again providing the keys presses corresponding to the word (e.g. the system may remembers the key presses). If the user has forgotten the speech of the word, he may listen to the speech of the word that he previously provided during the entry of the original key presses corresponding to the word. By pointing to the erroneous/ undesired word, the system may also play the audio corresponding to the word that was provided by the user during the entry of the word. For example, in order to enter the word "Cannes" (e.g. a French word) that may not be included in a dictionary of words database of English language, the user may press the corresponding keys and speak the word (e.g. as pronounced in French language "kan"). The system may not find a word corresponding to the key presses and the speech (e.g. the speech may not correspond to the speech of (e.g. a word) an English language having the key presses information). In this case the system may memorize the speech information and the key presses information and in the meantime provide a chain of characters corresponding to the assigned values of the keys being presses for the entry of the word (e.g. "212234"). Then for example, later, the user may point to the chain of character, if necessary, the system may provide the speech provided by the user to remind him what he the during the entry of the word. Then user the user may speak the word letter by letter (e.g. without providing the key presses again). The system may consider the original key presses and the recent speech of the user to provide the out-of-the-dictionary word "Cannes".

The embodiments just described may be very useful in some environments. For example, during a meeting or in a conference room, a user may take/enter notes by providing the key presses corresponding to the words that he enters, and when necessary, he may provide a very short speech (e.g. speaking a letter, a syllable, a (short) word) corresponding to a word (e.g. or speaks the word) that he enters. Also for example, after the meeting the user may bring back the document and proceed to correcting/editing the notes, as described.

According to another method, the user may also enter abbreviations for faster data entry. Still according to another method, to provide a (random) chain of character corresponding to word to be correctly entered later, the user may press one or more keys (e.g. random or predefined, non corresponding keys), and speak a word. Later, he may bring up the document, point to that chain of characters, listen to his speech, retype correctly the corresponding key presses and if necessary provide the speech of a number of letters necessary for the correct entry of the word.

According to another embodiment, for entering a word such as an out-of-dictionary word, the user may provide the corresponding key presses only (e.g. without providing a speech). Later when the user points to the word, he key remember (e.g. the speech) of the word based on the key presses, and correct the word as described.

It is understood that other methods of selection/correction such as the navigating through a pop-up list may also be used for the same purpose.

For saving memory, the system may comprise a means such as a key so that the user memorizes the audio (e.g. his speech) only during a period of time such as while being in a meeting or a conference room. The user may also memorize the audio only during the entry of the words-to-be-corrected/entered-later.

According to another method, the words-to-be-corrected/entered-later may be entered by a handwriting (e.g. the words may be recognized by handwriting recognition system, immediately or later. The user may enter them later by the text entry and correction methods as described above).

Many methods and means may be used with the system to enhance the ease of use of the combined (e.g. including the predictive) data entry systems of the invention.

According to one embodiment of the invention, the dictionary of words of the system may also comprise portion-of-a-words of (e.g. the corresponding language), to be used with the data entry systems (e.g. including the predictive) of the invention. Depending on the architecture of the system, the portion-of-a-words may either be included within the dictionary of words or they may constitute a separate database.

Also, to remind the user that a word may be entered based on its key presses only, after entering the word, the system may highlight the word on the screen of the corresponding device by for example, printing it bolded, printing it in another color, blinking it, etc.

If a word does not exist within the database, but by deleting a portion such as an ending portion of it, it may exist within the database, then the user may delete the portion, and then enter the deleted portion at the end of the word. For example, the word "prescription" may be included within the database but the word "prescriptions" may not. For example, after providing the information corresponding to the word "prescriptions", if the system does not select any words (e.g. but the user knows that the word "prescription" exist within the database of the system), then the user may use a "BkSp" key to the delete the last key-press corresponding to the last letter "s". the system selects the word "prescription", and the user may adds the letter "s" at the end of the word.

Some of predefined single letters (e.g. "a", "e", "i", of English language) may be assigned to different keys and may predefinely be entered by an interaction such as pressing action on their corresponding keys without providing a speech.

During the entry of a word, the user may enter a portion of the word by using the portion-by-portion data entry systems of the invention. For example, the user may start pressing the keys corresponding to the (beginning) letters of a word without speaking, and press key/glide a key corresponding to a middle or an ending portion of the word and speak the portion (or vise versa, etc.). This has some advantages. For example, the portion entered precisely, may help the easier recognition of the entire word. It also helps entering a word faster (e.g. less key presses). For example, in order to enter the word "recognition", the user may first press the keys corresponding to the letters "recogni" without speaking, and then press the key corresponding to the letter "t" (beginning letter of the portion "tion") and speak the portion.

As mentioned before, other data entry enhancements such as using language models/rules, a word completion system, an automatic correction system, etc, may also be used with the data entry systems of the invention. Also as mentioned before, fingers, finger caps, etc, may be used in replacement or in addition to the keys of the data entry systems of the invention. Also instead of or in addition to the user's voice, the movements of body members such as the lips of the user may be considered. These matters have already been described in detail in the references incorporated herein, filed by this inventor.

According to one embodiment of the invention, other methods of data entry such as multi-tap or handwriting may be used for precisely entering at least one of the characters such as the beginning letter(s) of a word. The information corresponding to the rest of the word may be entered by providing (e.g. single) key presses corresponding to the remaining characters of the word without/with speech.

Using press/glide-and-speak and/or the handwriting input and recognition system, and/or a full (e.g. pc) keyboard, for precisely entering at least one of the characters of a word, and providing (e.g. ambiguous) key press(es) (e.g. without speaking) corresponding to at least one (e.g. preferably all) of the other characters of the word, may provide a quick (e.g. handwriting alone is slow) and accurate (e.g. word predictive system based on key presses only, is frustrating and inaccurate and has other limitations as known by people skilled in the art) and also may require less speech or handwriting. The system may also require small amount of memory and processing power/speed. For example, the speech recognition system (e.g. combined with corresponding key press(s)) may exclude speeches of words (e.g. generally, letter entry may be sufficient for entering a word). Also the handwriting recognition system may exclude the word level entry and may generally work based on letter entry. This is because as mentioned, the use of the predictive data entry system of the invention using the precise letter(s) entry methods combined with (e.g. ambiguous) key presses (e.g. of the reduced corresponding keypad) may dramatically minimize the use of the speech and/or handwriting system.

Providing key presses and speaking at least some of the (e.g. beginning) letters of a word may permit the (e.g. combined data entry) system to provide better accuracy and use a small amount of memory and processing power, compared to providing key presses and speaking the words of a language that may not be very accurate and use a large amount of memory and processing power. Therefore, at least for devices having limited memory and processing power, it recommended to use the letter-by-letter level approach that requires very small amount of vocabulary (e.g. letters, numbers, some punctuation marks, some commands).

It must be noted that obviously, for selecting/pointing-to a word for being corrected/changed, the pointing position may be predefined to be, pointing on the word, or before the word, or after the word, or etc. For example, a cursor may be placed after the last character of the word or within the characters of the word to point to the word.

According to one embodiment of the invention, if a word does not exist in the dictionary but the word including or excluding a prefix (e.g. "re") or a suffix (e.g. "tion") exists within the systems database (of word), then, the system may propose the word without or with the prefix or suffix. The user, the may add or delete the other portion to/from the word. for example, if the user tries to enter the word "understanding", and the system does not find such a word, by recognizing that the word may comprise the suffix "ing", the system may search for the word "understand" (e.g. by not considering the last three key presses provided for the word). if the system finds the word "understand", it may proposes it to the user the user may accept the word by for example, entering the remaining letters "ing" of the word. According to another method (e.g. by analyzing the provided key presses), the system may automatically add the prefix or suffix to the word.

Figure 4:
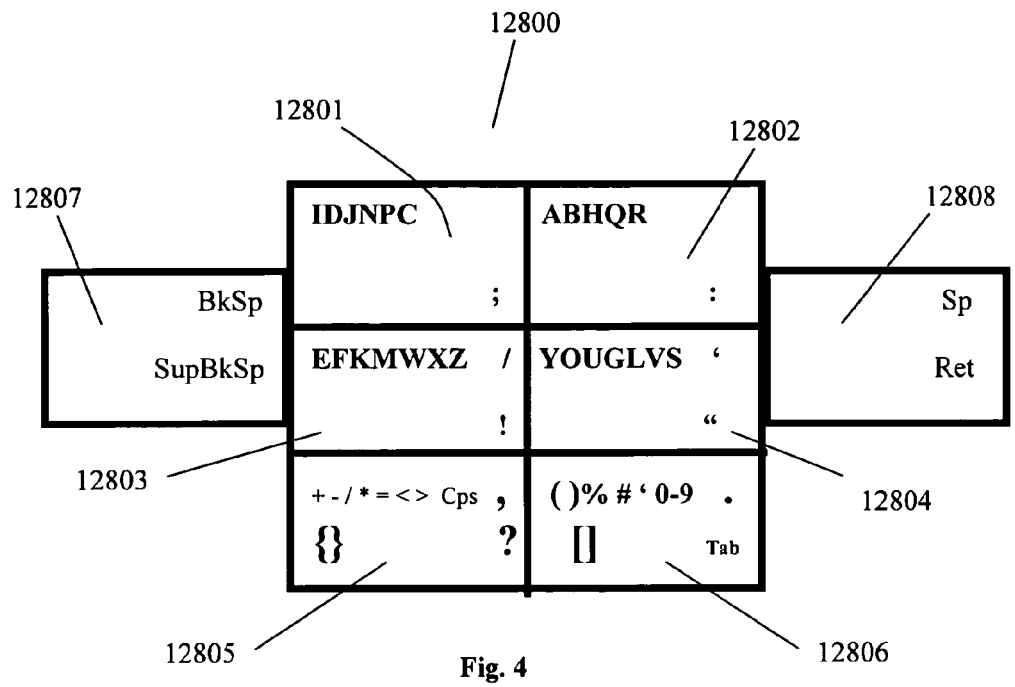
FIG. 4 shows an exemplary keypad that may be used with the data entry system, in accordance with one embodiment of the invention.

As mentioned before, preferably, the keypad used with the combined data entry systems of the invention may be such that to maximize the ease of use and the accuracy of the system. Parameters such as the number of key, the configuration of letters on the keys, etc., may be differently considered with each keypad. FIG. 4 shows as an example, a keypad 12800 wherein four of the keys 12801-12804 correspond to substantially all of the letters of the English alphabet (e.g. the letters are assigned in a distributive manner to the four keys). The keypad may be designed such that to be used with the combined (e.g. including the predictive) data entry systems of the invention. For example, on one hand, letters having ambiguously resembling speech such as the letters of groups of letters such as, "m, l, n", and "p, b", and "d, e", and "j, k", and "t, d", etc., may separately be assigned to different keys so that to maximize the accuracy of the press/glide-and-speak data entry systems of the invention, and on the other hand groups of letters such as, "e, o, i, a", and "s, d, r", etc., may separately from each other be assigned to different keys so that to minimize the number of words having similar key presses when using the (e.g. combined) word predictive systems of the inventions. For example, by doing so, words such as "drives, driver", or "forces, forced, forcer", etc., may have different corresponding key presses. It is understood that the methods just discussed may be applied with any keypad having few keys such as a keypad having 12 key (e.g. a keypad having a telephone-typed keypad key arrangement).

As mentioned before, when entering a word by the combined (including predictive) data entry systems of the invention (e.g. based on the key presses corresponding to the letters of a corresponding word, without speaking or by providing the speech of at least one (e.g. the beginning) letter of the word, as described earlier), a user may preferably enter (e.g. precisely) at least one of the beginning letters of the word by the press/glide-and-speak data entry method of the invention, and press the keys corresponding to the remaining letters of the word. According to one embodiment of the invention, if the user desires to provide other characters such, at least a word, at least a portion of a word (e.g. a suffix), etc., attached at the end of the word, the user may provide at least one of the beginning letters of the word/portion by the press/glide-and-speak data entry method of the invention, and for example, continue to press the keys corresponding to the remaining letters of the word. This may permit to create and enter conjoined words even if they not exist in the dictionary of words database of the system. For example, by considering this method and the words "friend" and "ship" existing in the dictionary of words database of the system, in order to enter the word "friendship" in two portions "friend-ship" (e.g. the word friendship may not exist in the database of the system), the user may first enter the word "friend" by the methods of the word predictive data entry systems of the invention as described (e.g. either providing key presses corresponding to the letters of the word without speaking, or providing the key press corresponding to at least the (e.g. beginning) letter (e.g. "f") of the word and speaking the letter, and provide the key presses corresponding to the remaining characters (e.g. "riend") of the word without speaking). The user, then, may proceed to the entry of the next word "ship" by providing the key press corresponding to at least the (e.g. beginning) letter (e.g. "s") of the word and speaking the letter, and provide the key presses corresponding to the remaining characters (e.g. "hip") of the word without speaking. The key press and speech corresponding to the first character of the second word may inform the system of the beginning of the second word and the end (e.g. considered as an end-of-a-word signal) of the previous word.

As mentioned, the user may also enter at least one portion-of-a-word such as a suffix at the end of a word by using the same method. For example, in order to enter the word "management" in two portions "manage-ment" (e.g. the word "manage" and the suffix "ment", by considering that the word and the portion-of-a-word exist in the dictionary of words database of the system), the user may enter the word by the method just described.

It must again be noted that in addition to the words, the dictionary of words database of the system may also comprise a-portion-of-a-words corresponding to at least one language. Even words comprising from multiple portions or words such as the word "workmanship" (e.g. "work-man-ship") including several shorter words may be entered through the same method.

According to another method, a chain of characters (e.g. a word of the database, an out-of-dictionary word, an arbitrary chain of characters, etc.) may be entered/attached at the end of a word by using, for example, the character-by-character press/glide-and-speak data entry systems of the invention. For example, by considering that the word "manage" exists in the dictionary of words database of the system, in order to enter the word "management" in two portions "management", the user may first the enter the word "manage" as described before (e.g. either providing key presses corresponding to the letters of the word without speaking, or by, for example, providing the key press corresponding to at least a (e.g. beginning) letter (e.g. "m") of the word and speaking the letter and provide the key presses corresponding to the remaining characters (e.g. "anage") of the word without speaking). The user may enter the chain of characters "ment" at the end of a word by using the character-by-character press/glide-and-speak data entry systems of the invention.

According to one embodiment an end-of-the-word signal such as pressing a predefined key may be necessary at the end of the entry of a word so that when user proceeds to the entry of the next word (e.g. to attach it to the first word), the screen does not fluctuate.

The embodiments just described may permit to use a database of words having significantly reduced number of words with the combined data entry systems of the invention. For examples, words ending with common suffixes (e.g. "ed", "s", "ing", "ment", "ture", etc.) may not be include within the database. Also words being composed of multiple shorter words (e.g. wherein the shorter words existing in the database) may not be included within the dictionary. The system may also include an auto-correction system such that to for example, automatically correct a conjoined word. For example, if the user enters the word "memorize", and adds the portion "ming" at its end, the system may automatically rectify the conjoined word "memorizing", to provide the word "memorizing".

As mentioned before, when a word is entered by using the word predictive system of the combined data entry systems of the invention, the system, for example, may propose a word that the user did not intend to enter. Also, for example, the system may not match the user's (e.g. key presses, and speech if there was any) information with any of the words of the database (as mentioned before, in this case the system may print a predefined or arbitrary chain of characters such as predefined letters, corresponding to the corresponding user's key presses, or the system may print numeric values corresponding to the corresponding user's key presses, etc.). According to one method, for example, if a user desires to correct a non-desired word (e.g. or chain of characters) or to select the desired word, after he points (e.g. as described before) to the erroneous word (e.g. the erroneous word being provided based on corresponding key presses initially entered), the system may recognize the user's key presses provided for the entry of the word, by considering the chain of characters (e.g. Obviously, the system may easily relate a printed letter to its corresponding key). For example, the user may point to the word and (e.g. for example, if the word does not exist in the database, or for the reason of convenience, etc.) speak at least some of the letters corresponding to the word (e.g. Instead, he also may speak the word). At the end of the speech, the user may provide an end-of-the-speech signal such as removing the pointer from the word (e.g. the user may also use other methods to inform the system of the beginning and the end of the speech. For example, as described before, the user may press-and-hold a predefined key to inform the system of the beginning of the speech corresponding to the correction/selection, and release the key when he finishes to speak so that to inform the system of the end of the speech.

The methods of correction/selection of a word have already been described in the references incorporated herein, filed by this inventor.

Methods of using punctuation mark characters and command in the combined data entry systems of the invention may be considered so as to maximize the ease of use of the combined systems by the user. As described in the references incorporated herein, filed by this inventor, each of the most special symbols such as punctuation mark characters or numbers may be entered by interacting with its corresponding key and providing a speech corresponding to the special symbol. By doing so any such punctuation character or command may be entered during the entry of text by the combined data entry systems of the invention.

As mentioned in previous patent applications, in order to make the data entry systems of the invention more user friendly, there may be some special symbols (e.g. such as the character "." provided at the end of a word) that may be entered by pressing the corresponding keys without speaking. Some of the special symbols may be assigned to the keys other than the keys that the letters are assigned. But because the system, preferably, may use few keys, some other of the special symbols may also be assigned to the keys that represent the letters. A problem may occur when using the last mentioned symbols within a word (e.g. such as a "?" at the end of a word when entering the word through the word predictive systems of the combined data entry systems of the invention. For example, a user may try to enter the word "ready?" (e.g. including the "question mark") by using the word predictive systems of the combined data entry systems of the invention, by either providing key presses corresponding to the letters of the word without speaking, or by providing the key press corresponding to at least the (e.g. beginning) letter (e.g. "r") of the word and speaking the letter, and providing the key presses corresponding to the remaining characters of the word including the special symbol (e.g. "eady?") without speaking. The system may not know that the word entered ends with a special symbol. Therefore the system may look for the words having both, five and six characters. This may provide many choices to be presented to the user. To resolve the problem, hereunder, a method of entry of the special symbols (e.g. including commands and functions) is described.

According to one embodiment of the invention, while using the combined data entry system of the invention, the words, letters, and other symbols such as special symbols may be mixedly entered in a same chain of characters. The user may enter one or more consecutive words, chain of letters, chain of special characters, etc., by pressing the keys corresponding to the words, chain of letters, chain of special characters and speaking at least the first letter of the words, chain of letters, chain of special characters. If the first symbol of the chain of symbols is a "non-spoken" symbol (e.g. being entered by pressing its corresponding key without speaking) that is assigned to a key other than the keys representing the letters, or if the first symbol of the chain of symbols is a "non-spoken" symbol (e.g. provided by pressing its corresponding key without speaking) that is assigned to the same key that at least some of the letters are assigned to, but is entered by a different interaction (e.g. a double pressing action, pressing the key and another key simultaneously, etc.) with the key than the key interaction (e.g. single pressing action) required for the entry of a letter on the key, then the user may enter the special character by providing the corresponding pressing action without speaking at the beginning of the chain of special characters. For example, by considering the keypad 12800, in order to enter the URL http://www.textentry.com, the user may:

- enter the chain of characters "http" by, for example, using the character-by-character press-and-speak data entry method of the invention (e.g. pressing the keys corresponding to the letters and speaking the letters), then;
- the user may provide a predefined interaction such as a double-pressing action on the key 12802 or another predefined interaction such as pressing the keys 12805 (e.g. also considered as a "Shift" key if, for example, is pressed simultaneously with another keys, as described in previous patent applications) and 12802 without speaking to enter the special symbol ":" (e.g. the symbol may be predefined to be assigned to the key interaction in the absence of a speech) and continue to enter the special symbols "//" by providing two (e.g. predefined) single pressing actions on the key 12803 without speaking. Entering the first special character at the beginning of a chain of special characters may inform the system that the following characters entered are special characters, until a letter is entered (e.g. until a key is pressed and a letter is spoken);
- then, the user may enter the chain of characters "www" by using the character-by-character press-and-speak data entry method of the invention as described;
- The user then may enter the symbol "." by for example, interacting (e.g. single pressing) with the key 12806 without speaking or by for example saying "dot" (e.g. the symbols may be assigned to, both, speaking and not speaking)
- The user then may enter the chain of characters "textentry", by for example, either using the character-by-character press-and-speak data entry method of the invention or by entering it in two portions (e.g. two words "text" and "entry" existing in the dictionary of words database of the system). To do so, the user may first press the key 12802 corresponding to the letter "t" and say the letter and continue to press the keys corresponding to the remaining letters "ext" of the word "text". Then the user may press the key 12803 corresponding to the letter "e" and say the letter and continue to press the keys corresponding to the remaining letters "ntry" of the word "entry";
- The user then may enter the symbol "." by pressing on the key 12805 without speaking or by for example saying "dot" (e.g. the symbols may be assigned to both, speaking and not speaking);
- (e.g. Finally,) the user may enter the chain of characters "com", by, for example, using the character-by-character press-and-speak data entry method of the invention It must be noted that the chains of characters "http", "www", and "corn", could be entered by the word predictive system of the combined data entry systems of the invention (e.g. if for example the word existed in the dictionary of words database of the invention). For that purpose the user could:

- enter the word "http" by either providing key presses corresponding to the letters of the word without speaking, or by providing, for example, the key press corresponding to (e.g. at least) a (e.g. beginning) letter (e.g. "h") of the word and speaking the letter, and provide the key presses corresponding to the remaining characters (e.g. "ttp") of the word;
- enter the word "www" by providing, for example, the key press corresponding to (e.g. at least) a (e.g. beginning) letter (e.g. "w") of the word and speaking the letter, and provide the key presses corresponding to the remaining characters (e.g. "ww") of the word;
- enter the word "com" by, for example, providing the key press corresponding to (e.g. at least) a (e.g. beginning) letter (e.g. "c") of the word and speaking the letter, and provide the key presses corresponding to the remaining characters (e.g. "om") of the word.

Note that, generally, each time the user switches between the type of symbols to be entered, the first symbol is either spoken, or if it is a non-spoken symbol it is entered through either a key other that a key representing letters, or if the non-spoken symbol is assigned to the same key that at least a letter is assigned, the symbol is entered through a predefined interaction (e.g. double press, pressing two keys simultaneously, etc.) assigned to the key wherein the predefined interaction is different from the interaction (e.g. single press) required for entering a letter on the key. Also it must be noted that the word at the beginning of a mixed chain of characters may be entered by the word predictive system of the combined data entry systems of the invention without providing the speech corresponding the first letter of the word. On the other hand, if a chain of characters starts with a special character at least the first character may follow the methods described above.

According to another method, if the system uses a (e.g. touch, pressure) sensitive surface for (e.g. key) interaction, then for example, one of the interactions other than an interaction such a single pressing action assigned to the letters on a key, may be a gliding action on the key. Theses matters have already been described in detail.

It is understood that any chain of characters such as the above-mentioned mixed chain of characters may be entered by using the character-by-character press-and-speak data entry systems of the invention as described in the references incorporated herein, filed by this inventor (e.g. permitting the use of non-spoken punctuation mark characters and commands within a same key and a same type of key interaction that the letters are assigned to). According to one embodiment of the invention, a switching means such as a mode key may be provided to switch between the press/glide-and-speak data entry systems of the invention and the combined data entry systems of the invention.

As mentioned before, a special symbol such as a space character, a punctuation mark (e.g. ",", ".", "!", "?", etc.), a function or a command (e.g. "Enter", "Tab", etc.) provided at the end of providing the information for the entry of a word may be predefined to be considered as an end-of-a-word signal for the word. Also some portion-of-a-words (e.g. combination of characters excluding or including special characters, such as punctuation marks such as "'s", "n't", etc.) provided at the end of a word may be considered as an end-of-a-word signal for the word. For example, the word "doesn't", may be entered by first entering the word "does", and at the end pressing the key corresponding to the portion "n't" and speaking the predefine speech corresponding to the portion. Obviously, such words that include a punctuation mark character (e.g. "'", "-", "_"), may also be the words of the dictionary database and be entered by for example, pressing the keys corresponding to the characters (e.g. the punctuation mark) of the word (e.g. with or without speech).

According to one embodiment of the combined (e.g. including the word predictive) data entry systems of the invention, one of the letters assigned to a predefined interaction with its corresponding key may be entered by interacting with the key with and/or without providing a corresponding speech. For example, as shown in FIG. 4, each of the letters "a", and "I" having a meaning in the English language may be assigned to different keys (e.g. or different interactions with a same key) and entered by pressing its corresponding key and speaking and/or not speaking the letter.

Figure 5:
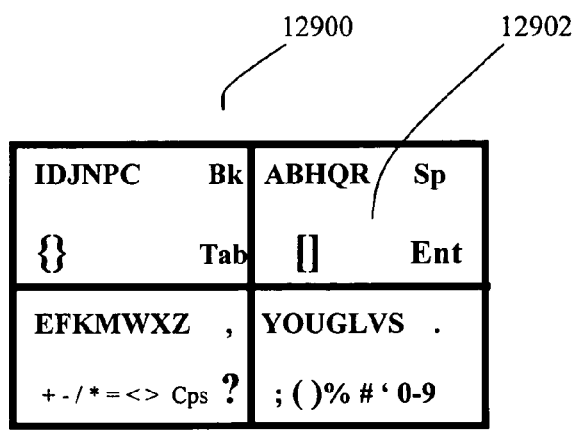
FIG. 5 shows an exemplary keypad that may be used with the data entry system, in accordance with one embodiment of the invention.

The advantages of the use of a keypad having few keys such as four keys, have been described and demonstrated in the references incorporated herein, filed by this inventor. The keypad may be, for example, a virtual/soft (e.g. fixed, dynamic) keypad used on the (e.g. touch) screen of an electronic device and being used with the data entry systems of the invention such as the combined data entry systems of the invention. In addition to, for example, different types of tapping actions, other interactions such as interactions deriving from a gliding action (e.g. single glide, double-glide, tap-and-glide, etc.) on for example at least a key of the keypad may be considered for assigning at least part of the symbols of the data entry systems of the invention, so that on one hand to better distinguish the symbols from each other, and on the other hand to permit the use of very few keys for the complete easy and quick data entry such as text entry. FIG. 5 shows as an example, such a keypad 12900, having four keys. For example, in order to enter a word (e.g. "driver") through the word-predictive data entry systems of the invention and entering a "space" character (e.g. immediately) after the word, a user may either provide the key presses corresponding to the letters of the word without speaking, or he may provide, for example, the key press corresponding to (e.g. at least) the (e.g. beginning) letter (e.g. "d") of the word and speak the letter, and provide the key presses corresponding to the remaining characters (e.g. "river") of the word. At the end of providing the key presses, the user may glide on the key 12902 to enter a space character (e.g. immediately) after the word (e.g. the "Space" character, may be assigned to a gliding action on the key 12902 without speaking. It must be noted that this is only as example, other symbol assignments to different keys and different interactions with the keys, also other number of keys, may be considered. For example, a letter on a key may correspond to a gliding actions on the key (e.g. and be entered by speaking it, or by not speaking if it is entered by a pressing action without speech on the key during the entry of a word through the word-predictive systems of the invention), and the "space' character may correspond to a pressing action on the key (e.g. in the absence of a speech). These matters have already been described in detail in this patent application and the references incorporated herein, filed by this inventor.

As mentioned before, the dictionary of words database of the invention may comprise words (e.g. and portions of words) of more than one language. According to another embodiment, after entering at least a (beginning) character of a word by pressing on at least a first key and speaking the at least one letter, and providing the key presses corresponding to the remaining letters of the word, if the system hesitates between two letters on the at least first key having ambiguously resembling speech relating to each other, then the system may present the words corresponding to the key presses that, for example, begin with each of the letters.

Another parameter to consider when assigning the symbols such as the characters to the keys of a keypad is the frequency of use of each key by a user's hand so that to be harmonized when using the fingers of two hands such as using two thumbs (e.g. avoiding multiple consecutive interactions with the finger(s) of a same hand). FIG. 6a to 6b show other examples of assignments of letters to four keys of a keypad, that may be used with for example, the combined data entry systems of the invention by considering the above mentioned principles and the principles of the combined data entry systems of the invention as described before.

As mentioned before, according to one embodiment the press/glide and speak data entry systems of the invention may be used in conjunction-with but separately-from other data entry systems. For example, the system may function beside/with another data entry system based on key presses only (e.g. without providing speech, such as a word-predictive system based on the key presses without speaking) available with an electronic device, but independently from the another system such that for example, when providing information such as the key presses corresponding to a portion of a text such as a word, if a corresponding speech is not provided (e.g. if the corresponding electronic device does not detect a speech) the information (e.g. key presses alone) may be interpreted by the another system wherein the another system may enter the portion of a text (e.g. the word) based on the principles of the another data entry system.

On the other hand, as mentioned before, if associated with (e.g. during) the entry of the key presses corresponding to a portion of a text such as a word, the user provides a speech corresponding to the portion of a text or to at least some of the characters of the portion of a text (e.g. if the corresponding electronic device detect the presence of the speech) the information (e.g. key presses and speech) corresponding to the portion of text/word may be interpreted/considered by the press/glide-and-speak data entry systems of the invention wherein the press/glide-and-speak data entry systems may enter the portion of a text (e.g. the word) based on the principles of press/glide-and-speak data entry systems of the invention (e.g. including the word predictive systems of the invention as described before).

According to another embodiment of the invention, even if a word is entered by the other data entry system, the correction/selection of a word entered may be provided by the press/glide-and-speak systems of the invention as described before. for example, the user may point to the erroneous word (e.g. selecting it by using a mouse/arrow key, etc.) and (e.g. with or without pressing the corresponding keys (e.g. the letters of the erroneous/no-desired word may inform the system of the corresponding key presses)) speak the letters corresponding to the desired word.

One of the most confusing and frustrating issues of the entry of a word by using a word predictive system based on the key presses alone (e.g. without speaking) is the selection of a desired word if the word proposed by the system is not the one that the user intended to enter. It must be noted that based on the systems, for example, if the desired word is one of the lowest frequently used words among the words corresponding to the key presses provided by the user, it may require several "select" key presses and a lot of user's focus on the display until the word is selected by the user. The key manipulations and permanent display focusing may be reduced or eliminated by using the combined data entry systems of the invention, (e.g. press/glide-and-speak and the word predictive data entry systems based on at least considering some of the key presses provided for the entry of the word) data entry and corrections systems of the invention as described before.

As mentioned before, when using the combined data entry systems of the invention, associated with (e.g. during) the entry of the key presses corresponding to a portion of a text such as a word, the user may provide a speech corresponding to the portion of a text or to at least some of the characters of the portion of a text. The system may detect the presence or the absence of the speech. Based on the principles of the combined data entry systems of the invention as described before, different systems of combined data entry systems of the invention such as the ones described hereafter may be considered, wherein each of the systems may have its own advantages.

EXAMPLE 1

According to one embodiment of the invention:

it is predefined that only one word of the dictionary of the word database of the system may correspond to a sequence of key presses (e.g. corresponding to the characters of the word) provided by a user without providing a corresponding speech, for entry of a word, and;

it is predefined that other words of a language corresponding to the same sequence of key presses may not be included within the database. If the user desires to enter one of the other words, he may enter it as an out-of-dictionary-word as described before, by for example, using the character by character press-and-speak data entry systems of the invention. For example, if the user knows in advance that the word does not exist in the dictionary, then he may provide the key presses and the speech of the corresponding letters (e.g. substantially simultaneously). If the user for example, does not know in advance that the word does not exist in the dictionary, and notices it after the entry of the key presses without speaking, then, the user may for example speak the letters of the word, or speak the word as described earlier.

Figure 8:
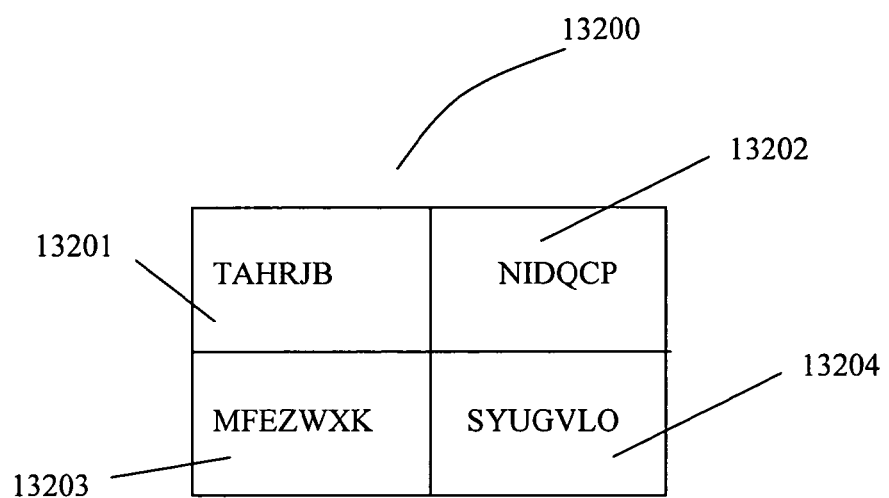
FIG. 8 shows an exemplary keypad that may be used with the data entry system, in accordance with one embodiment of the invention.

For example, by considering the keypad 13200 of FIG. 8, only one word (e.g. "doing") within a dictionary of words database of the system is predefined to correspond to the key presses 13202, 13204, 13202, 13202, 13204. If a user desires to enter another word such as "coins" having the same key presses information, in addition to the key presses the user may speak the letter of the word or he may speak the word (e.g. as described before).

The system just described may permit to enter a word without ambiguity. Each sequence of key strokes on the keys of a keypad without speaking for entering a word may correspond to only one word within the dictionary. The word may be a predefined word such as a commonly used word, or a word decided by a user, or used a predefined environment. The user may not be frustrated for choosing another word by manipulating the keys of the keypad. If the word entered is not the one that the user desired, (e.g. without providing the corresponding key presses again) he may simply either speaks the word or speak the letters of the word. This is a quick and easy.

EXAMPLE 2

According to one embodiment of the invention:

it is predefined that only one word of the dictionary of the word database of the system may correspond to a sequence of key presses provided by a user without providing a corresponding speech, for entry of a word, and;

it is predefined that, at most, only one word of the database of words may correspond to an information provided by the user, the information including the same sequence of key presses provided by the user and a speech corresponding to the speech of at least one of the (e.g. beginning) characters of the word provided by the user, and;

it is predefined that other words of the database of words of the system having the same sequence of key presses may not be included within the database. If the user desires to enter one of the other words, he may enter it as an out-of-dictionary-word as described before.

For example, by considering the keypad 13200 of FIG. 8 only one word, (e.g. "doing") within a dictionary of words database of the system, is predefined to correspond to the key presses 13202, 13204, 13202, 13202, 13204 without speaking. If a user desires to enter another word such as "coins" or "dying" or "pupil" having the same key presses information, in addition to the key presses the user may speak at least the a (e.g. beginning) letter of the word or he may speak the word (e.g. as described before). As shown, each of the words of the data base (e.g. "coins" or "dying" or "pupil") having the same key press information and requiring a speech for begins entered, begins with a different letter, so that when the user provides a word and speaks for example, the first letter of the word, the user knows that the system will provide only one word corresponding to information he provided. Note that although the word "doing" has the same key press information and begins with the word "d," the word is assigned to the key pressing actions without speaking.

The system just described may permit to enter a word without ambiguity. Each sequence of key strokes on the keys of a keypad without speaking for entering a word may correspond to only one word within the dictionary. The word may be a predefined word such as a commonly used word, or a word decided by a user, or used in a predefined environment. On the other hand each sequence of the same key strokes on the keys of the keypad combined with providing a corresponding speech for entering a word may correspond to only one word within the word dictionary database. The word may be a predefined word such as the most commonly used word among the words having the sequence of key presses and corresponding to the speech information. If the word entered is not the one that the user desired, (e.g. without providing the corresponding key presses again) he may simply either speaks the word or speak at least more letters or all of the letters of the word. This is a quick and easy.

EXAMPLE 3

According to another embodiment of the invention:

it is predefined that only one word of the dictionary of the words database of the system may correspond to a sequence of key presses provided by a user without providing a corresponding speech, for entry of a word, and;

it is predefined that other words of the database of words that correspond to the same sequence of key presses (e.g. provided by the user), may be entered by providing the key presses and providing a speech corresponding to the speech of at least one of the (e.g. beginning) characters of the word (e.g. or speaking the word) by the user.

The system just described may permit to enter a predefined word without ambiguity. Each sequence of key strokes on the keys of a keypad without speaking for entering a word may correspond to only one word within the dictionary. The word may be a predefined word such as a commonly used word, or a word decided by a user, or used in a predefined environment. On the other hand each sequence of the same key strokes on the keys of the keypad combined with providing a enough corresponding speech (e.g. at least as much as required for distinguishing the word from the other words that correspond to the same key presses and require corresponding speech for being entered). If the word entered is not the one that the user desired, (e.g. without providing the corresponding key presses again) he may simply either speaks the word or speak at least more letters or all of the letters of the word. This is a quick and easy.

For example, by considering the keypad 13200 of FIG. 8, only one word (e.g. "noise") within a dictionary of words database of the system may be predefined correspond to the key presses 13202, 13204, 13202, 13202, 13203 without speaking. If a user desires to enter another word such as "cycles" or "clive" having the same key presses information, in addition to the key presses the user may speak at least one or more (e.g. beginning) letters of the word or he may speak the word (e.g. as described before). As shown, each of the words of the data base (e.g. "cycle" or "clive") having the same key press information and requiring a speech for begins entered, may begin with a same letter, so in order distinguish the words from each other the user may speak for example, more that one letter of a corresponding word such that to distinguish it from the other words of the selection. It must be noted that the speech corresponding to the letters (e.g. or word) may be provided at a predefined laps of time relating to the time when at least one of the key presses is provided. For example, the speech may be provided substantially simultaneously with providing corresponding key presses or it may be at most after a predefine laps of time before or after the key presses. During the entry of the key presses if the user does not provide enough speech information (e.g. speaks only one letter "c" in this example) and the system provides a non-desired word (e.g. "cycle") then in order to enter the desired word (e.g. "clive) the user may proceed to a correction/selection procedure as described earlier.

It must be noted that according to one method, preferably, after the user enters at least a first character (e.g. letter) of a word by for example pressing the corresponding key and speaking the corresponding letter (e.g. or portion/word), and provides the remaining key presses corresponding to the remaining characters of the word without speaking, the system may try to find the candidate words beginning with the letter and wherein the remaining characters (e.g. letters) of the candidates correspond to the key presses provided by the user without speaking. It must also be noted that the speech corresponding to the letter (e.g. or word) may be provided at at least a predefined time relating to the time when at least one of the key presses is provided. For example, the speech may be provided substantially simultaneously with a corresponding key press or it may be at most after a predefine laps of time before or after the key press.

As mentioned before, according to one embodiment of the invention, interacting with a key other that a letter key, or providing a mode of interaction with a letter key other than the mode of interaction used to enter a letter on the key may be considered as an end-of-the-word signal by the system. For example, after providing the input information corresponding to the entry of at least the beginning letters of a word and entering a portion-of-a-word such as a suffix of a word by providing a gliding action or a double pressing action on a key that corresponds to the first letter of the portion-of-a-word, according to one method, the system may consider the portion-of-a-word as a last portion of the word and based on all of the information provided by the user select at least one word corresponding to the all of the information. According to another method, the system may consider the portion-of-a-word as an attachment to the word corresponding to preceding information provided by the user and after selecting at least a word based on the preceding information, the system may attach the portion-of-a-word to the end of the at least one word. As mentioned before, according to one method, substantially all of a-portion-of-a-words may be assigned to at least one type of interaction with the key other than the interaction required for the entry of a character such as a letter on (e.g. assigned to) the key. It must be noted that as mentioned in the references incorporated herein, filed by this inventor, according to one method, each of at least substantially all of the a-portion-of-words of the database may be assigned to the key corresponding to the beginning letter of the a-portion-of-a-word.

As mentioned before, correction procedures may be provided substantially, immediately at the end of the entry of a word or they may be provided at a later time. The user may save a text, and later open it to visualize it on a screen of an electronic device, point on a word that he desires to change (e.g. the pointing method may be selecting the entire erroneous/non-desired word), and speak at least one or more of the (e.g. beginning) letters of the word required for the entry of the word. By providing a predefined pointing signal such as selecting the entire word, the system may understand that the user may desire to change the entire word. Then, according to another method, in order to modify one (or more) characters of a word, the user may point to the character (e.g. such as pointing to a position immediately after the character) and provide the correction.

It is understood that other methods of selection of a word among candidates words such as pointing-to/selecting one of the word may also be used separately or in conjunction with the speaking of the (e.g. at least some of the characters word) the word as described.

Figure 7:
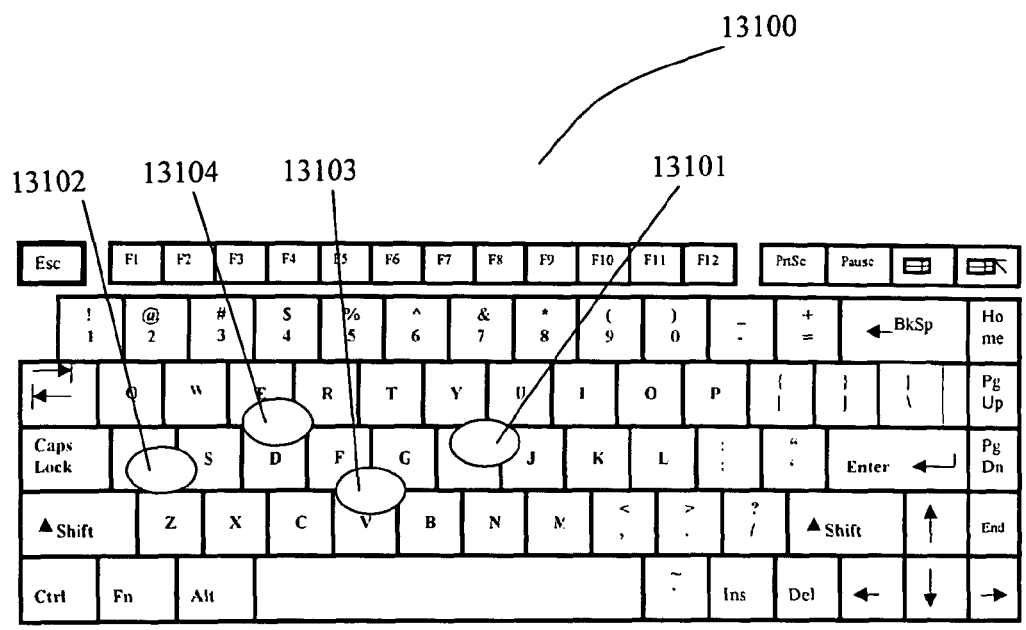
FIG. 7 shows a keyboard having unambiguous letter keys to demonstrate a method of a predictive data entry system using this type of keyboard.

As mentioned before, the data entry systems of the invention may user a keyboard such as an on-screen (e.g. QWERTY) keyboard on a touch sensitive screen of an electronic device. As mentioned before, when user types on the screen, he may tap (e.g. by mistake) in an area (e.g. on a key) on the keyboard being closed to the key that the user intended to press. The system may consider at least some of the neighboring keys to the pressed area (e.g. key). This may provide a set of keys each having at least one character such as a letter to be considered with each user's pressing action during the entry of a word. Each of the number of the keys selected by each pressing action on the keyboard may relate to at least one character such as a letter, such that to duplicate a key of a keypad having several characters such as a letter. Then based on the principle, the system may use the keypad and method with different data entry systems of the invention such as the press/glide-and-speak data entry systems of the invention or the combined data entry systems of the invention. For example, as shown in FIG. 7, by using an on-screen keyboard 13100, in order to enter the word "have", the user may press on the zones near 13101-13104 near the corresponding keys of the word. For each of the impact zones, the system may consider the letters on for example the keys surrounding the zone. As an example, in this example, the system may consider at least some of at least the letters "h, j, y, u") for the impact zone 13101, the system may consider at least some of at least the letters "a, s, z") for the impact zone 13102, the system may consider at least some of at least the letters "f, g, v, c, b") for the impact zone 13103, the system may consider at least some of at least the letters "e, r, s, d, v") for the impact zone 13104. It is understood that the characters corresponding to the pressing actions as described, may be used with the data entry systems of the invention. For example, for better accuracy, while pressing the keys, at least a speech corresponding to at least one of the key presses may be provided so that to better recognize the at least one letter. For example, the user may speak the letter "h" while providing the key presses. The system may realize that the word starts with the letter and by considering the letters corresponding to for example, the remaining pressing actions provided by the user, the system may provide the word "have". These matters have already been described in detail. It is understood that instead of a QWERTY keyboard, any other keyboard having any number of keys any character assignment, etc. may be used.

It must be noted that although in many embodiments keys have been shown and described as the means of input of an electronic device, any other input means duplicating the keys and/or interactions with the keys, provided with an electronic device, such user's fingers, finger caps, a stylus, or electronic device (e.g. tilting) movements, etc., may be used for the same purpose. These matters have already been described before.

Also according to another embodiment of the invention, after selecting a word based on the user's input information, the system may speak the word (e.g. text-to-speech system) so that the user without looking at the screen may decide if he wants to change the word or to confirm it. For example, after listening to the system, if the user wants to confirm it he may proceed to the entry of a new character/word, etc. Also for example, after listening to the system, if the user wants to change the word he may for example speak at least one of the letters of the word, or speak the word (e.g. the corresponding key presses are already provided by the user) etc. . . . Changes or confirmation of a word have been described before in detail.

As mentioned before, the speech information provided for the data entry systems of the invention may be based on one of at least one of the user's voice or lip movements. When using a lip reading recognition system of the invention (e.g. wherein the letters of a language are distributed on different keys), speaking isolated characters such as letters with a pause between each character spoken may significantly improve the recognition accuracy of the characters. As mentioned in the references incorporated herein, filed by this inventor, the characters having ambiguously resembling speech relating to each other may be assigned to different keys.

According to one embodiment of the invention, a lip reading recognition system may be used with the combined data entry systems of the invention (e.g. that includes the word predictive systems as described). For example, as mentioned before, for entering a word, a user may enter at least one character of its characters such as at least its first character (e.g. letter) precisely by pressing the corresponding key and speaking the letter. The user then may provide the key press corresponding to the remaining letters of the word. Speaking a letter corresponding to a word and providing the remaining key presses without speaking my provide a laps of time of pause of speech after the speaking the letter. If a user provides consecutive words, there may be (e.g. mostly) a pause between the provided speech of the (e.g. first) letters of the consecutive words. To recognize a (e.g. first) letter spoken, a lip reading recognition system may be used. This may add more discretion to the data entry systems of the invention.

If the system does not recognize/select the user's desired word based on the information provided by the user through this embodiment, then the user may proceed to a correction/selection procedure as described earlier by for example, speaking the word letter by letter or speaking the word. The speech provided for the correction/selection procedure may preferably be recognized based on the user's voice (e.g. Obviously, the speech recognition may also be based on lip reading, specially when the user speaks one or more letters discretely). This is because currently the voice recognition systems are more sophisticated than lip reading systems for recognizing complex speech (e.g. speech of a word, quicker speech, speech of letters without pause). It is understood that in case a sophisticated lip reading system exists, it may be used to recognize the speech based on the user's lip movements.

It must be noted that if a user does not provided a pause when providing a speech relating to a beginning letter of a word (e.g. speaks more than one letter), the lip reading system may consider only the beginning potion of user's speech (e.g. that substantially corresponds to the first letter of the word).

As mentioned before, a word of the dictionary database may also be entered by providing the corresponding key presses without speaking. If the system uses a lip reading system to recognize precisely a letter such as the first letter of a word, it may happen that the system may not be able to recognize if a speech was provided or not at the begging of the word by the user (e.g. may not determine if the user's lips have been moved). In this case a voice recognition system of the invention may also be used to see if there was a speech. Therefore, when intending to speak a letter of a word by providing lip movements only, it may be helpful if the user also provides a speech (e.g. even very discretely, such that the microphone detects that something was the by the user, so that to inform the system to use the lip reading system for recognizing the user's speech).

It is understood that for better accuracy of speech recognition, both voice and lip reading recognitions may be used (e.g. combined).

In case that characters such as letters having ambiguously resembling speech relating to each other are assigned to a same key (e.g. and to a same type of interaction with the key) of a keypad (e.g. a telephone-type keypad), the word predictive data entry system of the invention may consider the words having the same key presses and beginning with any of the ambiguous characters. For example, the speech (e.g. voice or lip movements) of the each of the pair of the letters "d, e", or the pair of letters "j, k", wherein each pair locating on a same key of a telephone-type keypad, may be ambiguous by using a lip reading system or a even a voice recognition system. For example, by using a telephone type keypad used with the combined data entry systems of the invention, in order to enter the word "keep", the user may press the key corresponding to the letter 'k' and speak the word. The user, then, may continue to press the remaining keys without speaking. The system may (e.g. be predefined to) consider also the words starting with the letter "J" and having the same remaining key presses (e.g. "jeep").

Different means such microphone and/or camera (e.g. being implemented within the corresponding electronic device, or used as a peripheral equipment/detachable equipment connected to the electronic device) for the detecting the user's speech may be considered. User's lip movements images detected and analyzed may be 3D (e.g. three dimensional). As mentioned before, other parts of user's face (e.g. such as teeth, chin, etc.) may also considered when speaking. These matters have already been described in detail.

With continuous reference to the touch sensitive keyboard of FIG. 7 and its corresponding embodiments, preferably, the user may precisely provide (e.g. precisely/unambiguously) at least one of the (e.g. beginning) key presses corresponding to the (e.g. beginning) letter(s) of a corresponding word (e.g. without speaking), and may provide the key presses corresponding to the remaining characters of the word ambiguously (e.g. through for example ambiguous keys of a reduced keypad of the invention) as described before in the embodiments. This may provide enough information for the selection of the word (e.g. without the use of speech). It is understood that also providing corresponding speech information based on the principles of the data entry systems of the invention may be considered. As mentioned before, the precise character(s) may be entered by handwriting input and recognition system.

As mentioned before, by using the word predictive data entry system of the invention, a word may be entered by entering precisely/unambiguously at least one of the letters of the word by for example providing a predefined pressing/gliding action on the key corresponding to the letter and providing the speech information corresponding to the letter (e.g. speaking the letter), and pressing/gliding on the keys corresponding to at least one of (e.g. preferably all of) the remaining letters of the word. Obviously, in any of embodiment of the (e.g. predictive) data entry systems of the invention, the pressing/gliding action on corresponding key and the corresponding speech, for entering the at least one precise/unambiguous letter of the word may be replaced by using another precise/unambiguous data (e.g. letter) entry system such as handwriting input and recognition system, full (e.g. pc) keyboard, etc. Also, in correction/selection procedures of the invention, instead of using the user's speech, the user may provide one or more required letters for selecting/correcting/entering a word, by using the another precise/unambiguous data (e.g. letter) entry system such as handwriting input and recognition system, full (e.g. pc) keyboard, etc.

With continuous reference to the combined data entry systems of the invention, the dictionary of (e.g. complete) words of at least one language database and the dictionary of a-portion-of-a-words database of at least one language used with the system may be separate from each other. The system may be predefined to be informed that providing key presses may correspond to the entry of a word of the language, and providing for example a gliding action may correspond to the entry of a a-portion-of-a-word of the language. The system may search the word within the corresponding dictionary database.

It is understood that a combined data entry system of the invention may include any of the databases separately or it may include both of them. These matters have already been described in detail.

It must again be noted that although the "combined" data entry systems of the invention may have been mentioned in various forms in this and the references incorporated herein, filed by this inventor, the system refers to the data entry systems of the invention that combines the press/glide-and-speak data entry systems of the invention, combined with the word predictive data entry systems, based on providing at least some (e.g. preferably all) of the key presses corresponding to the letters of a word for the entry of a word without speaking or with speaking at least one of the (e.g. beginning) character(s) (e.g. letter(s)) of the word. These matters have already been described in detail.

Searching a word within a database of words based on the (ambiguous) key presses (e.g. key press that may correspond to any of several characters/letters assigned to the key) alone, provided for example on a telephone keypad by a user is known since many years. As mentioned, a sequence of key presses provided by the user may correspond to one or more words of the database, wherein usually the word having the highest frequency of use is proposed as a first choice to the user. Different methods are being proposed for accepting the word or selecting another word if the word is not the one that the user intended to enter. According to the most popular word predictive system (e.g. T9) used on a Nokia phone, entering the word "pda" requires seven additional key presses including an end-of-a-word signal such as a space character and a lot of concentration on the display for verifying each next word that the system proposes. Even if the user knows in advance that the word "pda" is one of the lowest prioritized word in the candidate words, he should follow the same steps to select it. Worst is when after navigating between words, the user may recognize that none of the words proposed by the system is his intended word. At this point the user must switch to another method such as the multi-tap system and provide generally multiple taps on each key corresponding to each of the characters of the word for entering the word, In real time situations a large portion of text entered may comprise out-of-dictionary words (e.g. names, addresses, URLs, numbers, punctuation marks, words of another language, abbreviations, formulas, etc.). For that reason, word predictive systems are not used for general data entry in computers such as Tablet PCs or PDAs which really lack a compact quick and easy data entry system. Even in mobile phones, most people still use multi-tap system even it is slow, but the user enters a text character by character and he knows that "what he gets is what he types".

As mentioned before, the combined data entry systems of the invention may extremely minimize and even eliminate additional user's interaction after entering the information (e.g. key presses corresponding to the letters of the word and a speech information corresponding to a word, wherein the speech information may be different type of information such speaking at least part of the word such as speaking at least some of the letters of the word, or speaking the word, or not providing a speech, wherein the speech information is detected and analyzed by the system, These matters have already been described in detail in the references incorporated herein, filed by this inventor) corresponding to a word in the dictionary (e.g. the system may eliminate additional interaction with the keys for the entry of the desired word, and it extremely minimizes and even eliminates the interaction with the display unit because an experienced user may know in advance which words need the corresponding speech and eventually the amount or the type of the speech needed).

Another great advantage of the system is the ability of entry of out-of-dictionary chain of characters such as words. As mentioned before, for example, if after the entry of the information provided by the user the system does not find a chain of characters (e.g. word) within the dictionary database, the user may enter the chain of characters by speaking the characters (e.g. letters) corresponding to the chain of characters without pressing additional keys. As mentioned before, the system may consider the original key presses.

Another great advantage of the system is the ability of entering any arbitrary chain of characters (e.g. proper names, address, numbers, chain of characters including special characters such as punctuation marks, etc.) quickly and easily by preferably, at most one key press per character or simultaneously pressing two keys. For example, if the user knows in advance that the chain of characters (e.g. such as a word in another language or an URL) that he is going to enter is an arbitrary chain of characters that does not exist in the database, he may use a press/glide-and-speak data entry system of the invention (e.g. to for example enter the chain of characters character-by-character) (e.g. by using the character by character data date entry system for example. pressing the keys corresponding to the characters and providing the speech information corresponding to the characters).

Using few keys such as at least four keys (e.g. wherein to four keys of the keys substantially all of the letters of a language are distributively assigned) with the word predictive data entry data systems based on key presses alone will be cumbersome and even impractical because of the large number of corresponding words for a sequence of key presses. The combined data entry systems of the invention permit the use of few keys and a quick and easy data entry system. The advantage of using few keys (e.g. wherein for example, four of them correspond to the letters of at least one language, and wherein for example, the keys are split in two groups each group located on one side of for example a tablet PC) with the data entry systems of the invention have already been described in detail.

Also, the data entry systems based on key presses alone (e.g. without using the benefits of providing at least a minimum amount of corresponding speech information) will be impractical if the dictionary database includes the words of multiple languages because of the large number of corresponding words for a sequence of key presses. The combined data entry systems of the invention permit the use of multiple languages (e,g, within a same database) simultaneously, and a quick and easy data entry system.

Also as described before in detail, substantially all of the special symbols such as a space character, digits, punctuation mark characters, and commands (e.g. "Enter" function) may be entered (e.g. within a chain of character such as a word or independently) unambiguously by providing generally at most one pressing action on a key or simultaneously pressing two keys. In addition to its main purpose, an unambiguous special symbol at the end of the entry of the information corresponding to a word may also inform the system of an end-of-a-word. This may be another great advantage of the combined data entry systems of the invention. After entering the information corresponding to a word, the user may enter a desired symbol such as at least one of the special characters. The special character may be considered as an end-of-a-word-signal by the system. In addition, the system may insert or execute the symbol after the word. (e.g. it must be noted that some the special characters may (e.g. also) used within a word, may be part of the ambiguous characters assigned to a key.

According to one embodiment of the invention, when a user enters a word by using the word predictive systems of the combined data entry systems of the invention, the system may use a system such as a text-to-speech system to provided the selected word to the user. In most cases the word may the desired word, and the user by for example, proceeding to the entry of a next character or a next word may also inform the system of accepting the selected word. If the selected word is not the word that user desired to enter, then, the user may proceed to the selection/correction procedures as described (e.g. by speaking the word or at least some of the characters of the word). This embodiment may provide a completely eye free quick data entry and correction system with no additional key pressing actions.

As mentioned before, according to one embodiment of the invention, the word predictive systems of the combined data entry systems of the invention may use a dictionary of words database wherein the words are arranged such that only one of the words may correspond to a sequence of key presses provided by the user without speaking. Different methods of organizing the database and search within it may be considered such as for example the following different methods:

according to one method of database arrangement, the system may comprise two different databases of words: a first database of words wherein each of the words may correspond to a different sequence of key presses provided by the user in the absence of speech (e.g. each word corresponds to a different key press sequence), and a second database of words wherein each of the words may correspond to a sequence of key presses provided by a user wherein the user also provides a corresponding speech, as described before (e.g. at least one word may correspond to a different key press sequence). If the user provides a sequence of key presses and does not provide a corresponding speech, the system may detect the absence of the user's speech. Then, the system may search for a corresponding word within the first database. There may be at most one corresponding word within the first database. The word may be entered and it may also be printed on a corresponding display displaying the text that the user enters. If the word is the one that the user desires to enter the user may proceed to the next task such as entering a next word. If the word is not the word that the user desired to enter, then, the user may proceed to a procedure of correction/selection such as the ones described earlier. For faster data entry, the user may not proceed to correction/selection procedure immediately after entering the word. He may proceed to the next task such as the entry of the next portion of the text (e.g. the next words), and so on, and he may later proceed to the correction/selection procedures as described earlier.

If the user provides a sequence of key presses and provides a corresponding speech, the system may detect the user's speech, and may search for corresponding words within the second database. There may be one or more words within the second database corresponding to the user's key presses and speech. For example, when a user presses at least one key corresponding to at least the at least one beginning character (e.g. letter) of a word and speaks the at least one letter, and continues to press the keys corresponding to at least some (e.g. preferably, all) of the remaining characters of the word then according to one method of search the system may recognize the at least one letter, and search within the second dictionary of words database, the words that begin with the at least one recognized letter and wherein the remaining characters of the words correspond to the remaining key presses provided by the user. According to another method of search, the system may search within the second dictionary of words database, the words that the characters of the words correspond to the sequence of key presses provided by the user, and wherein their beginning letter(s) correspond to the at least one recognized letter. It is understood that these methods of search are described as examples. Other methods of search may be considered by people skilled in the art.

With continuous description of the current embodiment, there may be one or more corresponding candidate words within the second database. If there is only one corresponding word, then the system may enter it. If there are more than one candidate words, then according to one method, a predefined word among the candidates may be entered. According to another method, one of the candidate words having higher priority relating to the others may automatically be entered (each of the words of the second database of words may have a priority value based on for example, their frequency of use). The word may also be printed on a corresponding display displaying the text that the user enters. If the word is the one that the user desires to enter he may proceed to the next task such as entering a next word. If the selected word is not the word that the user desires to enter, then, according to another method, the user may provide more speech information such as speaking at least some of the remaining letters of the word, the user may proceed to a procedure of correction/selection such as the ones described earlier. It is understood that if the user desires, according to another method, the user may use a switching means such as a select key so that to navigate within the candidate words (e.g. presented to him one by one, for example, based on their frequency of use) until he fined the desired word.

As mentioned before, for faster data entry (e.g. during a meeting), the user may not proceed to correction/selection procedure immediately after receiving an undesired word. He may continue the next task such as the entry of the next portion of the text (e.g. the next words), and so on, and he may later proceed to the correction/selection procedures as described earlier.

It is understood that according to another method, the system may comprise one database of words including the two above-mentioned databases.

According to another method of database arrangement, the system may comprise one database of words wherein each of the words has a priority value for example based on its frequency of use. When a user provides the key presses corresponding to a desired word without speaking, the system may select a word corresponding to the key presses and having the highest frequency of use relating to other words (e.g. if any) corresponding to the same key presses. In this method, in addition to the key presses, if a user provides a speech such as speaking one or more beginning letters of the word, the system may select a corresponding word based on the combined information and having the highest priority relating to the other words that correspond to the combined information. If the word is not the desired word, then the user may proceed to the selection/correction methods as described earlier.

According to another method, the system comprises one database of words wherein each of the words of the database may include or being related to, an additional information (e.g. a flag) indicating their speech situation (e.g. requiring speech (e.g. "1") or not (e.g. "0"). When providing a sequence of key presses if the system does detect a speech it may consider only the words that their speech indicator indicates that "no speech" is required, and vise versa. According to one method, for each sequence of key presses without providing a speech, at most one word may exist within the database. The procedures of the entry and selection/correction may resemble to those described earlier.

As mentioned before, the sequence of key presses provided by the user may include an end-of-the-word signal such as one or more of special symbols such as punctuation mark characters, numeric characters, commends (e.g. "Tab", "Enter"), space character, entering a character such as a letter at the end of the word and speaking the character, etc. Because the symbols are generally entered unambiguously, according to one method, the system may not consider the key presses corresponding to the special symbols among the sequence of key presses, for the searching purpose. After entering the desired word, the system may enter the special symbols. The user may proceed to the next task such as entering the next word without additional key presses.

Also as mentioned before another type of an end-of-a-word signal may be providing the key presses corresponding to the next word and speaking the speech of the (e.g. beginning portion/characters of) the next word. According to one method, the system may automatically provide a space character between the words.

Different correction/selection methods of the combined data entry systems of the invention have already been described in detail.

As mentioned before, in order to change an already entered word, the user may (e.g. first) point to the word. Pointing to the word for replacing the word by another word may be defined such that to not interfere with a pointing action provided for another purpose such inserting a letter after or within a word. For example, the user may select a word by for example a double clicking action a the word, or he may position the cursor after the last character of a word including or excluding its special character such as a space character or a punctuation mark, etc. According to another method, the user may position on any location within a word (at the beginning, inside, at the end), press-and-hold a predefined key and provide the desired speech for selecting/entering another chain of characters (e.g. a word).

In order to provide a minimum amount of speech necessary for entering an unambiguous word, the user, preferably, may speak a first letter of a word. If there are more than one words that match the information (e.g. key presses and the speech), the user may speak the next letter and so on until the system provides the desired word. According to one method, each time the user speaks a letter, the system may indicate the maximum of numbers of speech (e.g. of next letter) required for an unambiguous entry of any of the remaining words corresponding to the information (e.g. key presses and speech) already provided by the user.

Figure 9:
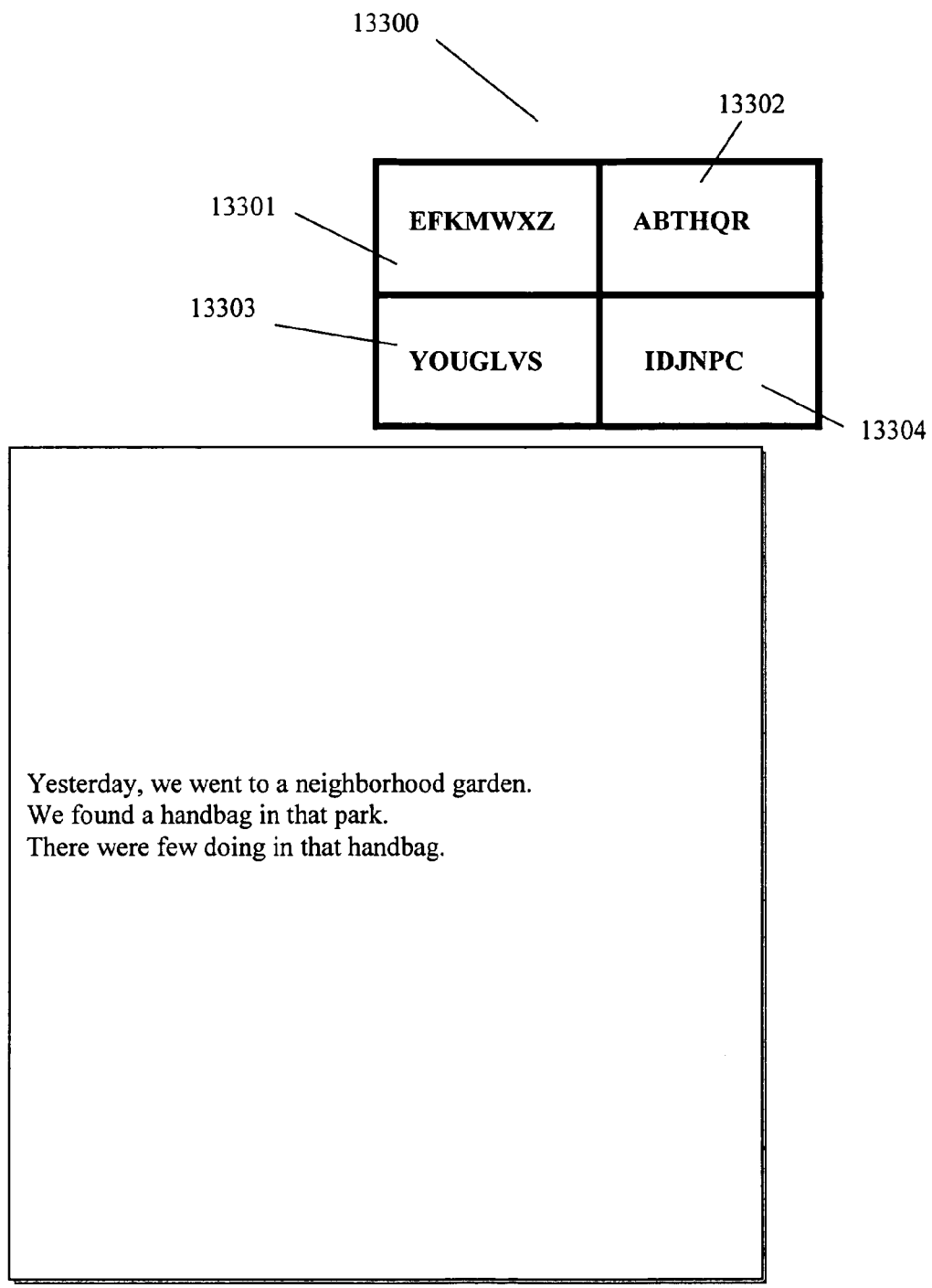
FIG. 9 shows an exemplary keypad and the screen of the corresponding device, in accordance with one embodiment of the invention.

According to another method, to select a word within a document, the user may for example speak the word, or speak at least one of the beginning letters of the word, or press/glide and speak at least one of the beginning letters/portion of the word, or provide one or more pressing actions corresponding to one or more (e.g. beginning) letters of the word without speaking, etc. The system may compare the information provided by the user with the words or the information corresponding to the words within the document to find the desired word within the document. This may be extremely fast and accurate without the need of using a navigating means such as a mouse. For example, by referring to FIG. 9, and considering the keypad 13300 in order to replace the word "doing" by the word "coins", the user may say the word or may say some of the beginning letters (e.g. "do") of the word. The system may compare the speech with the beginning letters of the words within the document to find the word "doing". The system may find more than one word. The user may navigate between the words to reach to the word that he desires to find. Also for example, by referring to FIG. 9, and considering the keypad 13300 in order to replace the word "doing" by the word "coins", the user may, for example, press the keys 13304, 13303 corresponding to two of the beginning letters (e.g. "do") of the word. The system may compare the key pressing actions with the key presses corresponding to the beginning letters of the words within the document to find the word "doing". The system may find more than one word. The user may navigate between the words to reach to the word that he desires to find.

According to one embodiment of the invention, during the entry of a sequence of key presses (e.g. before providing an-end-of-a-word signal) corresponding to a word (e.g. and eventually, providing the speech of at least part of the word), the system may propose the candidate words each time the user provides a new key press. According to one method, when the user enters the last key press, he may proceed to accepting or correction/selection methods of the invention as described before. According to another method, each time a new key press of the sequence is entered, the system may also propose words having more characters than the key presses entered until that moment. The user may select the word without providing the remaining key presses corresponding to the word (e.g. a word completion system).

During pressing the keys (e.g. and speech information, if provided) corresponding to a word, a word completion system may consider (e.g. and propose) the words beginning with the key presses (e.g. and speech). The word having the highest priority may be the one that is printed within the text that the user enters (e.g. and the cursor may locate at the end of the proposes word). if the user continues to enter a new key press (e.g. and speech) and that key press (e.g. and speech) still corresponds to the next letter of the word, then the word (e.g. and the cursor) may remain in the same position. If the next key press (e.g. and speech) does not correspond to the word but corresponds to another word (e.g. or other words) having the same beginning (e.g. key press) information, then the word having the highest priority among them may be printed within the text that the user enters (e.g. and the cursor may locate at the end of the proposes word). At any moment during the key pressing actions (e.g. and speech, if the proposed/printed word is the one that the user desires, he may provides an end-of-a-word signal such as a special symbol as described earlier and proceed to the next task.

It must be noted that although keys have been used to describe different embodiments of the invention, as mentioned many times before in different patent applications by this inventor, any other input means (e.g. user's fingers interactions, motion movements of an electronic device, etc.) may be used for the same purpose (e.g. to duplicate the keys and/or key the key interactions).

As described, the word predictive systems of the invention permit a quick and easy word entry system. According to one embodiment, there may be no priority assigned to any of the words. For each sequence of pressing actions without providing a speech, preferably there may be at most one corresponding word. Any of the other words having the same the sequence of key presses may be distinguished from each other by user's speech corresponding to at least one of the (e.g. beginning) characters of the word or by speaking the word. Even if each of the words have a priority degree (e.g. value) relating to each other, by using this system any of the words may be accessed (e.g. directly) and be entered quickly.

As mentioned, other candidate words having the same (the) sequence of key presses may be distinguished from each other by (e.g. additionally to the key presses, also providing) the user's speech corresponding to the word (as described earlier), or by providing other traditional means or mixture of user's speech and the other traditional means. For informing the user, the other candidate words may be presented to the user in list, or one by one, on a display unit. As mentioned according to another embodiment the other candidate words may not be presented to the user. If the user desires to enter one of the other words, he simply provides the corresponding speech (e.g. as described) without further interaction with the display unit.

As described before, the data entry systems of the invention may be used in many applications such as call directories. As an example, as described in a different PCT patent application, such as PCT/US2002/22385 filed by this inventor, (e.g. text) information provided through one or more appropriate embodiments of the data entry systems of the invention may be used by a corresponding application (e.g. having a database of words or phrases) to provide (e.g. predefined) tasks. For example, the system may be used to:
generate phone calls;
provide input to a call directory;
provide input to interactive call centers;
provide information to a system that provides predefined tasks based on user's (e.g. text) input;
etc.

According to one embodiment of the invention, as an example, a method of entering data such as text within such application may be considered. The method may include as an example, at least one of at least the following steps:
1) the user may provide the key presses corresponding to a text information such as a word, without speaking;
2) if the system recognizes the text (e.g. word) it may proceed to step 4. if not;
3) the system may demand more information from the user such as:
speaking the text (e.g. word), or;
speaking at least some of the letters corresponding to the key presses provided by the user. The minimum number of letters to be spoken to distinguish the text (e.g. word) from other texts (e.g. words) having the same sequence of key presses may dynamically be defined by the system.
If more than one text (e.g. word) within the database correspond to the information provided by the user, the system may ask the user to provide more information. For example, if the system is used to provide a phone call based on the name of to-be-called entity such as a person or a company, the system may for example ask the user more information such as to enter at least a portion of the address of the to-be-called entity such as its zip code, office/home information, etc.
4) After successfully recognizing the user's input, the system may accordingly proceed to the next predefined task.

As an example, as mentioned before, the system may be used with a call directory to for example provide a telephone call based on at least an to-be-called name, or to automatically provide the to-be-called telephone number to the caller, etc.

According to one embodiment of the invention, the user may enter the to-be-called name by using a character by character data entry system of the invention by for example pressing each of the keys corresponding to the letters of that name and simultaneously with each pressing action speaking the corresponding letter.

According to another embodiment of the invention, the user may enter the to-be-called name by using a character by character data entry systems of the invention by for example pressing the keys corresponding to the letters of that name and (if needed or required by the system) after that, he may speak at least one of the letter of the name or he may speak the name. Providing the key information and the speech information in different laps of time may be useful in situations such as when using a touch toned telephone. Pressing a key and speaking simultaneously when using a touch toned telephone may combine the key tone and the corresponding speech, therefore perturbing the recognition system.

For example, if the user desires to call a company called "TheCompany" by for example, using the telephone keypad, according to one method, the user may first provide the key presses corresponding to the letters of the name. If the key presses sequence correspond to only one entry (e.g. name) in the database, the system may proceed to the next predefined task or it may ask for confirmation before proceeding to the next predefined task.

On the other hand, if for example, the user desires to call a company called "TheMarkers", by for example, using the telephone keypad the user may first provide the key presses corresponding to the letters of the name. The key presses may correspond to more than one entry in the database. For example, another entry in the database may be another company's name called "TheMaskers". To distinguish the names from each other, the system may ask the user to provide a speech information such as speaking at least six beginning letters (e.g. "themas") of the desired name so that to define which name the user intends to enter. According to another method, the system may ask the user to speak the name as the speech information.

It must be noted that the processing of the information may be executed locally (e.g. within the telephone) or the system may be installed within a server (e.g. at the call directory promises) and being processed remotely. In this case the key press and speech information may be sent to the server for being processed and the results or additional requests may be sent to the user by the server.

According to one embodiment of the invention, the telephone call may be directed internationally. For this purpose according to one method, the system may include the databases of the to-be-called called entities such as people or companies of at least some countries so that to process the information locally and direct the international call to the destination, while according to another method, the system may use part of the information provided by the user to direct at least part of the information provided by the user to the server of the corresponding country's phone directory for being processed there.

For example, a user may enter the text "Benjamin Ghassabian NY USA". The system may direct the information such as "Benjamin Ghassabian NY" to a corresponding telephone directory of the USA for being processed there. According to another method, the system may direct the information such as "Benjamin Ghassabian" to the corresponding telephone directory of the state of NY in the USA for being processed there. The order of the words in the text may be predefined, or the system may be "intelligent" enough so that to permit providing freely the order of the words within the text.

According to one embodiment of the invention, a predefined signal such as pressing the "#" key before of after the entry of the to-be-called entity may define the purpose (e.g. type) of the key presses (e.g. and speech) provided by the user. For example, pressing a predefined key such as the "#" key before a sequence of key presses may inform the system that, for example, the key presses provided after pressing the "#" key may correspond to entering the name of a to-be-called party, and that after the entry of the name the system may automatically call the other party. Accordingly, for example, pressing a predefined key such as the "*" key before (e.g. or after) a sequence of key presses may inform the system that, for example, the key presses provided after pressing the "*" key may correspond to entering the name of a to-be-called party and that, for example, after the entry of that name the system may provide the other party's phone number (e.g. or other information such as his address, etc.) to the caller. Or vise versa. Still, according to one embodiment of the invention, not providing a predefined signal before or after a sequence of key presses may inform the system that, for example, the key presses provided by the user correspond to dialing a telephone number.

It must be noted that an entry within the database may comprise more that one word (e.g. family name, first name, middle name). According to one method, the user may enter the entry word by word by accomplishing to enter each word by pressing the corresponding keys of the word and if necessary providing the corresponding speech to enter the word, before proceeding to the entry of the next word, while according to another method the user may first provide the key presses corresponding to all of the words of the entry and then provide the speech information necessary for entering each of the word.

The data entry systems of the invention may enhance or even replace the interactive call centers based on voice alone. For example, when a user calls a company, instead of listening to all of the choices that the automatic voice system of the company proposes to the user (which in most of cases it is time consuming and confusing), by having the ability of entering an arbitrary text through the data entry systems of the invention, the user may skip at least some of the steps proposed by the call systems, and directly enter the information that he desires to enter. For example, after calling an automatic call center of a company, the user may ask for a specific support by typing his desire using the data entry systems of the invention. Also for example, if no one is available, the user may enter his contact information such as his name, and/or his address, and/or his telephone number, etc., so that to be (e.g. later) contacted by the company.

It must be noted that embodiments, methods, and examples provided in this patent application are used only for demonstrating the concepts of use of the data entry systems of the invention in a variety of applications. It is understood that other embodiments, methods, and examples based on principles of the data entry systems of the invention, their usage in different applications, etc. may be considered by people skilled in the art.

It must be noted that the embodiment just described may require less speech but they require more user's focus-on/interaction-with the corresponding display. It is understood that as mentioned in other embodiments before, if an initially proposed word is not the word that the user intends to enter, the user may point to that word (e.g. by selecting it in a word processing window) and provide the speech corresponding to (e.g. at least some of) the characters of the word or speaking the word to minimize focusing on the display.

The functions of applications such as call directories, calling centers, automatic answering centers, etc., are known by people skilled in the art. Combining the applications with the data entry systems of the invention provides faster interaction with the systems to achieve a goal, and permits the entry of complex text easily and quickly.

Different procedures of selection/correction of a none-desired word proposed by the system have been described earlier. Another method of minimizing the speech necessary for replacing the none-desired word by another word is described hereafter.

According to one embodiment on the invention, when using the data entry (e.g. including the word predictive) systems of the invention to enter a word, if the word selected by the system is not the one that the user desired to enter, the user (e.g. after pointing/selecting that none-desired word) may begin to speak the characters corresponding to the word one-by-one. For example, after speaking the first character of the word, if a selection of two or more other words (e.g. other than the none-desired word) in the database correspond to initial key presses provided by the user and begin with the spoken character then the system may propose the word within the selection that has the highest priority relating to others words within the selection, to the user. If the proposed word still is not what the user intended to enter the user may speak the following character of the desired word. The system may propose another word (e.g. within the selection) beginning with the two spoken characters. If two or more words begin with the two characters then the system may propose the one having the highest priority to the user. According to one method, if the previous proposed word also begins with the same two characters, the system may ignore it even if the word has the highest priority among those words corresponding to the two spoken characters. The fact that the user proceeds to speaking the next character of the desired word informs the system that the word proposed by the system is not what the user desires to enter. If still the last proposed word is still not the one the user intends to enter, the user may speak the next letter of the desired word and so on.

Figure 10:
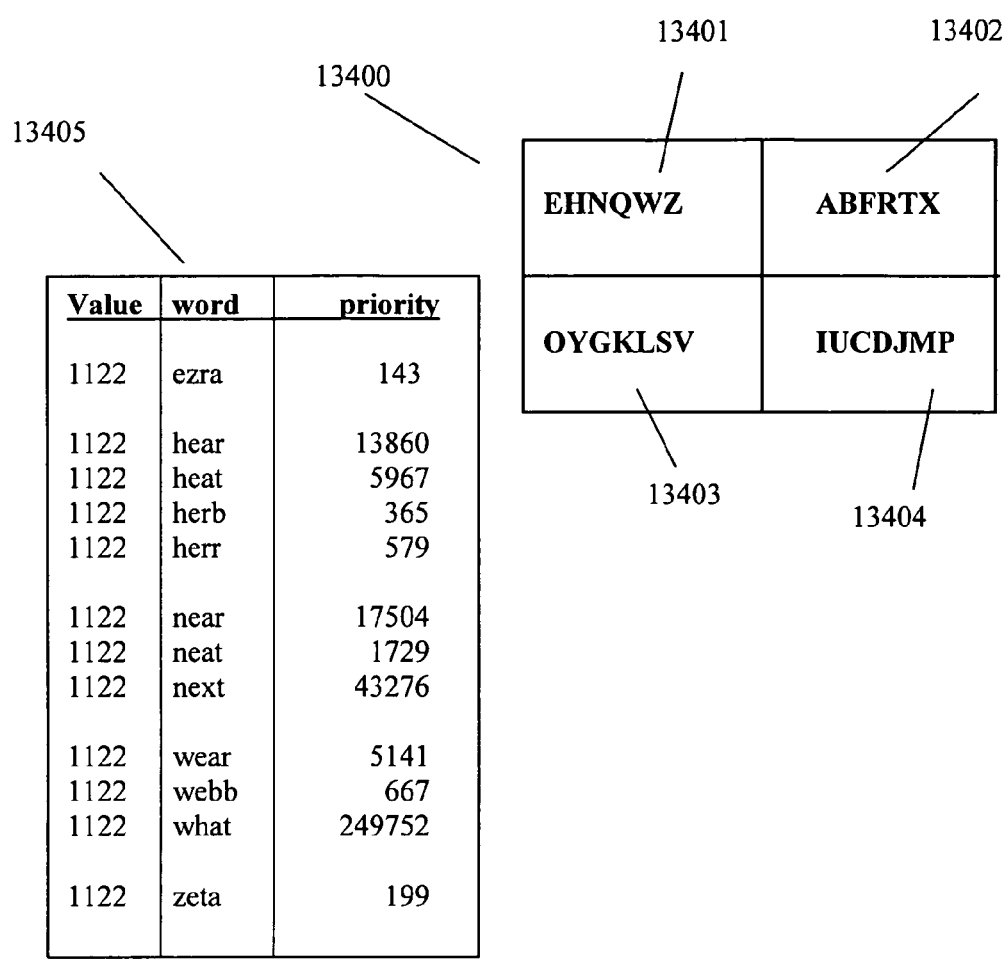
FIG. 10 shows four keys of an exemplary keypad and a portion of a corresponding database of words used with the data entry system, in accordance with one embodiment of the invention.

As an example, FIG. 10 shows a keypad 13400 having at least four keys, wherein four of the keys 13401-13404 of the keypad represent the letters of the alphabet of a language. Values 1 to 4 are accordingly assigned to the corresponding keys 11401 to 13404, respectively. A portion 13405 of a database of words of the system corresponding to a sequence of key presses 13401, 13401, 13402, 13402 (e.g. value "1122") is also shown. In this example, if the user presses the keys 13401, 13401, 13402, 13402, (e.g. key press value "1122") without speaking, the system may be predefined to be select the word corresponding to the key presses that has the highest priority. In this example, the word is the word "what". Immediately after providing the key presses, or later during a correction/selection procedure by pointing to the proposed word (e.g. "what"), the user may speak the letter "n" (e.g. without providing key presses). The system may propose the word corresponding to the initial key presses (13401, 13401, 13402, 13402) that starts with the letter "n" and that has the highest priority relating to the other words that correspond to the same key presses and that begin with the same letter "n". In this example, the word is the word "next". If the word proposed still is not the one that the user intends to enter, the user may speak the following letter, "e", of the desired word (e.g. without providing key presses). According to one method, the fact of speaking an additional character informs the system to ignore the current proposed word (e.g. "next") even if the additional spoken character corresponds to the following character of the word (e.g. "next"). The system may propose the word having the same initial key presses information and that two of its (e.g. beginning) letters matches the corresponding user's speeches and that it has the highest priority relating to the other words that have the same key presses information and that two of their (e.g. beginning) letters match the corresponding user's speeches, by excluding the word(s) already proposed (e.g. "next"). In this example, the word is the word "near". If the word "near" still is not the one that the user intends to enter, the user may proceed to speaking the next character of the desired word, and the systems behaves based on principles described, and so on. In this example, by saying the following letter "a", the system proposes the word "neat" which, for example, is the one that the user intends to enter.

As mentioned before, the data entry systems of the invention such as the predictive data entry systems of the invention may be combined with other data entry systems such as handwriting input and/or recognition systems, multi-tap system, etc.

Figure 11A:
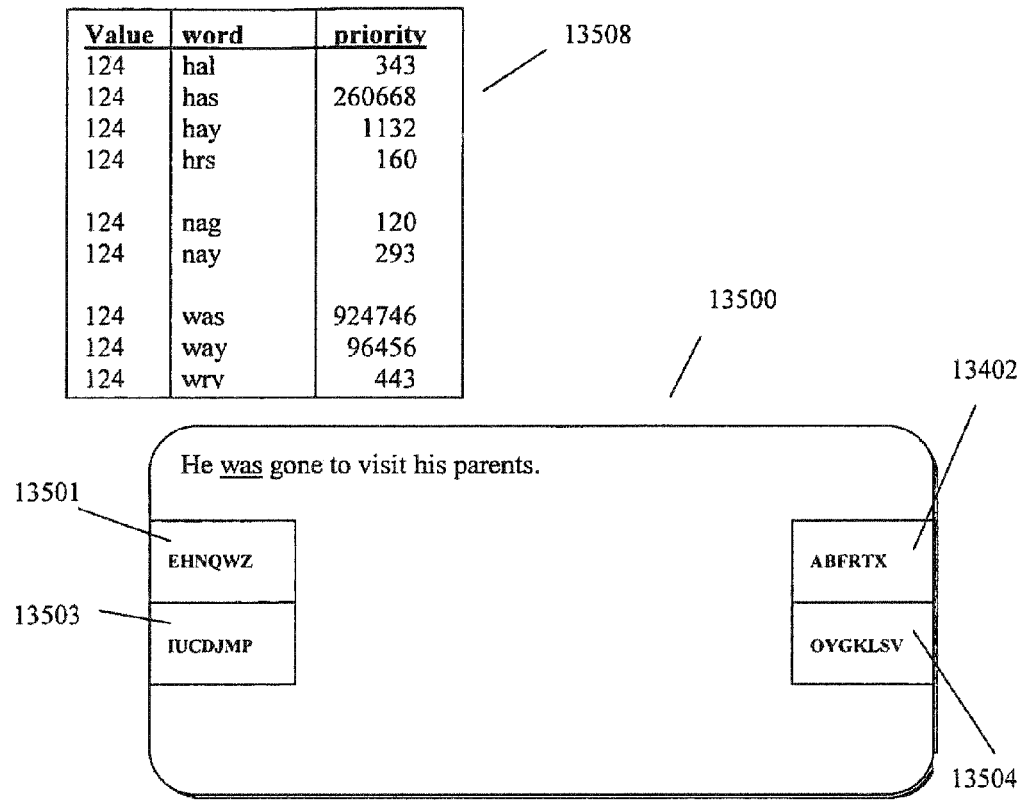
FIG. 11a shows four keys of an exemplary split keypad on an electronic device, and a corresponding database of words used with the data entry system, in accordance with one embodiment of the invention.
Figure 11B:
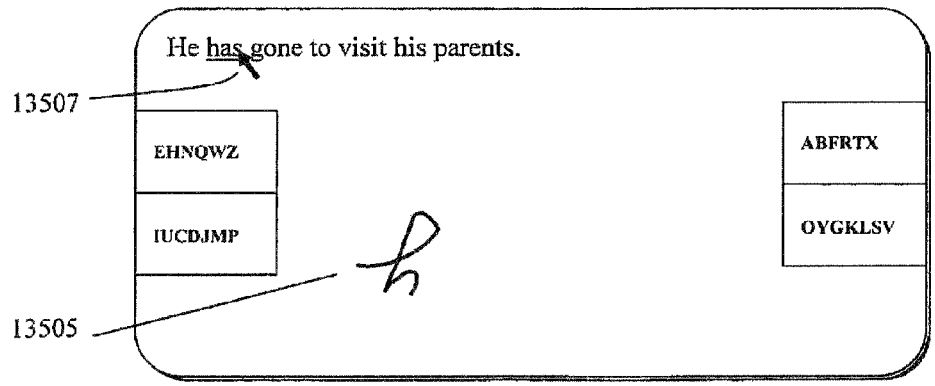
FIG. 11b shows four keys of an exemplary split keypad on an electronic device, and a corresponding database of words used with the data entry system using handwriting and key presses, in accordance with one embodiment of the invention.

For example, a word predictive method of the invention may be combined with a handwriting recognition system so that the handwriting input and recognition system being used either as an additional recognition system or by replacing the speech recognition systems of the invention. For example, a user may enter a word by providing key presses corresponding to the word without speaking. If the word is not the only word corresponding to the sequence of key presses, the user may enter precisely at least some of the (e.g. beginning) characters of the word by using the handwriting recognition system, at a predefined laps of time such as during the entry of the word or during the correction/selection procedure as described before. For example, as shown in FIG. 11*a*, by using the split keypad having at least four keys 13501 to 13504, (e.g. conforming to for example one of the keypads already described) of the Tablet PC 13500, and by considering a portion of the database of word 13508 of the system, in order to enter the word "has", the user may press the corresponding keys 13501, 13502, 13504 without speaking. The system may propose the none-desired word "was" corresponding to the same sequence of key presses and having the highest priority. Then, as shown in FIG. 11*b*, the user may (e.g. at that point/moment, or later by pointing-to/selecting 13507 the word "was") change the none-desired word by, for example, writing at least a number of (e.g. beginning) letters necessary to distinguish the desired word "has" from the other words having the same key presses sequence. In this example providing only one letter "h" 13505 may be enough for replacing the word "was" by the word "has". This is because the word "has" has the highest priority value relating to other words corresponding to the same key presses provided by the user and beginning with the letter "h", within the database. Although this system is slower and may be more frustrating, it may permit data entry and correction without using user's speech. It is understood that according to one embodiment of the invention, the handwriting input and recognition system may be implemented together with the word predictive data entry systems of the invention that also may use speech recognition systems, so that the user according to for example, an environment (e.g. quiet) or situation (e.g. need of quick and easy data entry) may accordingly use any of the data entry systems with the word predictive data entry systems (e.g. that use the keys of the keypad having few keys such as few keys wherein to at least four of the few keys at least the letters of at least a language are assigned) as described.

The example above demonstrates a word correction procedure of the system. Obviously, as mentioned before, the user may enter the hand-written letter(s) during the entry of the word. For example, (e.g. if the user knows in advance that the words "was" and "has" correspond to the same sequence of key presses, and that the word "was" has higher priority) for the entry of the word "has", the user may first write the letter "h", and then press the keys corresponding to the remaining letters "as" of the word.

According to one embodiment of the invention:
pointing to a position relating to (e.g. within) a none-desired text such as a non-desired word and providing a speech such as speaking a desired word or speaking at least some of the characters corresponding to the desired word without providing key presses (e.g. the system may consider the initial key presses that was provided by the user for the entry of the none-desired word), may result in replacing the none-desired word by the desired word, and;

Pointing to a position relating to (e.g. within) a text such as a word provided by the system, and providing a sequence of key presses and providing the speech such as a speech corresponding to the sequence of key presses or speaking at least some of the characters corresponding to the sequence of key presses may result of inserting the corresponding text (e.g. word) in the position relating to (e.g. within) the provided word.

According to one embodiment of the invention, a navigating method for pointing-to/selecting the words of a document (e.g. to for example replace them by other words) may be considered. For example, according to one method (e.g. four) arrows of the data entry systems of the invention may be user to navigate on the words of a document so that to point-to/select a word of the document. According to another method, a forward means and/or backward means (e.g. key) moving a selecting means forward and/or backward over the words, (e.g. selecting word by word) may be used for the same purpose.

According to one embodiment of the invention, during data entry in an environment such as during taking notes in a meeting, the user may decide to enter a portion of a text such as a word, a long word(s), or out-of-dictionary chain of characters such as out-of-dictionary words, or even (e.g. complex) phrases, functions, etc. (e.g. hereafter, "hard-to-be-entered text", at a later time such as after the meeting. For this purpose different methods may be considered such as:

According to one method, the user may inform the system by for example providing a predefined signal such as pressing a predefined key and speaking the "hard-to-be-entered text" such as a word. The system may record the speech and may provide one or more symbols in the corresponding position within the document such that when the user points/selects to the position (e.g. the one or more symbols), the systems may provides the recorded speech to the user so that the user remembers what he had the and accordingly enters the "hard-to-be-entered text" (e.g. word) within the document, by for example:

pressing the keys corresponding to at least some of the (e.g. beginning) characters of the "hard-to-be-entered text" (e.g. word) and speaking the characters or the "hard-to-be-entered text" (e.g. word), or;

entering the word by using handwriting input & recognition systems, or;

etc.

For example, when a user is taking notes, an out-of-dictionary word such as an person's name (e.g. "Alexandrite") may be entered by pressing a predefined key such a the key corresponding to the first letter of the word and speaking the word. By not recognizing the word, the system may provide one or more (e.g. predefined) symbols in the corresponding position within the text, and memorize the speech also corresponding the speech to the position (e.g. to the corresponding one or more (e.g. predefined) symbols), so that when the user points-to/selects the corresponding one or more (e.g. predefined) symbols, the systems provides the user's speech (e.g. recorded audio) to the user, so that the user remembers what he the and accordingly such as as described, enters the text.

According to another method, as described earlier, the user may provide a sequence of pressing actions corresponding to at least some (e.g. preferably, all) of the characters of the "hard-to-be-entered text" (e.g. word) and speaks the text (e.g. word(s)). If the system does not recognize the word it may record the speech and may provide a set of characters such as a sequence of predefined characters such as values of the keys that have been pressed by the user, in the corresponding position within the document such that when the user points/selects to the position (e.g. to the characters), the systems provides the recorded speech to the user so that the user remembers what he had the and he may accordingly enter the text by for example:

speaking the characters one by one without re-typing the keys (e.g. as described before, by considering the memorized chain of characters such as the values of the keys, the system remembers the initial key presses), or;

entering the word by using handwriting input & recognition systems, or;

etc.

For example, when a user is taking notes, an out-of-dictionary word such as a person's name (e.g. "Alexandrite") may be entered by pressing the keys corresponding to the letters of the word and speaking the word. By not recognizing the word, the system may provide predefined symbols such as predefined values of the key presses provided by the user in the corresponding position within the text and memorize the speech also corresponding the speech to the position (e.g. to the corresponding (e.g. predefined) symbols), so that when the user points-to/selects the corresponding (e.g. predefined) symbols, the system provides the user's speech (e.g. recorded audio) to the user, so that the user remembers what he had the and accordingly, enters the text, as described before.

Still according to another method, the user may enter the "hard-to-be-entered text" (e.g. word) by his handwriting either immediately digitized, or by graffiti as is and later either converts it to digitized characters (e.g. print characters) or he may keep them as is in the document.

For example, when a user is taking notes, an out-of-dictionary word such as a person's name (e.g. "Alexandrite") may be entered by for example, using a handwriting input (e.g. and recognition) system. According to one method, the system may provide the text as is in the corresponding position within the document so that if desired, the user may later convert it to digitized characters (e.g. printing characters). According to another method, the system may immediately convert the text to digitized characters (e.g. printing characters).

Other input methods (e.g. providing unambiguous characters) such as an on-screen keyboard or other input methods such as those based on principles of the data entry systems of the invention may also be used to enter "hard-to-be-entered text" (e.g. word).

It must be noted that entire words of any portion of a text may be entered by using the handwriting input and recognition system. Switching to a typing procedure (e.g. pressing keys) may inform the system of the end of the handwriting input procedure of the portion of the text.

It must also be noted that recording the user's speech (e.g. voice) of some of the portions of a text during a data entry may require a small amount of memory but permits a lot of freedom and flexibility to the user.

There are many methods of content search by using a standard PC keyboard. The data entry systems of the invention permit to at least duplicate the functionality of a PC keyboard, therefore they permit to duplicate the content search methods.

The data entry systems of the invention may be used for a general interactive procedure such as a content searching procedure, interactive computing system such as interacting with a PC, interactive TV, etc. For example, the system may be used with a remote control of a Media Center PC for searching and playing movies or songs, answering to questions asked by a sever of a TV channel, interacting remotely with other users of the TV (e.g. through TV messaging), etc.

Figure 12:
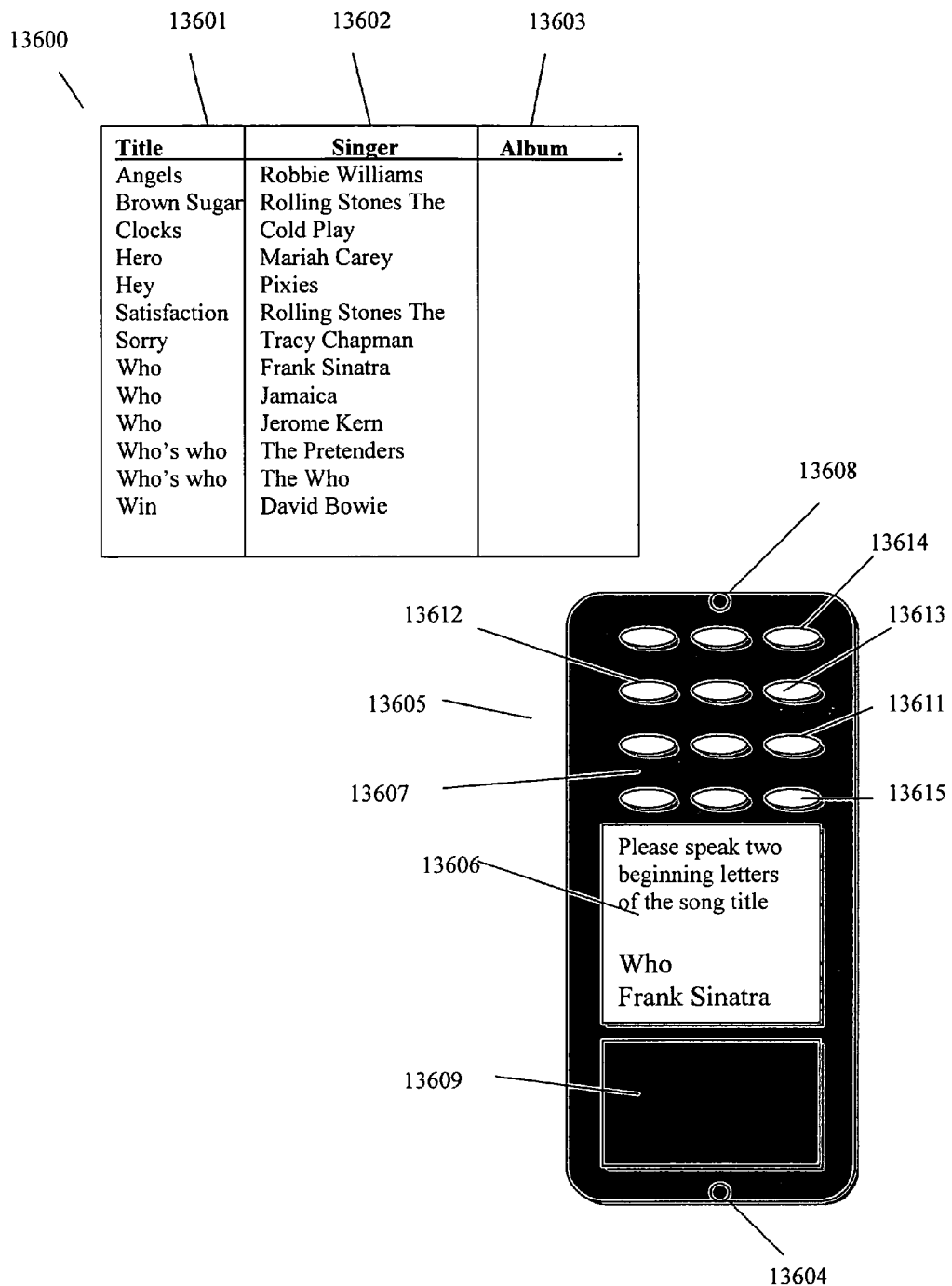
FIG. 12 shows an exemplary media player using the data entry system of the invention for content search, in accordance with one embodiment of the invention.

According to one embodiment of the invention, in order to search a content within a database of contents (e.g. the name of a song within a database of names of songs, the name of a movie within a database of names of movies, the name of a person or company within a database of telephone directory, etc.), the user may use a data entry system of the invention. The content may be comprised of one or more chain of characters such as one or more words. Each of the contents may be comprised of different fields wherein each of the fields may include one or more chain of characters. For example, FIG. 12 shows a portion 13600 of a database of names of songs. For example, each record corresponding to a song may include several fields such as the title of a song 13601, the singer 13602, the album 13603, etc. each of the fields may include one or more words.

Because the data entry systems of the invention use a keyboard having few keys wherein to at least one of the keys more than one letter of an alphabet is assigned, different methods of input for searching a content may be considered such the ones described hereafter.

According to a first method, the user may enter all of the characters of at least one of the fields by providing the key presses corresponding to the characters and if necessary provide the speech corresponding to the key presses (e.g. speaking the characters corresponding to at least some of the key presses, or speaking the desired word(s) that the key presses represent). The speech may be provided simultaneously with the key pressing actions or it may be provided after the key presses are entered (e.g. for example, the speech may dynamically be required by the system after processing the key presses) This method may usually require more key presses for finding a content.

According to a second method, the user may enter part of the characters of at least one of the fields by providing the key presses corresponding to the characters and if necessary provide the speech corresponding to the key presses (e.g. speaking the characters corresponding to the key presses, or speaking the words that the key presses are related to). The speech may be provided simultaneously with the key pressing actions or it may be provided after the key presses are entered (e.g. for example, the speech may dynamically be required by the system after processing the key presses) This method may usually require less key presses but more speech, for searching a content.

For example, if a user desires to listen to a song on a music player device that is related to a Media Center PC, the user may for example, enter the at least some of the characters of the title of the song through the data entry systems of the invention by for example, pressing the keys corresponding to at least some of the (e.g. preferably the beginning) characters of at least the title of the song. Preferably, the user may also enter the at least some of the characters of at least another fields such as the name of the singer of the song through the data entry systems of the invention by for example, pressing the keys corresponding to at least some of the (e.g. preferably the beginning) characters of the singer. Between the two sequence of key presses a delimiting signal such as pressing a predefined key may be provided.

The system may search within the fields of the titles of the songs of the database to find the titles that correspond to the key pressing sequence (e.g. value) provided by the user corresponding to the title of his desired song. The system may find one or more titles corresponding to key presses provided by the user relating to the desired title. If the system finds only one title that matches to the user's corresponding key presses, then the system may proceed to the next task such as selecting the song and sending it to the user's playing apparatus for being played. According to one embodiment the next task may be asking the user to confirm the song that is selected by the user, etc.

If there are more that one titles that correspond to key presses provided by the user relating to the desired title, then the system selects the titles and searches within the singer fields of the selection the name of the singer(s) that match to the corresponding key presses provided by the user (e.g. the second sequence of key presses). If the system finds only one song that matches to the user's corresponding key presses, then the system may proceed to the next task such as selecting the song and sending it to the user's playing apparatus for being played. According to one embodiment the next task may be asking the user to confirm the song that is selected by the user, etc.

If there are more that one titles that correspond to key presses provided by the user relating to the desired title and singer, then the system may ask the user to provide more information such as for example, speaking the characters corresponding to at least some of the key presses provided by the user for the entry of the title and/or the singer, providing key presses (e.g. and speech) corresponding more characters of any of the fields or other fields such as the name of the album, a portion of the words of the song, etc.

It must be noted that although the example just described refers to searching a song, the searching method may be applied to any type of content. For example, a movie database may include different fields such as movie title, at least one actor of the movie, director of the movie etc. According to another example, a calling directory database may include different fields such as the surname of a person, the first name of the person, his address, zip code, etc. Also the searching method that described above is only an exemplary method that shows the efficiency of the data entry systems of the invention such as the predictive data entry systems of the invention combined with the press/glide and speak data entry systems of the invention and their ability to be used in different application. As mentioned, many types of content searches may be considered by people skilled in the art. For example, according to another method of search, based on the principles of the predictive data entry systems of the invention, if a user provides a sequence of key presses corresponding to for example the title of a movie and the key presses correspond to the name of two or more movies of the database then the system may ask for more information such as asking to provide a number of (e.g. beginning, middle, or ending) characters such as the letters of the title of the movie (e.g. as described before). According to different systems, for example by using user's speech or by (e.g. hand) writing the characters, the user may enter the characters. If the information provided by the user correspond to at least two movies, the system may ask for more information such as at least a (e.g. beginning) portion of the name of one of the actors of the movie, wherein the user may provide the information by for example providing the same procedure used for providing the title of the movie, etc.

It must be noted that as mentioned, the content search as described may be used for a general purpose search and interaction, and that although searching a movie was mentioned as an example, the searching or interacting procedures may be applied with any content such as searching songs, responding to question, asking questions, entering text, etc.

An example is hereafter provided by referring to FIG. 12 wherein a remote control 13605 having a telephone type keypad 13607. The remote control may have a speaker 13608, a microphone 13604, a writing pad 13609, a display unit 13606, etc. The FIG. 12 also shows a portion of a database of songs 13600 as described before.

According to one method of search, the user in order to enter the name of the song "who" interpreted by Frank Sinatra, the user may for example, respectively press the keys 136011, 13612, 13613 corresponding to the word "who". The user then may provide a delimiting signal such as pressing the "#" key 13615, and presses the key 13614 corresponding to the letter "F" (e.g. the beginning character of the chain of characters "Frank Sinatra") corresponding to the name of the singer. The system may compare the pressing actions with then corresponding fields. In this example, there are two entries (e.g. songs) that correspond to the key presses provided by the user:

"Who", interpreted by Frank Sinatra, and;
"Win", interpreted by David Bowie

The system may recognize that first letters of the two songs are similar (e.g. the same letter "W"), therefore the system may dynamically decide and ask the user to speaking at least two beginning letters of the title so that to be able to recognize which song the user desire to select. It is understood that instead of the speech the system may ask for other information such as speaking the second character or the last character of the song title, pressing the key corresponding to the surname of the singer (e.g. and speaking if needed), or other information as described before.

Figure 13:
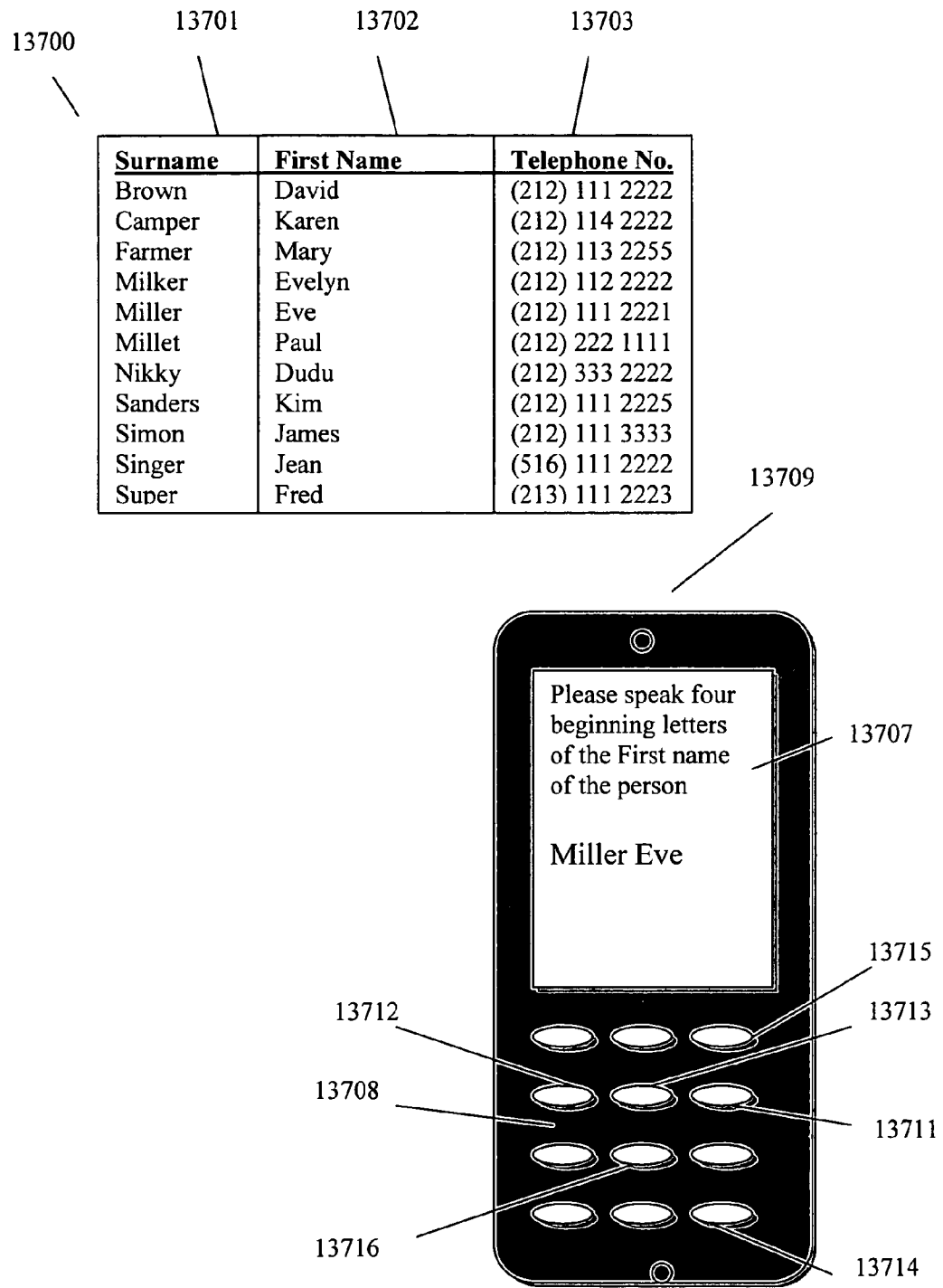
FIG. 13 shows an exemplary telephone using the data entry system, in accordance with one embodiment of the invention.

Another example relating to a content search within a telephone directory (e.g. for asking a telephone number or placing a call) is demonstrated by considering the FIG. 13, wherein a portion of an exemplary database of a telephone directory is shown. For example, if a user desires to require the telephone number of "Eve Miller" by using the keypad 13708 of the telephone 13709 by calling an automatic telephone directory, the user may for example, providing three key presses 13711, 13712, 13713, corresponding to three beginning letters "mil" of the surname "Millet", follows by a delimiting key press such as pressing the pound key 13714, and providing two key presses 13715, 13716, corresponding to the two beginning letters of the First name "Eva" of the person. As described, based on the principles of the data entry systems of the invention, the system may recognize that there are several entries within the database that correspond to the key presses information, such as:

| | | |
|---|---|---|
| Milker | Evelyn | (212) 112 2222 |
| Miller | Eve | (212) 111 2221 |
| Nikky | Dudu | (212) 333 2222 |

By analyzing the selection, the system may ask the user to enter speak at least four beginning letters (e.g. or last two letters) of the surname of the desired person.

It must be noted that as described before, the instead of pressing the keys and waiting the user's instructions such as providing required speech, the user may press the keys and provide the corresponding speech (e.g. simultaneously, or immediately after providing the corresponding pressing action) so that to enter the chain of characters based on for example, the character by character press/glide-and-speech data entry systems of the invention.

It must be noted that according to one embodiment of the invention, the selected entries of the database based on the information (e.g. key presses and/or speech may be provided to the user on the screen of a corresponding electronic device, so that the user decides what additional information to provide for selecting the desired entry.

If a field within an entry of the database includes more than one word (e.g. a space between the words), the user may provide the space character by for example pressing a predefined key such as the "*" key a predefined number of times. It mist be noted that the contents within the fields may correspond any symbol such as numbers, etc. also it must be noted that searching procedure may be dynamically executed after the entry of each information such as each pressing (e.g. and speaking) action. Also, according to one method, the (e.g. additional) information required-by/provided-to the system may be speech alone (without a corresponding key press) such as speaking the last character of a word for which no key press has been provided.

It must also be noted that the content database such as the list of the songs, movies, etc., and their corresponding information such as the name of the singers, the name of the actors, etc., may be available locally such as within the Media Center PC of the user, or it may be available within a remote location such as the server of the service provider such as a cable TV or a satellite TV company, or a server of a company or person accessible through the Internet, etc.

A credit card number usually has a predefined number of digits. Each of the digits may be from 0-9. when a user purchases an article through a telephone call, he may pay the article by entering his credit card number through the keys of a touch tone phone. There is only one tone per key in a touch tone phone. By using the data entry systems of the invention that permits the entry of any symbol (e.g. of a PC keyboard) through a telephone (e.g. pressing a key and speaking the symbol), a type of credit card number including at least alpha-numerical characters may be considered making it more secure and permitting the entry of the number even through a touch tone telephone.

According to one embodiment of the invention, when using the predictive data entry systems of the invention for entering text, the words wherein their corresponding sequence of key presses may correspond to more than one word within the word database of the system may be highlighted (e.g. written in another color, underlined, bolded, etc.). For example, (e.g. at a later time) if a user desires to replace a none-desired word proposed by the system by his desired word, to find the non-desired word, he may focus on (e.g. search within) the highlighted words only.

As mentioned before, at least on a digitizer such as the display of a Tablet PC, at least some of the special characters such punctuation mark characters may be assigned to interactions (e.g. with the soft/virtual keys of the corresponding keypad, or by fingers and/or finger caps duplicating the keys and/or interactions with the keys) that include gliding actions. These matters are described in detail in this patent application and the references incorporated herein, filed by this inventor. For example, a predefined punctuation mark character may be assigned, to a gliding action on its corresponding key combined with a predefined speech information, and/or to pressing-and-holding a first predefined key and pressing the corresponding key combined with a predefined speech information.

As mentioned before, language rules may be used for enhancing any of the data entry systems of the invention. For example, by considering the portion of the database 13508 and the keys 13501 to 13504 of the keypad of the FIG. 11*a*, when entering a phrase such as "there is no way" by pressing the corresponding keys without speaking, the system may enter another phrase "there is no was" (e.g. "was" has higher priority that "has"). By using a system that includes language rules, because the word "way" is the only word among the words of the database corresponding to the key presses provided for the entry of the word "was", that makes sense within the phrase, the result provided by the system may automatically be modified to "there is no way".

As mentioned before, a word of the database of words of the system may be either an entire word or it may be a portion (e.g. beginning, middle, ending) of an entire word. Also as mentioned after each key (e.g. pressing) interaction (e.g. and the corresponding speech if there has been any) information provided during the entry of a word by using the predictive data entry systems of the invention, the system may consider a corresponding word that its beginning characters (e.g. or its entire characters) correspond to the key (e.g. press) interaction (e.g. and the corresponding speech, if any) information provided by the user (e.g. until that moment).

According to different principals and/or methods of presentation of a chain of characters corresponding to the key presses (e.g. and the corresponding speech if there have been provided) information during the entry of a word may be considered.

Figure 14:
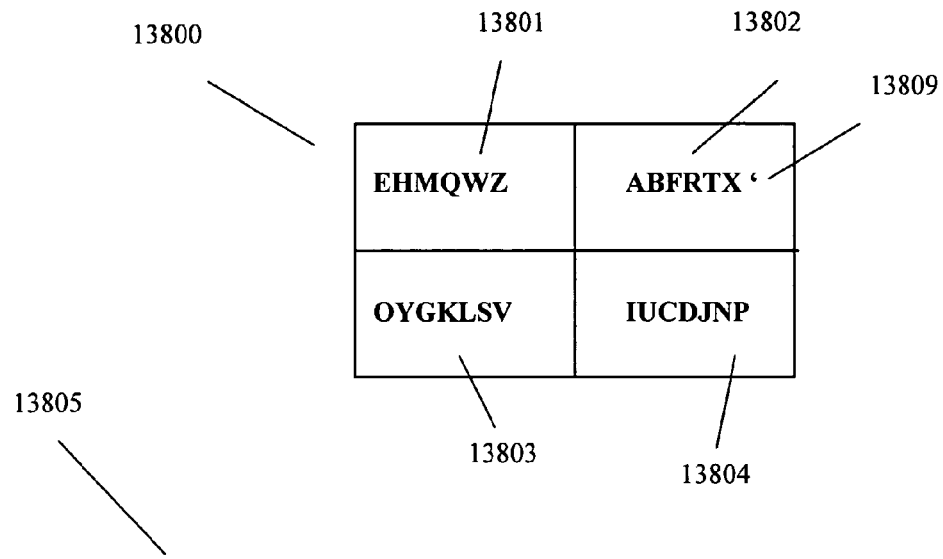
FIG. 14 shows four keys of an exemplary keypad and a corresponding database of words used with the data entry system, in accordance with one embodiment of the invention.

According to one embodiment of the invention, after each key press (e.g. and the corresponding speech if there is provided any) information provided by the a user during the sequence of key presses (e.g. and speech, if there is any) information provided by the user for the entry of a word, the system may present to the user the word having the highest priority among the entire words wherein all of the characters of each of the words correspond to the sequence of information provided by the user. If the system does not find such a word then the system may present to the user the word having the highest priority among the words wherein a predefined portion (e.g. such as preferably the beginning characters) of the words correspond to the sequence of information provided by the user. By considering the keypad 13800, FIG. 14 shows as an example a table 13805 that demonstrates several (e.g. beginning) steps of proposing the chains of characters corresponding to the beginning portion of the sequence of information (e.g. in this example, key presses only) provided by the user during the entry of the word "information", according to this method.

According to another embodiment of the invention, after each key press (e.g. and the corresponding speech if there is provided any) information provided by the user during the sequence of key presses (e.g. and speech if there is provided any) information provided by the user for the entry of a word, the system may present to the user the word having the highest priority among the words wherein at least a portion (e.g. such as at least the beginning characters, or the entire characters) of the words correspond to the sequence of information (e.g. key presses, and the corresponding speech if any is provided) provided by the user. By considering the keypad 13800, FIG. 14 shows as an example a table 13806 that demonstrates several (e.g. beginning) steps of proposing the chains of characters corresponding to the beginning portion of the sequence of information (e.g. in this example, key presses only) provided by the user during the entry of the word "information", according to this method. According to this method, at any moment if the user provides an end-of-the-word signal (e.g. such as a space character) and wherein the proposed chain of characters is a (e.g. beginning) portion of a word (e.g. having a longer chain of characters) (e.g. in other words, the chain of characters being an uncompleted word) then the system may consider the words of the database wherein the (e.g. key presses, and speech if any is provided) information provided by the user corresponds to all of the characters of each of the words and may propose for example the word having the highest priority among the words. In the example of 13806, if after three key presses the user provides an end-of-the-word signal (e.g. such as a space character) the system may replace the chain of characters "int" (e.g. the beginning characters of the word "into") by the word "put" (e.g. having the highest frequency of use among the words that the information provided by the user corresponds to all of the characters of each of the words).

According to one embodiment of the invention, during providing the sequence of information, if the user enters one or more precise characters, then:
  according to one method, the system may keep the other characters as is, and adds the precise characters to the end of the other characters
  according to another method, the system may combine the information provided for the entry of the other characters and the one or more precise characters and compares them with the words of the database to provide a corresponding word. If there are no corresponding words, then the system may keep the other characters as is, and may add the precise characters to the end of the other characters.

It must be noted that the chain of characters may be entered by any (e.g. or combination) of the data entry methods of the invention such as character by character entry, portion-of-a-word/word entry, predictive entry, etc. As mentioned before in detail, each of character (e.g. by character) entry or portion-of-a-word/word (e.g. portion-of-a-word/word) entry, may be assigned to a different type of input signal such as providing a different interaction with the corresponding key(s). For example, according to one method, a character/letter entry may be provided by a single-pressing action on the key corresponding to the character and providing the corresponding speech, and a portion-of-a-word entry may be provided by a gliding action on the corresponding key (e.g. the key corresponding to the portion-of-a-word) and providing the corresponding speech. Also for example, according to another method, a portion-of-a-word entry may the provided by pressing two keys (e.g. pressing a shift key and a key corresponding to the portion-of-a-word) and providing the corresponding speech. These matters have already been described in detail. As an example, as shown in FIG. 14, by considering the keypad 13800, in order to enter the word "revolutionize", the user may first provide information including the key presses corresponding to the beginning characters "revolu" (e.g. at least some of the key presses may be provided without speaking the corresponding speech) of the word "revolution" (e.g. without speaking). He, then, may provide second information including a gliding action on the key 13802 and providing the speech of the portion "tion" (e.g. by saying "shen"). The system may combine the first and second information and compare it with the words of the database and output the word "revolution". Then the user may provide third information including a gliding action on the key 13804 and the speech of the portion "ize". The system may combine the, first, second, and third, information and compare it with the words of the database. The system may not find a word corresponding to the combined information. In this case the system may output the chain of characters (e.g. the word) "revolution" as is, and may attach the portion "ize" to the end of it to provide the chain of characters/word "revolutionize". Integrating the portion by portion data entry systems of the invention with the predictive data entry systems of the invention may, accelerate the speed of the data entry systems of the invention, require less key press and less speech, minimize the spelling errors of the user, etc.

It must be noted that as described before in detail, according to another embodiment of the invention, character by character entry or portion-of-a-word/word entry, may be assigned to a same input signal such as providing a same interaction with such as providing a single-pressing action on the corresponding key(s).

It must be noted that as described before in the references incorporated herein, filed by this inventor, according to one embodiment of the invention, a portion of a word may be entered by providing the key presses corresponding more than one letter such as all of the letters of the portion and speaking the portion. For example, in order to enter the portion "tion", the user may press the keys 13802, 13804, 13803, 13804, and say the portion (e.g. by saying "shen").

According to one embodiment of the invention, during the entry of the information provided by the user for the entry of a word by using the predictive data entry of the invention, the system may not print the chain of characters proposed by the system until there is only a unique chain of characters corresponding to the information that corresponds to at least one of the words of the database. This may eliminate the screen fluctuations. According to one method, until then, other predefined symbols such as for example corresponding key numbers may be printed on the screen.

As mentioned before, the data entry systems of the invention such as the predictive data entry systems of the invention may be combined with other data entry systems such as handwriting input and/or recognition systems, multi-tap system, on-screen (e.g. QWERTY) keyboard, etc., to enter precisely at least one or more characters of a word. The other data entry systems may be used by any of the methods (e.g. embodiments) of the data entry and/or replacement/correction system of the data entry systems of the invention. For example, in the corresponding embodiments of the invention, instead of entering one or more characters of a word/portion-of-a-word, by a handwriting entry/recognition system or by pressing a key corresponding to a letter and speaking the letter, the user may enter the one or more characters of a word by using a virtual (e.g. QWERTY) keyboard. These matters have already been described in detail.

As mentioned before, according to one of the correction methods of the invention, when a user points to a non-desired word and provides a speech for replacing the word by a desired word, the speech may be speaking one or more letters of the desired word.

According to one embodiment of the invention, when a user points to a non-desired word and provides a speech for replacing the word by a desired word, the speech may be, predefined to be one of at least either speaking one (e.g. predefined as the first or last or middle) letter of the word, or speaking all of the letters of the desired word. This may significantly augment the accuracy of the system. According to one method, the system may consider both hypotheses and provide the best matched word accordingly. Because in most cases providing the first letter of a word is enough for correcting/replacing a non-desired word, the user as the first attempt may, preferably, speak one (e.g. beginning) letter of the desired word. If the system still provides another non-desired word that corresponds to the user's speech, then, the user may provide another correcting/replacing attempt by for example again pointing to that undesired word and speaking all of the letters of the desired word. It is understood that as described in detail previously, according to another method any number of characters of the desired words may be spoken for correcting/replacing a word during the correcting/replacing procedure.

During the data (e.g. text) entry, typing (e.g. key interaction) errors may occur. When using the productive data entry systems of the dissection, this may result the system to either consider erroneous word or to not find a corresponding word. The user may use an erasing means such as a "back space" key to delete the key (e.g. press) interaction (e.g. and the corresponding speech, if there has been provided any). It must be noted that according to one embodiment each "back space" action may delete the last key (e.g. press) interaction (e.g. and the corresponding speech, if there has been provided any) and the corresponding one or more characters. The system may consider the words corresponding to the remaining key presses (e.g. and speeches) information. According to one method, the system may print the corresponding characters of the candidate word. According to one method, the user then may provide pressing action(s) (e.g. and if desired the corresponding speech) corresponding to the remaining characters of the word. By considering the remaining initial information and additional information provided after the back space procedure, the system may predict the corresponding word(s).

A special back space means such as a special back space command assigned to a key for deleting more than one character has been described in the references incorporated herein, filed by this inventor. According to one embodiment of the invention, a special back space command of the invention may be used with the predictive data entry systems of the invention. According to one method providing a special back space action (e.g. to providing a corresponding interaction with such as a pressing action on the key to which the special back space command is assigned) may erase the last completed or uncompleted word (e.g. before the cursor) entered by a user. Each additional special back space action may erase an additional last completed or uncompleted word (e.g. before the cursor).

According to another method providing a special back space action may erase the last chain of characters (e.g. before the cursor) corresponding to user's corresponding one utterance (e.g. including key, and speech (if any was provided) information). Each additional special back space action may erase one additional last chain of characters (e.g. before the cursor) corresponding to another user's utterance (e.g. including key, and speech (if any was provided) information). A user's utterance (e.g. including key, and speech (if any was provided) information) may correspond to providing the information between two predefined laps of times. The utterance may correspond to a letter, a chain of characters such as a portion of a word, a complete word, or to a chain of characters including at least one word and at least one portion of another word, etc. the chain of characters may also include special characters.

As mentioned before, according to one method of the predictive data entry systems of the invention using a word/portion-of-a-word data entry systems of the invention, an interaction with a corresponding key (e.g. and providing a corresponding speech) may provide/output the corresponding chain of characters. According to one embodiment of the invention, (e.g. when the cursor is located at the end of the chain of characters) a single "back space" (e.g. a regular or a special "back space" depending on user's and/or the system's designer definition) may erase the chain of characters. According to one method, if there are one or more special characters such as space character or punctuation mark character after the chain of characters and the cursor is located after the special characters, then the special characters may also be erased.

Words of the dictionary database may comprise any special characters such as punctuation mark characters. For example, by considering FIG. 14, in order to enter the word "don't" (e.g. existing in the database), the user may press the keys 13804, 13803, 13804, 13802 (e.g. containing the apostrophe character 13809), 13802, and provide a corresponding speech if desired/needed.

According to one embodiment of the invention, pressing a "shift" key before or during the entry of a word through the predictive data entry systems of the invention may result in capitalizing the corresponding (e.g. the first) letter of the word. According to another method, the user may press (e.g. and hold) a shift key and press a key corresponding to a (e.g. first) letter of a desired word that is being entered through the predictive data entry system of the invention and speak the letter. The user then (e.g. may release the holding key) may provide the key presses corresponding to the remaining characters of the word. The letter may be capitalized within the word. According to another method, instead of the pressing action, a gliding action on the corresponding key (e.g. and the corresponding speech) may be predefined to be provided for the same purpose. Obviously, when providing the key interaction, if the user does not provide a corresponding speech, the system may consider the key interaction as an ambiguous key interaction and the corresponding letter within the predicted word(s) may be capitalized.

According to one embodiment of the invention, one or more characters within a word may be deleted or changed.

According to one method, the system may consider the key interaction (e.g. and speech) information of the modified word and compares it with the words of the database to provide a corresponding word (e.g. as described in detail). According to another method, the system may keep the new chain of characters (e.g. word) as is.

It must be noted that although in many embodiments of the invention keys are mentioned as input means for providing input signals, obviously any other input means (e.g. finger interactions on a touch screen, finger caps, etc.) may be used for inputting the input signals.

According to one embodiment of the invention, (e.g. at any moment) during the entry of the information corresponding to a word a user may desire to replace one more of the beginning characters (e.g. letters) of the corresponding chain of characters proposed by the system (e.g. by other character(s) having the same corresponding key interactions). Without providing key interactions or by using a predefined means such as a predefined key, the user may speak the one or more characters. According to one method, by considering the modified characters and the information that was provided for the rest of the chain of characters and based on comparison with the database of the system, the system may consider one (e.g. or more) new candidate chain of characters (e.g. word) and propose it to the user.

According to one embodiment of the invention, for modifying one (e.g. or more) character of a chain of characters such as a word (e.g. by other character(s) having the same corresponding key interactions), the user may place the cursor at a predefined position relating to the character and provide the speech corresponding to the desired character(s).

According to one embodiment of the invention, during the correction/replacing procedure of the predictive data entry systems of the invention, by using a predefined means such as a key the user may inform the system that the speech (e.g. speaking one or more letters) that he provides for the correction/replacing the corresponding proposed word relates to a predefined zone of the word such as the ending zone of the word.

According to another embodiment of the invention, during the correction/replacing procedure of the predictive data entry systems of the invention, by using a predefined means such as selecting/pointing-to a portion (e.g. one or more letters) of the word the user may inform the system that the speech (e.g. speaking one or more letters) that he provides for the correction/replacing the corresponding proposed word relates to the portion of the word. The portion may be any portion of the word, and the (e.g. selecting/pointing) means may be any means for selecting a portion of the word or pointing to the portion the word. According to one method, the user may point to a location within a chain (e.g. proposed chain) of characters such as a completed or uncompleted word (e.g. by positioning a cursor at the location) and the system may be predefined to select all or some of the characters of the chain of characters before and/or after (e.g. as designed) the cursor. The user then may provide the desired speech corresponding to the selected portion. According to one method, the system may consider the modified characters and the key (e.g. presses) interactions information of other characters of the chain of characters (e.g. and the corresponding speech if any was provided by the user) for modifying the entire chain of characters accordingly (e.g. considering corresponding candidates and proposing one of them as described in detail).

It is again noted that although in some paragraphs the beginning of a word is mentioned for the corresponding information provided by the user for the entry of precise character(s), obviously any portion of a word and the corresponding user's information may be considered for the entry of the word based on the principles of the combined data entry systems of the invention.

Also, it is again noted that although in some paragraphs only key presses are mentioned as the information provided or considered by the user, obviously based on the principles of the data entry systems of the invention the information may include the user's corresponding speech if there has been provided any.

The data entry systems of the invention (e.g. such-as/including the predictive data entry systems of the invention) may use several languages simultaneously. For example, the speech of more than one language may be assigned to a symbol such as a (e.g. Roman) letter, a word, a potion-of-a-word, etc., of the data entry systems of the invention. As an example, to each of the letters of the Roman alphabet that are assigned to the keys of a keypad, the speech of the letter in two or more languages may be assigned. For example, to each of the letters the speech of the letter in two languages such as English and French may be assigned. For example, the letter "z" may be pronounced "z iy" or "z eh d", accordingly. The multi-lingual data entry system of the invention may also include the (e.g. word) predictive data entry systems of the invention and comprise a database of words including the words (e.g. and a portion-of-a-words) of multiple languages or it may comprise multiple databases of (e.g. words) (e.g. and a portion-of-a-words) of multiple languages such as for example, English, French, etc. In order to not considering other languages by the system while entering data (e.g. such as text) in one of the languages (e.g. for augmenting the accuracy of the data entry), different embodiments may be considered.

According to one embodiment of the invention, a means such as a key or user's (e.g. voice) command may be used to switch from a language to another.

According to another embodiment of the invention switching between languages may be done automatically by the system. According to one method, when a user enters a symbol (e.g. such as a letter, word, etc.), by interacting with a corresponding key and providing the corresponding speech, the speech may be recognized by the system as being a speech corresponding to one of the languages. The system, then, may switch to the language and may not consider the other languages until the user provides the speech of a symbol in another language. For example, in order to enter the phrase "my mother in English means ma mere in French", by using for example the word predictive data entry systems of the invention, the user may, first, enter the first part "my mother in English means" as usual by one of the data entry systems of the invention. He then may enter the word "ma" (e.g. a French word) by pressing the keys corresponding to the word and providing the speech (e.g. in French) corresponding to at least one of the letters of the word or by speaking the word (e.g. depending on the data entry method) in French. The system may recognize that the word is a French word and behave correspondingly. For example, if the data entry method used for entering the word is a (e.g. word) predictive data entry method of the invention, the system may use the French database of words of the invention for entering the word. The system may consider that the user enters data in French until the user provides a speech in another language. In this example, the user may enter the following word "mere" (e.g. a French word) by pressing the corresponding keys (e.g. may not need to provide a speech if the user uses the predictive data entry method, and the system may use the French database of words of the invention for entering the word).

The user may, then, enter the last part "in French" by one of the data entry systems of the invention. During providing the key presses corresponding to the word "in", the user may inform the system to automatically switch to the English mode by providing a speech information in English language such as providing a speech corresponding to at least one of the character of the word "in" (e.g. saying the word, or saying at least one of the characters such as "ay" of the word).

It is understood that other manual or automatic switching methods may be considered. For example, based on a previous word of a language entered/selected by the user, the system may consider the following word as being a word of the language unless the user provides an information (e.g. such as the ones just described) for switching to another language.

According to one embodiment of the predictive data entry systems of the invention, a symbol such as a character may be considered by the system as being, either, as part-of-a-word of the database (e.g. the symbol is considered as being part of the word to be predicted by the word predicting procedure when its corresponding key press is provided (e.g. predefined as with or without speech) during a sequence of key presses for entering the word), or it may be predefined to be considered as an out-of-a-word symbol, or predefined as both.

A same symbol may be assigned to any predefined type of interaction with, a first key or a second key, and being considered as a part-of-a-word or an out-of-a-word symbol, respectively (e.g. or vise versa).

A same symbol may be assigned a same key but to two different types of information, wherein by providing a first type of interaction with the key the system considers the symbol as being a part-of-a-word symbol, and by providing a second type of interaction with the key the system considers the symbol as being an out-of-a-word symbol (e.g. or vise versa)

A same symbol may be assigned a same key and to a same type of information but to two different predefined speech information, wherein by providing the interaction with the key and providing a first speech information the system considers the symbol as being a part-of-a-word symbol, and wherein by providing the interaction with the key and providing a second speech information the system considers the symbol as being an out-of-a-word symbol (e.g. or vise versa).

For example, the symbol "-", may be part of a word of the database such as the word "semi-final", or it may be an out-of-a-word character such as being used in a formula or as a delimiter between two separate words (e.g. "single-double"). Predefined interaction such as predefined user's behavior (e.g. type of key interaction, and/or speech information) may inform the system of the nature of the symbol. For example, when entering the word "semi-final" (e.g. a word within the database) the user may press the corresponding keys without providing the speech corresponding to the symbol "-" (e.g. in this example, not providing a speech when for example, single-pressing the key the character "-" may inform the system that the character corresponding to the key press is part of the word to be predicted by the system). On the other hand, for example, if the user speaks the speech corresponding to the symbol "-", the system may consider that as an out-of-the-word symbol and considers it as an end-of-the-word-signal of the previous word. For example, in order to enter the two words including the delimiter symbol "single-double", the user may press the keys corresponding to the word "single", then press the key corresponding to the delimiter symbol and speak the symbol. The system understands that the spoken symbol (e.g. punctuation mark) is not part of the previous word. The system enters the word "single" and the delimiter "-", and considers the next key presses (e.g. and the corresponding speech(s)) as being part of the next word (e.g. "double", in this example).

According to another example, when entering the word "semi-final" (e.g. a word within the database) the user may press the corresponding keys such that when the user presses the key corresponding to the symbol "-", the user may provide the predefined speech corresponding to said symbol (e.g. in this example, providing a single-pressing action (e.g. with or without speech) on the key corresponding to the character "-" may inform the system that the character corresponding to said key pressing action on said key is part of the word to be entered). Predefinely, another pressing action on said key or another predefined key (e.g. predefinely, with or without providing a speech) to which the character "-" is assigned, may inform the system that the character provided by said interaction may not be considered by the (e.g. predictive) system as being part of a word.

Based on principles as described, predefined by the manufacturer or by the users, each of the symbols of the data entry systems of the invention may be assigned to be, part of a word, or out-of-a-word, or both, based on for example the type of interaction provided by the user. As an additional example, a portion-of-a-word of the invention such as the suffix "tion", may be considered as part of a word and being assigned to a first type of interaction such as a single or double pressing action on a corresponding key and providing the speech corresponding to the portion-of-a-word. Also for example, same portion-of-a-word of the invention (e.g. the suffix "tion"), may be considered as an out-of-a-word symbol and being assigned to a another type of interaction such as a single or double gliding action on a corresponding key and providing the speech corresponding to the portion-of-a-word.

It must be noted that in some paragraphs of the applications concerning the data entry systems of the invention such as the predictive data entry systems of the invention, the term end-of-a-word signal is used to describe an out-of-word character.

Based on the principles described above, symbols such as characters provided by other systems (e.g. and used with the word predictive systems of the invention) such as the handwriting input and recognition system, full keyboard, etc., may also predefinely be either a part-of-a-word symbol, or an out-of-a-word symbol or, or both As mentioned before, in the predictive data entry system of the invention, a symbol may be predefinely assigned to at least two types of user's interaction wherein in one of the interactions the symbol may be part of a word (e.g. being compared with the words of the dictionary of words of the system) or it may be considered as an out-of-a-word symbol. For example the letter "a" may be assigned to a key and be inputted as being part of a word, by for example, providing a corresponding pressing action on the corresponding key without providing a speech. On the other hand, for example, the same letter "a" may be considered as an out-of-a-word letter and be entered by for example, providing a corresponding pressing action on the corresponding key and speaking the letter.

As examples of the methods described, for example the letter "a" may be assigned to a key and be inputted as being part of a word, by for example, providing a predefined pressing action such as a single pressing action on the corresponding key with[out] or without providing a speech (e.g. speaking said letter may enter said letter precisely, and not speaking said letter may inform the system that said key pressing action is ambiguous and that may correspond to any of the symbols including the letter "a", that are assigned to said predefined interaction with said key). On the other hand, for example, the same letter "a" may be considered as an out-of-a-word letter and may be entered by for example, providing another predefined interaction with the corresponding key (e.g. gliding action, longer-time pressing action, pressing the key strongly, pressing two keys such as a press-and-holding action on a first key and pressing the corresponding key, etc.) with or without speaking (e.g. according to one example, said letter may predefiney be precisely entered by said interaction and speaking said letter. According to another example, said letter may predefiney be the only letter assigned to said key to be precisely entered by providing said key interaction in the absence of speech. Although in this examples entering a letter has been used to describe the methods, preferably, the symbol to be assigned to a key for being entered by providing said key interaction in the absence of speech may be a symbol other than a letter, such as a punctuation mark character or a command/function).

It is understood that the examples described may apply to any kind of symbols of the data entry system of the invention such as letters and punctuation mark characters.

As mentioned before, in the predictive data entry system of the invention, an end-of-word signal may be used to inform the system of the end of a sequence of key presses (e.g. and speech information) corresponding to a word. For example, as mentioned, according to one embodiment of the invention, the end-of-word signal may be an out-of-word character or it may be a signal (e.g. such as a predefined pressing action on a predefined key) without providing any character. Also as mentioned, according to another embodiment of the invention, the end-of-a-word signal may be a character such as a letter that may be defined as being the beginning character of a (e.g. next) word. These matters have been already described in detail.

According to one embodiment of the invention, (e.g. in the predictive data entry system of the invention) more than one shift key may be considered to permit various types of information for data entry. For example, a capital letter may be provided by pressing (e.g. and holding) a first shift key and pressing another key corresponding to the letter. According to different methods, speaking the letter may inform the system that for example:
  the letter may be capitalized and be predefined as an out-of-a-word letter, or;
  the letter may be capitalized and may be predefined to be considered as a beginning letter of a (e.g. next) word, or;
  the letter may be capitalized and be considered as part of the current word, or;
  etc.

Also according to one method, for example, not speaking the letter may inform the system that the corresponding letter within the corresponding (e.g. recognized) word may be capitalized.

Also for example, a second shift key may be considered to be used with at least the portion-of-a-word data entry system of the invention. For example, a portion-of-a-word may be provided by pressing (e.g. and holding) the second shift key and pressing another key corresponding to the portion-of-a-word and speaking a predefined speech corresponding to the portion-of-a-word. Also for example, pressing (e.g. and holding) the second shift key and pressing another key without speaking may correspond to other type of symbol such as the special character such as a punctuation mark character or a function.

In devices having a sensitive surface such as touch screen, other or additional input methods such as single or double gliding actions (e.g. or a tapping plus a gliding action) (e.g. on a key) (e.g. and the corresponding speech, if needed) may be provided for the entry of corresponding data such as, for example, still more variety of symbols. For example, instead of pressing (e.g. and holding) a shift key and pressing another key corresponding to a portion-of-a-word, a gliding action on a corresponding zone/key corresponding to the portion and speaking a predefined speech corresponding to the portion may be provided for the entry of the portion.

As mentioned before, according to one embodiment of the invention, the predictive data entry systems of the invention may include the character data entry system of the invention and portion-of-a-word data entry system of the invention. In some cases (e.g. preferably, words having multiple syllables such as at least three or four syllables) for less speech, a portion-of-a-word may be entered by interacting with the corresponding key without providing a speech. Based on the portion and the other portions or characters of the word entered by the user, the system may recognize the corresponding word.

According to one embodiment of the invention, based on the principles of the predictive data entry systems of the invention, a table of symbols wherein each symbol is predefined as being part-of-a-word or being out-of-a-word, may be considered. Each of the symbols may be assigned to at least one predefined type of interaction with its corresponding key (e.g. interacting with such as a press-and-holding action on a first key and providing a predefined type of interaction with the corresponding key, may also be considered as a type of interaction with the key) either in the presence of a corresponding speech or in the absence of a speech (e.g. or both). The table of symbols may be created or modified by the manufacturer and/or by the user.

As mentioned before, according to one embodiment of the invention, tapping on four different locations on a surface may correspond to four keys used by the data entry systems of the invention. According to one embodiment of the invention, tapping on different locations on a surface may provide different corresponding sounds or vibrations, etc. the system may recognize each of the sounds and the corresponding predefined imaginary key and use it by the data entry systems of the invention. This principle may for example, be useful for data entry by tapping on four different locations on the screen of a non touch sensitive screen of a computer (e.g. combined with the corresponding speech based on the principles of the data entry system of the invention). According to another method, gliding on four different directions on a surface to provide four different sounds (e.g. as described before in different patent applications filed by this inventor such as the PCT/US/01/49450 ("Stylus Computer" application) may also be used for the same purpose. At least some of the inventions of the PCT patent application may be combined/ used with the combined data entry systems of the invention. Some of the combinations are described in detail this patent application.

As mentioned before, the data entry systems of the invention may be combined with handwriting entry and recognition systems. Also as mentioned before, for example, during the entry of a word based on the predictive data entry systems of the invention, instead of or in addition to using a key interaction and providing a corresponding speech information for the entry of each of at least one precise character such as a letter (e.g. or a portion of) of a word, (e.g. for example, for being discrete) the letter(s)/portion may be written (e.g. by the user) on the corresponding input device such as for example, the sensitive input surface of the electronic device. The information corresponding to the other characters of the word may be pressing the corresponding keys without speaking (e.g. based on the principles of the predictive data entry systems of the invention). It is understood that such data entry system may use any type of (e.g. reduced) keyboards such as the ones described in the references incorporated herein, filed by this inventor such as a dynamic keypad (e.g. having at least four keys) of the invention.

(e.g. As described in the previous patent applications, a dynamic keypad system duplicating (e.g. by finger, stylus, mouse, etc.) the interactions (e.g. pressing action, gliding action, etc.) with a (e.g. imaginary) predefined keypad model on a none-predefined portion of a (touch-sensitive) surface. Procedure of recognizing an interaction provided on a location on the surface and relating the location to the corresponding key of the keypad model, is based on recognizing the relationship between the contacted location and other (e.g. the previous and/or the next) different locations on the surface contacted by the user, relative to the relationship between the locations of the keys of the predefined keypad model relating to each other. These matters have been described in detail in the patent applications.)

For example, by using a (e.g. dynamic) keypad (e.g. having four keys) of the invention, the user may write a character of a word (e.g. on for example the input panel of the handwriting input/recognition system, or anywhere on the screen of a corresponding data input surface), and use tapping/gliding interactions (e.g. as described before), corresponding to/for the entry of the other characters of the word. The system may easily distinguish between the writing action and the tapping actions. In this example dynamic keypad has been used to demonstrate the principles of the embodiment of the invention. as mentioned, any other keypad may be used with the embodiments of the invention.

According to one method, when writing and/or tapping actions are permitted to use the same input surface (e.g. for example they may use anywhere of a touch screen surface), writing/gliding actions may correspond to handwriting input and tapping actions may correspond to key pressing action). As an example, in order to enter the word "book", the user may provide a first (e.g. precise) information by writing the letter "b", (e.g. by the corresponding stylus, or by his finger) on the touch screen of a tablet pc, and then, provide a second (e.g. ambiguous) information by pressing the (e.g. hard/soft/virtual/dynamic, etc.) key(s) corresponding to the remaining characters "ook", of the corresponding keypad/keyboard used with the system. As mentioned before, the user may write any of one or more letters of a word, and provide the key presses corresponding to the other letters of the word. According to another example, the user may enter the word "book" by providing a first (e.g. ambiguous) information by pressing the keys corresponding to the beginning characters (e.g. "bo", in this example) of the word, and then provide a second (e.g. precise) information by writing the remaining letters, (e.g. "ok", in this example) of the word on the surface of the electronic device. Etc.

It must again be noted that any number of the systems, methods, features, etc., of the data entry systems of the inventions may be combined together to provide a specific data entry system that may be used in a corresponding environment.

As mentioned before, each different type of input information (e.g. for example, to provide information for the entry of a word through the predictive data entry systems of the invention) may be assigned to a different type of interaction with the corresponding key. For example, entering an ambiguous letter in lowercase may be assigned to a short single-pressing action on the corresponding key without speaking, and entering the same letter in uppercase, may be assigned to a longer-pressing action on the key without speaking. Also for example, entering a precise letter in lowercase may be assigned to a short single-pressing action on the corresponding key and speaking the letter, and entering the same precise letter in uppercase, may be assigned to a longer-pressing action on the key and speaking the letter. Also for example, entering a-portion-of-a-word may be assigned to a double-pressing or a gliding action on the corresponding key (e.g. and providing the corresponding speech). Also for example, entering one of at least some of punctuation marks or functions or commands may be assigned to press-and-holding a first (e.g. modifier/shift) key and providing a pressing action on the corresponding key with/without speaking. And so on.

It is understood that the interactions and assignments just mentioned are used for demonstration only. Any (e.g. type of) interaction, and assignment of (e.g. any type of) symbols to the interaction may be considered based on principle described.

Different methods of correction of a non-desired word proposed by the system corresponding to the predictive data entry systems of the invention have been described before. Other methods of correction may also be considered. For Example, when a non-desired word is selected/pointed-to, according to one method if the desired word begins with the same (beginning) letter as the non-desired word, then the user may provide a predefined signal such as pressing a predefined key without speaking. The system may propose another word among the group of the words corresponding to the same key presses as the non-desired word and that begins with the same letter as the non-desired word and preferably has the next highest priority among the words of the group of words that begin with the letter. Also for example, if the desired word does not begin with the same (beginning) letter as the non-desired word then the user may provide a speech corresponding to (e.g. or write) the beginning character of the desired word. The system may propose a word among the group of words corresponding to the same key presses as the non-desired word, and that begins with the letter that corresponds to the user's speech (e.g. or written character) and that preferably has the highest priority among the words of the group of words that begin with the letter.

Figure 15:
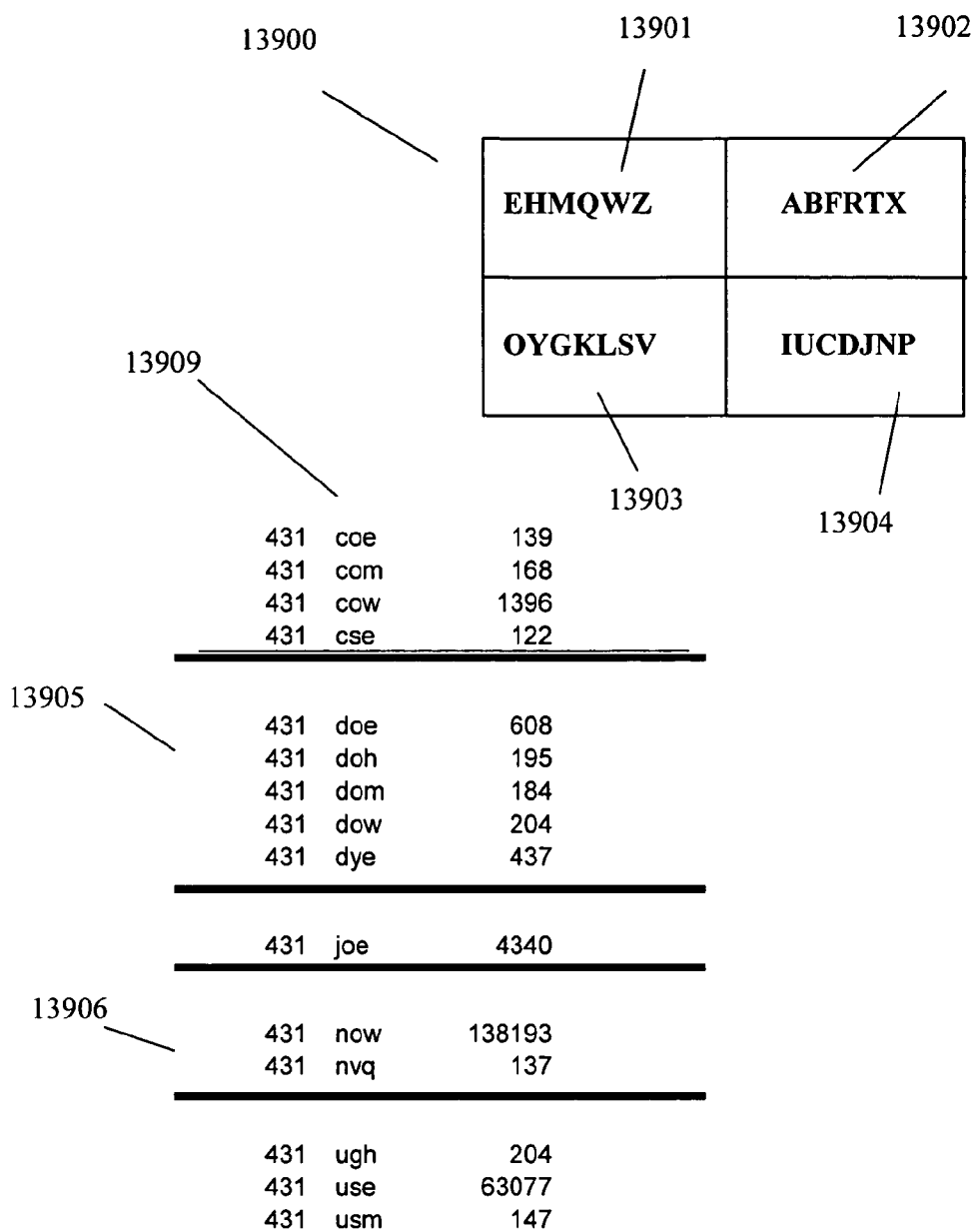
FIG. 15 shows four keys of an exemplary keypad and a portion of a corresponding database of words used with the data entry system, in accordance with one embodiment of the invention.

As an example corresponding to the above-mentioned method, by considering the keypad 13900, FIG. 15 shows a table 13909 containing the words of a database of words of the system that correspond to the sequence of key presses 13904, 13903, 13901 (e.g. their key presses value is "431"). As described before, according to one method, providing the sequence of key presses 13904, 13903, 13901, without speaking may correspond to the word "now" that has the highest priority among those words. If the word is a non-desired word that has been entered during a text, while the word is selected/ pointed-to, if the user for example presses a predefined (e.g. correction) key without providing a speech, then the system may propose the word "nvq" corresponding to the group of words 13906 beginning with the letter "n", wherein the word has the highest priority after the word "now" within the group. Also for example, if the user provides a speech (e.g. along with pressing the correction key) such as saying "d", the system may propose the word "doe" that has the highest priority among the words of the group of words 13905 that begin with the letter "d". An additional pressing action on the correction key (e.g. without speaking) may provide another word (e.g. "dye" in this example) of the group 13905, wherein the word has the highest priority after the word "doe" within the group. Still another additional pressing action on the correction key (e.g. without speaking) may provide another word (e.g. "dow" in this example) of the group 13905, wherein the word has the highest priority after the words "doe" and "dye" within the group. And so on.

According to one method of correction, if the user proceeds to correcting a non-desired word proposed by the system, and presses for example the correction key and speaks the beginning character of the desired word that has the same beginning character as the non-desired word, then the system may propose a word among a group of words that correspond to the same key presses as the non-desired word and that begin with the character, wherein the proposed word has the highest priority after the non-desired word among the group of words.

According to another method of correction, if the user proceeds to correcting a non-desired word proposed by the system, and presses for example the correction key and speaks the beginning character of the desired word that has the same beginning character as the non-desired word, then the system may propose a word among a group of words that correspond to the same key presses as the non-desired word and that begin with the character, wherein the proposed word has the highest priority among the group of words (e.g. if the none-desired word has the highest priority among the group of words, then the system may re-propose the word.

According of one method of correction, in some cases the correction procedure may additionally provide a space character. For example, if immediately after the entry to the information (e.g. key presses, and if needed speech) corresponding to a word and before entering an end-of-the-word signal such as a space character, the user desires to correct the current proposed word, he may provide a pre-defined signal such pressing a space key or a correction key and speak the corresponding speech (e.g. speaking the beginning letter of the desired word). The system may replace the word accordingly and may provide a space character after the word.

It is understood that the instead of the above-mentioned correction method, the user may use any other correction methods such as the ones described earlier such as speaking part or all of the letters of the word.

According to one embodiment of the invention, the system may automatically learn the user's texting habits of a user and provide corresponding priorities to the words used by the user based on the frequency of use to the words by the user.

As mentioned before, in order to enter a letter, the user may press a key to which the letter is assigned and provide a speech corresponding to the letter (e.g. speak the letter). According to one embodiment, for example, if the letter is a consonant, the speech may be pronouncing the phoneme of the consonant followed by at least a vowel phoneme. According to one method, the vowel phoneme may be at least any of the vowel phonemes of a language. For example, letter "t" may be entered by pressing the corresponding key and saying at least one of the following combinations:

"ta" (e.g. corresponding to the speech of the beginning of the word "tap"
"te" (e.g. corresponding to the speech of the beginning of the word "test")
"tē" (e.g. corresponding to the speech of the beginning of the word "tee")
"tô" (e.g. corresponding to the speech of the beginning of the word "told)
"tu" (e.g. corresponding to the speech of the beginning of the word "tune")
"tī" (e.g. corresponding to the speech of the beginning of the word "ride")

This method may be used with the combined (e.g. including predictive) data entry systems of the invention. For example, in order to enter the word "test", the user may press the key corresponding to the letter "t", and say "teh" (corresponding to the vowel of the corresponding (e.g. first) syllable of the word), and press the keys corresponding to the remaining characters of the word without speaking. Also for example, in order to enter the word "told", the user may press the key corresponding to the letter "t", and say "toh", and press the keys corresponding to the remaining characters of the word without speaking. For some users this may be more user friendly than saying the letter (e.g. saying "ti"). It is understood that as mentioned before, the user may provide more than the consonant and the following vowel. For example, the user may pronounce the first consonant, the following vowel, and the following consonant, of the corresponding word. Theses matters have already been described in detail in the references incorporated herein, filed by this inventor.

It must be noted that as described before, instead of user's speech, other user interactions may be combined with user's key interaction. Letter entry based on user's thinking is experimented in the laboratories. For example, although it is not yet realized, to enter a symbol such as a letter, the user may press the corresponding letter and think about the letter. The symbols may be distributed on the keys of the corresponding keypad such that to augment the accuracy of the data entry.

As mentioned before, in addition to or in replacement of the user's speech, other systems of inputting precise characters such as a letter, may be used with the predictive data entry systems (e.g. using few keys such as four keys to which substantially all of the letters of a language are assigned) of the invention. Also as mentioned, in additional to interacting with input means of the system that provide input signals that correspond to ambiguous characters (corresponding to a group of characters), the data entry systems of the invention may use the provided other input signals that correspond to providing precise characters, such as interacting with a virtual or physical keyboard (e.g. using a QWERTY type keyboard in addition to the ambiguous four keys of the system), handwriting input and recognition methods (e.g. to input precise characters), etc.

Figure 16A:
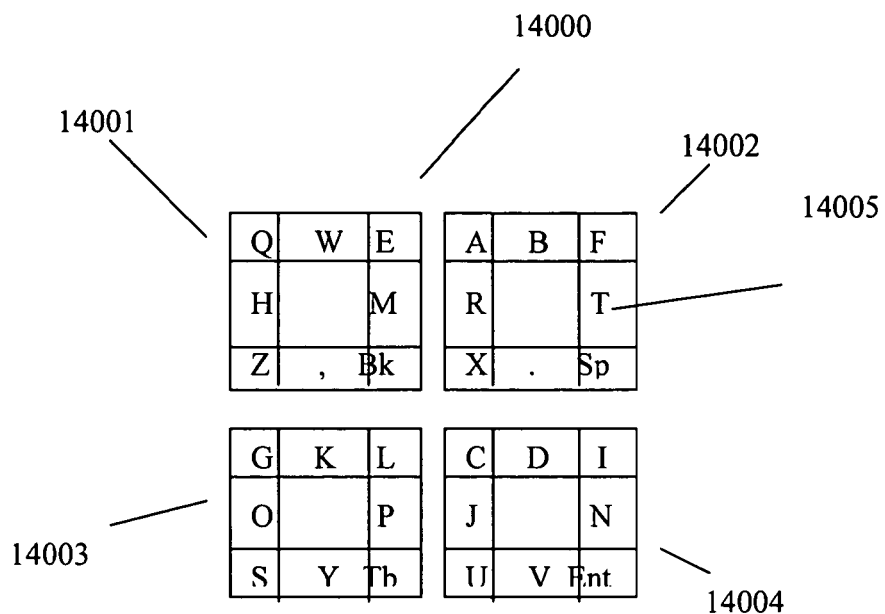
FIGS. 16a through 16b show exemplary keypads having touch sensitive keys that may be used with the data entry system, in accordance with one embodiment of the invention.

FIG. 16*a* shows as an example, a multi-directional keypad having four keys to which the letters of a language are assigned (e.g. as shown on each key). For example, pressing in the center of the keys may correspond to ambiguously entering one of the letters assigned to the key. A sequence of such key presses corresponding to a desired word may be considered by the predictive data entry system to provide at least one corresponding word. On the other hand, a pressing action on a character such as a letter (e.g. letter zone) on a key may precisely input the character. For example, by considering the keypad 14000 of FIG. 16*a*, the sequence of the pressing actions (e.g. on the center) of the keys 14002, 14001,

14003, 14002, may correspond to the words "test", and "best". The word "best" generally may have higher frequency of use. Therefore the system may propose the word as the result of the pressing actions. In this example, if the user desires to enter the word "test", he may first press on the (e.g. zone of) the letter "t" 14005 of the key 14002, and the press on the centers of the keys 14001, 14003, 14002. The system understands that the word corresponding to the sequence of key presses on the keys 14002, 14001, 14003, 14002, begins with the letter "t". Therefore in this example, the word "test" may be proposed by the system.

Figure 16B:
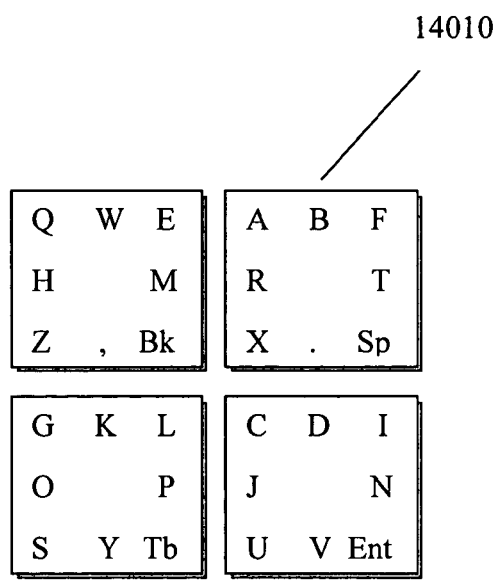

FIG. 16*b* shows as an as example, a keypad 14010 having touch sensitive keys to duplicates the functionalities of the multi-directional keypad 14000 by touching on the corresponding zones of the keys of the keypad 14010. In this example, according to another method of input, pressing actions on any zone on a key of the keypad 14010 may correspond to an ambiguous character on the key, and a gliding action on a key toward or on for example, a character (e.g. printed) on the key may correspond to the (e.g. precise) character on the key.

Based on principles of symbol assignments to few keys, of the data (e.g. combined) data entry systems of the invention, any of the special characters such as numbers, punctuation mark characters, commands, functions, etc., may be assigned to predefined interactions with the keys (e.g. or additional keys) with or without providing speech.

Single letters/characters may also have priorities relating to each other in the predictive data entry system of the invention. For example, (e.g. by considering the English language) letters "a", and "i" may obviously have higher frequency-of-use/priority relating to the other English letters. For example, by considering the keypad 14000 of FIG. 16*a*, letters "m", "a", "s", and "i", may have the highest priority relating to the other letters of their respective corresponding keys 14001, 14002, 14003, 14004. A user may benefit of the priority assignments to the letters to enter some words based on providing key presses only that otherwise would require some amount of speech. For example, by considering the keypad 14000, if the user desires to enter the word "as" by pressing (e.g. on the center of) the corresponding keys 14002, 14003, without speaking, the system may propose the word "to" that corresponds to the same sequence of key presses but has higher frequency of use/priority. In order to enter the word "as" without speaking the user may press the key 14002 corresponding to the letter "a", then provide an-end-of-the-word signal (e.g. by pressing a corresponding key) that does not provide (any character such as) a space character, and then press the key 14003 corresponding to the letter "s". In this example, letter "a" has the highest priority among the letters assigned to the (e.g. single pressing action on) the key 14002. The system proposes the letter. By providing the end-of-the-word signal the system keeps the letter and knows that the next key press for entering a word corresponds to the entry of the next/another word. In this example, letter "s" has the highest priority among the letters that are assigned to the (e.g. single pressing action on) the key 14003. By pressing the key 14003 without speaking the system proposes the character "s" and prints it immediately after the letter "a" to provide the word "as".

Using handwriting input and recognition system with the (e.g. predictive) data entry systems of the invention has already been described (e.g. by interacting with the keypad of the system, and writing precise characters on a surface to for example helping the predictive system of the invention to more accurately predict the words). According to one embodiment of the invention, the user may write a character such as a letter on the (e.g. sensitive/virtual) key/zone of the keypad of the system corresponding to the letter. The handwriting recognition system may match the user's written letter to one of the characters that are assigned to the key/zone. Therefore, the processing time may be reduced, and the accuracy of the recognition may be augmented.

The handwriting input may be performed by writing with a means such as a stylus or user's finger on a surface. According to one embodiment of the invention, when using the split version of the keypad of the system (e.g. located on opposite sides of a device having touch sensitive surface), the user may press the keys with the corresponding thumbs and if needed write with his finger (e.g. thumb, forefinger, etc.) on the surface to provide precise characters that may be used with the (e.g. predictive) data entry systems of the invention (e.g. entering a word through the predictive data entry system by providing a first type of information consisting of inputting precisely at least one of the characters of the word by handwriting entry/recognition system and providing at least a second type of information consisting of providing the (e.g. ambiguous) key presses corresponding to at east some of the remaining characters of the word, has been described in detail before).

As mentioned before, the data entry systems of the invention may be used with any application or devices. One of the popular devices is iPOD music/media player. The device has a content search means that consists of scrolling a menu by circular gliding actions on a circular touch sensitive surface. When the list of contents is long, the procedure becomes time consuming. The data entry systems of the invention may either replace the searching (e.g. and selecting) procedure, or it may help to make it faster. For example, the user may enter one or more (e.g. beginning) characters corresponding to the desired content (e.g. song, singer, or both, etc.). The pop-up menu of the device may present to the user the (e.g. reduced number of) contents accordingly, and the user may search within the reduced list by using the (e.g. circular) content search means of the device.

The use of the movements such as the body movements of the user (e.g. such as the lips of the user to provide speech corresponding to user's key presses) with the data entry systems of the invention have been described before. The movements may be used with the predictive data entry systems of the invention to reduce the amount of speech by voice to be provided by the user.

According to one embodiment of the invention, a movement sensing means may be used with (e.g. predictive) data entry systems of the invention during the entry of a word or when providing the correction procedure of the invention in to inform the system that the user desires to switch to the next word in the list of words corresponding to the user's (e.g. sequence of key press, and/or speech) information. For example, the movement sensing means may include a camera that detects the user's body movements such as his lips movements. For example, by considering the keypad 14000 of FIG. 16*a*, the sequence of the key pressing actions (e.g. on the center) of the keys 14002, 14001, 14003, 14002, may correspond to the words "test", and "best". The word "best" generally may have higher frequency of use. Therefore the system may propose the word as the result of the pressing actions. In this example, if the user desires to enter the word "test", for example, while pressing the corresponding keys, the user may provide (e.g. without providing voice) lip movement actions (e.g. for example by saying the letter "t", or "next", or etc.). The camera of the corresponding device may detect the movements and the system may understands that the user desires the next word in the list (e.g. having the second highest priority/frequency of use) after the one (e.g. "best") that the system would normally propose if the lip movements were not provided by the user. This system is different than the lip reading and recognizing system. In this embodiment the system does not have to recognize what user says, it only detects if there was a movement. It is understood that other user's interactions and corresponding detecting means may be used for the same purpose. For example, instead of a camera a heat sensing means may be used to detect the user speaking. According to another embodiment the detecting means of the movement provided by the user may be a movement sensing means provided within the corresponding device such as a cellphone. Instead of lip movements, the user may provide a predefined movement with the device when providing the corresponding sequence of key presses.

As mentioned before, in order to augment the accuracy of the system, to some of the symbols having ambiguously resembling speech relating to the other symbols (e.g. on a key) a different speech may be assigned such that the symbols may be distinguishable from the other symbols. For example, to better distinguish the speech of the letter "m" (e.g. pronounced "em") from the speech of the letter "n" (e.g. pronounced "en"), instead of or in addition to the standard speech of the letter "m", another speech such as "ma" may be assigned to the letter "m" so that to be distinguishable from the speech of the letter "n".

Figure 17:
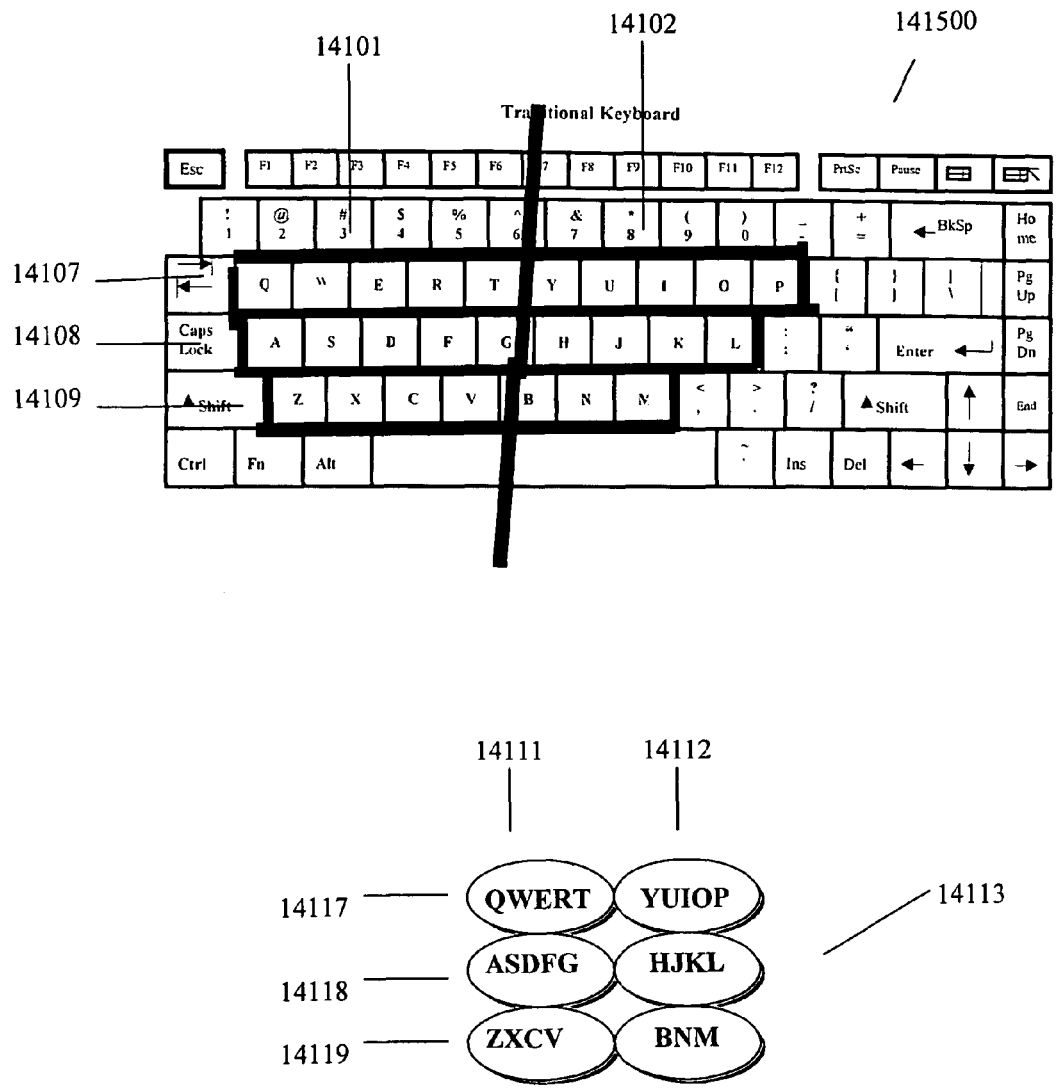
FIG. 17 shows an exemplary keypad to be used with the data entry system, where the letters of a QWERTY keyboard are assigned to six of the keys of the keypad, in accordance with one embodiment of the invention.

As described before in detail, the data entry systems of the invention may use a keypad having few keys such as a keypad having at least six keys wherein to six of its keys substantially all of the letters of a language are assigned. The assignment of the letters to the keys may be such that to duplicate the order of a QWERTY keyboard. For example, as shown in FIG. 17, a group of six keys (e.g. 3 rows 14117-14119 by 2 columns 14111-14112) of a reduced keyboard 14110 may be used to duplicate the QWERTY arrangement of a PC keyboard 14100 (e.g. duplicating imaginary, rows 14107-14109 by columns 14101-14102 comprising alphabetical characters of the keyboards 14100). As an example, the upper left key 14113 may contain the letters "QWERT", corresponding to the letters situated on the keys of the left side 14101 of the upper row 14107 of the PC keyboard 14100. The Other keys of the group of six keys follow the same principles and contain the corresponding letters situated on the keys of the corresponding row-and-side of the PC keyboard 14100.

A skilled user of a QWERTY keyboard usually knows exactly the location of each letter on the keyboard. A motor reflex permits him to type quickly on a QWERTY keyboard. Duplicating a QWERTY arrangement on six keys as described here-above, permits the user to touch-type (fast typing) on a keyboard having reduced number of keys. The user may, for example, use the thumbs of both hands (left thumb for left column, right thumb for right column) for data entry. This reminds typing on a PC keyboard permitting fast data entry. As mentioned before, as an example, each of the columns of keys may be situated on opposite sides of an electronic device and be used with the data entry systems of the invention.

It is understood that the left side and right side characters definition of a keyboard described in the example above is shown only as an example. The definition may be reconsidered according to user's habitudes. For example, the letter "G" may be considered as belonging to the right side rather than left side.

To augment the accuracy of the system, as mentioned before, customized speech may be assigned to at least some of the letters (e.g. on different keys or on a same key) having ambiguously resembling speech relating to each other (e.g. letters "m" and "n" of a telephone keypad or on the keypad 14110 of FIG. 17), so that to distinguish them from each other. For example, to letter "m" (e.g. appellation "em") another appellation (e.g. speech) such as "ma" may be assigned so that to distinguish it from the letter "n" (e.g. appellation "en").

With continuous reference to the example of FIG. 17, same principle may be applied to distinguish other characters having ambiguously resembling speech from each other such as "i, y", "s, f", "d, g", "j, k", "z, c", etc.

It is understood that the keypad, key configuration, symbols such as letter assignment to the keys of the keypad, customized appellation of the symbols, etc., have been described and shown as examples. Other keypad, key configuration, symbols such as letter assignment to the keys of the keypad, customized appellation of the symbols, etc., may be considered by people skilled in the art. For example, the keypad may be in alphabetical order and the symbol such as letter assignment may be such that for example, to a letter two or more customized speeches (e.g. in addition to its standard speech) may be assigned.

Dialing by name has been described in the references incorporated herein, filed by this inventor. Dialing by name may cause ambiguity such as for example two different person may have the same name. According to one embodiment of the invention, when attempting to provide a call, a call forwarding/switching center, an operator, service provider, etc., may (e.g. upon request) use a database or acquire information on the fly, to provide information about a to-be-called party to the user/caller. For example, when a user performs a call based on a user's name the central may provide information about the to-be-called party such as his/its address, picture, a predefined phrase, a request of password, etc., so that the user may assure that the system will call the right party. The to-be-called party may be a person, a company, an organization, etc. The information about the to-be-called parties may be provided by themselves and/or by a third party, on the fly or through a database used by the call forwarding center. For example, in addition to his address, a person may provide his picture, his preferred song, or other information to the call forwarding center so that at least part of the information may be transmitted to a caller calling the person, so that the caller may verify the authenticity of the to-be-called party based on the information and based on that confirm or cancel the call. It must be noted that the information provided to the user may be vocal or it may be displayed on the display of the user's electronic device (e.g. telephone).

As mentioned before, when using the predictive data entry systems of the invention using few keys and speech for entering a word, instead of or in addition to using the speech. at least one of the letters of the word may precisely be entered by using other data entry means or methods such as a handwriting (and recognition) system, or a keyboard (e.g. mechanical, virtual, etc.) wherein a predefined pressing action on a key (e.g. in some cases more than one key) of the keyboard (e.g. standard QWERTY keyboard) generally corresponds to a single character or function. These matters have already been described before. It is understood that as mentioned previously, the other input means or methods may have different forms. For example, the keyboard may be an on-screen keyboard having a standard PC keyboard form, a circular form, split in two half-circular portions or in two quarter circular portions on the opposite sides of the (e.g. touch screen of) the device, etc.

Figure 18:
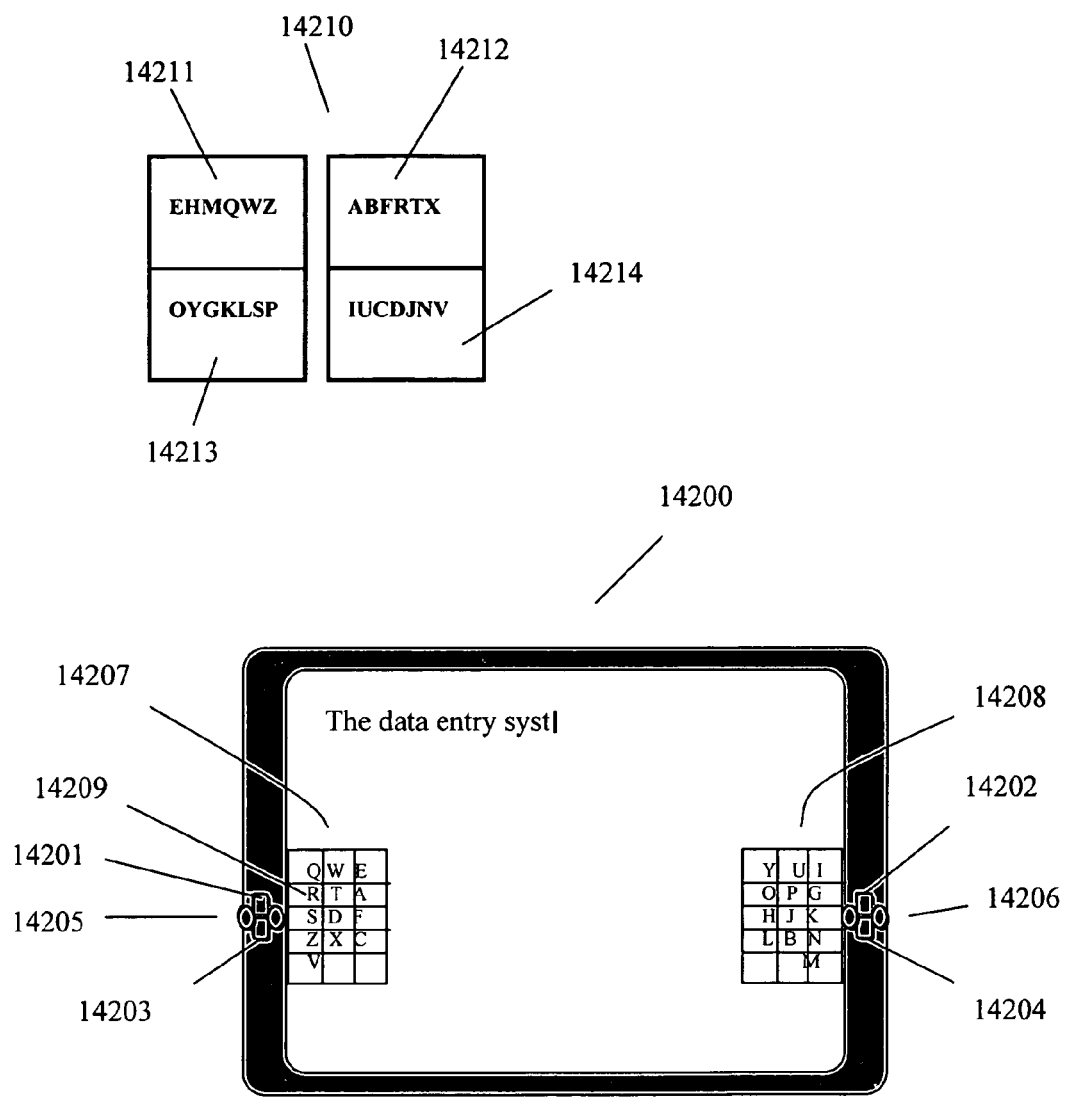
FIG. 18 shows an electronic device having ambiguous keys and unambiguous keys to be used with the data entry system, in accordance with one embodiment of the invention.

As an another example, FIG. 18, shows an electronic device 14200 such a Tablet PC having a touch screen display.

A predictive data entry system of the invention using few keys (e.g. in this example, mechanical keys split into two groups 14205 and 14206) is integrated within the device. As an example and as described before, to four of the keys 14201, 14202, 14203, 14204, (e.g. duplicating, respectively, the keys 14211, 14212, 14213, 14214, of the keypad model 14210) substantially all of the letters of a language may be assigned such that each of the four keys ambiguously represents any letter of the group of letters that are assigned to the (e.g. corresponding) key (e.g. assignment of letters of a language to few keys such as four keys and using the keys with the predictive data entry systems of the invention has already been described in detail). In this example, in addition to the few mechanical keys, an on-screen keyboard (e.g. being split into two portions 14207, 14208) providing precise letters (e.g. as described above), is available with the (e.g. predictive) data entry system of the invention. As and example, the on-screen keyboard may be used to enter precisely one or more letters of a word during the entry of the word through the predictive data entry systems of the invention. For example, in order to enter the word "day", the user may first press the key 14209 of the on-screen keyboard to precisely enter the letter "d". The user may then press the ambiguous keys 14202 and 14203 corresponding to the letters "a", and "y". Based on the information provided, the system provides the word "day", having the highest priority among the words corresponding to the input information (e.g. in this example, pressing the sequence of ambiguous keys 14204. 14202, 14203, may correspond to the word "its" having higher priority than the word "day").

In must be noted that the examples shown above are used for demonstration purpose only. It is understood that as mentioned previously, other input means (e.g. having different forms) may be used to enter the precise characters (e.g. letters) or functions.

As described in the references incorporated herein, filed by this inventor, an external (e.g. mobile) keypad having few keys (e.g. mechanical, virtual, etc.) and some of other components such as microphone, camera, mouse, etc., may be manufactured to be used with the data entry systems of the invention.

According to one embodiment of the invention, the external keypad may be a detachable/attachable keypad designed such that (e.g. when it is not in use) it may be attached to or accommodated within a corresponding device. For example, the keypad may have a flat shape so that to be attached to an exterior surface of a corresponding device, or it may be designed to have a PCMCIA card form such that to be slideable within the PCMCIA slot of the device. The keypad may be connected, wirelessly or by wires, to the corresponding device.

According to one embodiment the external keypad may contain a battery that may be rechargeable so that when the keypad is attached to (e.g. slided within the PCMCIA slot, hooked within be USB port, etc.) its corresponding device, the battery may be charged through the device.

It is understood that the keypad may have any other shape, and may be attached by any other means to its corresponding device, and may use any other means to be recharged. For example, the keypad may have a credit card size.

As mentioned before, a word that at least a portion of it exists in the dictionary of words of the system may be entered through the combined data entry systems of the invention. According to one embodiment of the invention, to enter the word, the user may provide a predefined separating input signal (e.g. such as a predefined interaction with one or more predefined key(s)) between the entry of the input information (e.g. the key presses, and speech if being provided) corresponding to two consecutive portions of the word so that to inform the system of the end-of-the-entry-of-the-previous-portion and/or the beginning-of-the-entry-of-the-following-portion of the word. In this case, during the process of the input (e.g. the key presses, and probably speech if required/desired) information (e.g. eventually, including the search procedure if the word predictive system of the invention is used) corresponding to the following portion of the word, the system may not consider the input information (e.g. the key presses and speech) corresponding to the portion(s) prior to the following portion of the word.

It is understood that a word may be combine one of more portions wherein each of the portions being an entry (e.g. an item such an word, a portion-of-a-word) of the dictionary of words of the system and/or one or more portions that are not an entry (e.g. are not included within) the dictionary of words of the system. It must be noted that a word may arbitrarily being divided into different portions by the user.

As an example for one of the possibilities of a compound word just described, when entering a word (e.g. the word "pcboard" that may be divided into two portions "pc" and "board") at the end of the entry of a sequence of single characters (e.g. characters by character data entry system of the invention for entering the letters "p" and "c", in this example), the user may enter the separating input signal so that to inform the system that when the user enters a new portion (e.g. the portion/word "board", in this example that may be entered by the predictive data entry system of the invention) of the word, the system may not consider the previous portion(s) (e.g. the sequence of single characters, in this example) in the search procedure. It is understood that the compound word (e.g. "handheld") may be comprised of at least two consecutive portions (e.g. words/portions) (e.g. "hand" and "held") that may be included within the dictionary of words of the system. In this case, for example, both portions may be entered by the predictive data entry system of the invention wherein at the end of the entry of the first portion of the two portions the separating input signal may be provided.

Figure 19A:
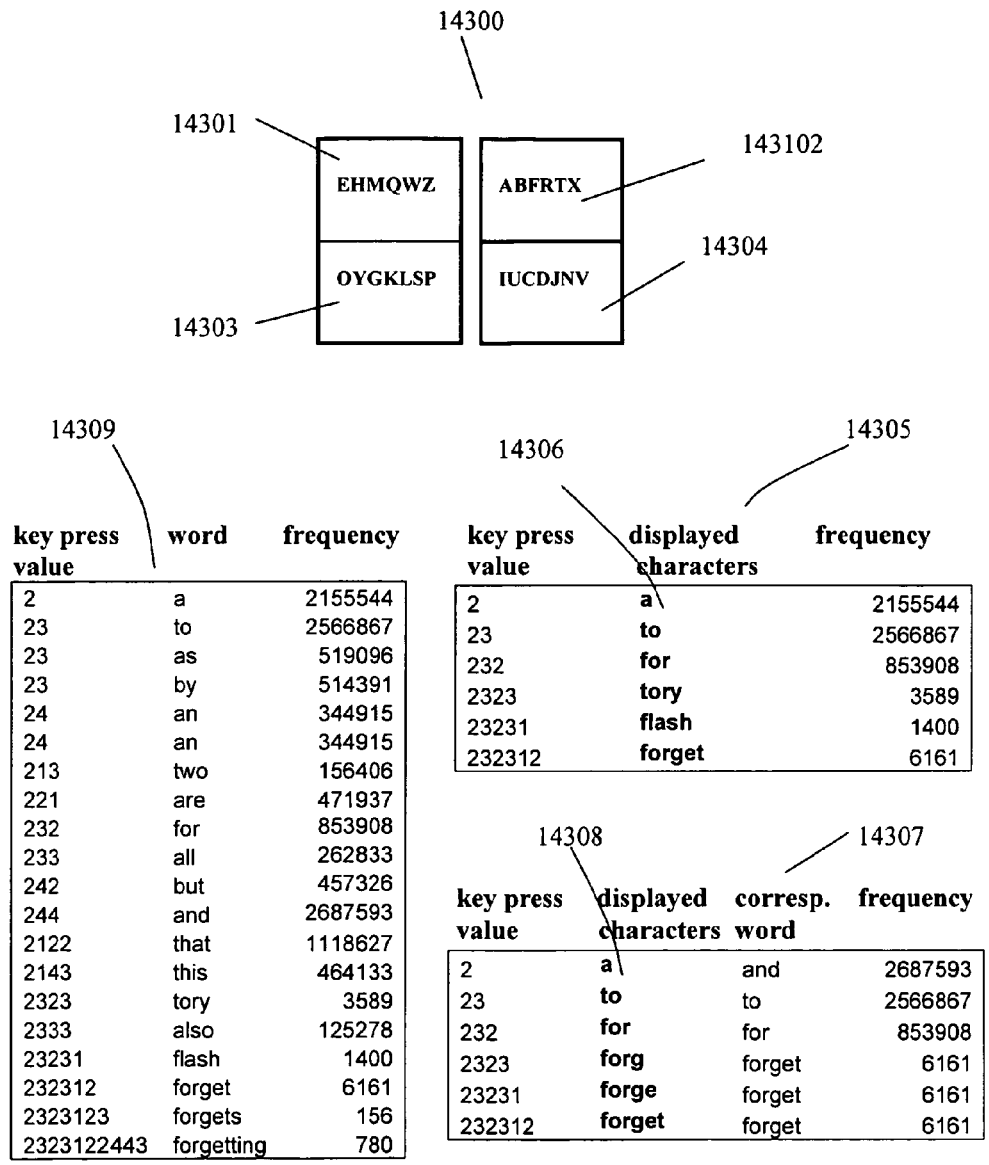
FIG. 19a shows four keys of an exemplary keypad a corresponding database of words used with the data entry system, and a method of output, in accordance with one embodiment of the invention.

As described before, when using the predictive data entry system of the invention to enter a word, according to a first search-and-select procedure, during providing user's input information (e.g. key presses, and speech if provided), for each instance of input information (e.g. each consecutive key press, and corresponding speech if provided) the system may provide (e.g. show to the user) the word having the highest priority among the words of the database of words of the system that the entire chain of characters of each of the words correspond to the input information provided until that instance. As an example, by considering the keypad 14300 of FIG. 19a, if the user attempts to enter the word "forget" (e.g. in this example, without providing speech), he may press the keys 14302, 14303, 14302, 14303, 14301, 14302. Table 14309 shows, as example a database of words of the system. Table 14305 shows, as example, six words 14306 of the database of words of the system corresponding to six instances of input information consisting of providing consecutive key presses (e.g. $1^{st}$ key press, $1^{st}$ and $2^{nd}$ key presses, $1^{st}$ and $2^{nd}$ and $3^{rd}$ key presses etc.) provided without speaking during the entry of the word "forget". This method of searching, selecting, and presenting a word, has already been described detail.

It must be noted that, as mentioned previously, according to one method, at each instance of input information, if the word predictive system of the invention does not find a word wherein all of its characters correspond to the user's input information (e.g. key presses, and speech if any is provided), then the system may look for longer words of the database wherein their beginning characters correspond to the input information and generally may propose (e.g. at least) the corresponding beginning characters of the word having the highest priority among the words that their beginning characters correspond to the input information. If the system does not find any longer word wherein its beginning characters correspond to the input information, then, depending on the predefined architecture of the system, it may for example add a predefined character (e.g. for example, corresponding to the last key press, and the speech if being provided) at the end of the last chain of characters (e.g. or word) (e.g. corresponding to the previous instance of the input information provided for the entry of the word) proposed to the user.

Also, as mentioned previously, according to a second search-and-select procedure, in order to reduce the fluctuation of the display unit during providing user's input information (e.g. key presses, and speech if any is provided), for each instance of input information (e.g. each consecutive key press, and the speech if any is provided) the system may provide (e.g. show to the user) at least the (e.g. corresponding) beginning characters of the word (e.g. if designed so, the system may also show the remaining characters of the word. To separate the remaining characters from the beginning characters, the system may print them distinctively by for example, placing them after a cursor or printing them in another color) having the highest priority among the words of the database of the system that at least the beginning characters of the words correspond to the (e.g. instance of) input information (e.g. input information corresponding to the word, provided until that moment). As an example, by considering the keypad 14300 of FIG. 19*a*, if the user attempts to enter the word "forget" (e.g. in this example, without providing speech), he may press the keys 14302, 14303, 14302, 14303, 14301, 14302. Table 14307 shows, as example, six chains of characters 14308 corresponding to six instances of input information consisting of providing consecutive key presses (e.g. $1^{st}$ key press, $1^{st}$ and $2^{nd}$ key presses, $1^{st}$ and $2^{nd}$ and $3^{rd}$ key presses etc.) (e.g. in this example, without speaking) during the entry of the word "forget" wherein each of the words has the highest priority (e.g. highest frequency of use) among the words of the database of words of the system that at least the beginning characters of the words correspond to the same corresponding instance of input information (e.g. in this examples sequence of key presses provided without speaking) provided during the entry of the word "forget". According to this procedure, as an example, when the user presses the first key 14302, the system may display the letter "a" of the word "and" having the highest frequency of use among the words of the database of words 14309 of the system that begin with a letter corresponding to the first key press provided by the user. The user, then, may press the second key 14303. The system may propose the chain of letters "to" corresponding to at least the beginning characters (e.g. in this case, all of the characters) of the corresponding word "to" having the highest frequency of use among the words of the database of words 14309 of the system that begin with the letters corresponding to the first and second key presses provided by the user. The user, then, may press the second key 14302. The system may propose the chain of letters "for" corresponding to at least the beginning characters (e.g. in this case, all of the characters) of the corresponding word "for" having the highest frequency of use among the words of the database of words 14309 of the system that begin with the letters corresponding to the first and second and third key presses provided by the user. The user may then press the fourth key 14302. The system may add the letter "g" to the chain of letter "for" already displayed (e.g. the display does not fluctuate) to provide the chain of letters "forg" corresponding to the beginning characters of the word "forget" having the highest frequency of use among the words of the database of the database of words of the system that begin with the letters corresponding to the key presses provided to the user. The user, may then press the fifth key 14301. The system may add the letter "e" to the chain of letter "forg" already displayed to provide the chain of letters "forge" (e.g. the display does not fluctuate) corresponding to the (e.g. beginning characters of the) word "forget" having the highest frequency of use among the words of the database of the database of words of the system that begin with the letters corresponding to the key presses provided by the user. The user, may then press the sixth key 14302. The system may add the letter "t" to the chain of letter "forge" already displayed (e.g. the display does not fluctuate) to provide the word "forget" having the highest frequency of use among the words of the database of words of system corresponding to the key presses provided to the user.

As shown, by comparing the proposed chain of characters 14306, 14308, provided during the entry of the word "forget" by each of the search-and-select procedures, it may be noticed that the display unit may have less fluctuations when using the second search-and-select procedure.

According to one embodiment of the invention, the first and second procedures may be combined to provide an efficient third procedure that may provide the search results of both procedures to the user. At each instance of input information for entering a word, showing both, the word with highest priority among the words that all of their characters correspond to the input information provided by the user until that moment and the word with highest priority among the words that their beginning characters correspond to the input information provided by the user until that moment, may help the user to provide an easier, faster, and more accurate data entry (e.g. as explained before, if the first procedure does not find a corresponding word, it may print/propose the corresponding beginning characters of the word proposed by the second procedure).

Figure 19B:
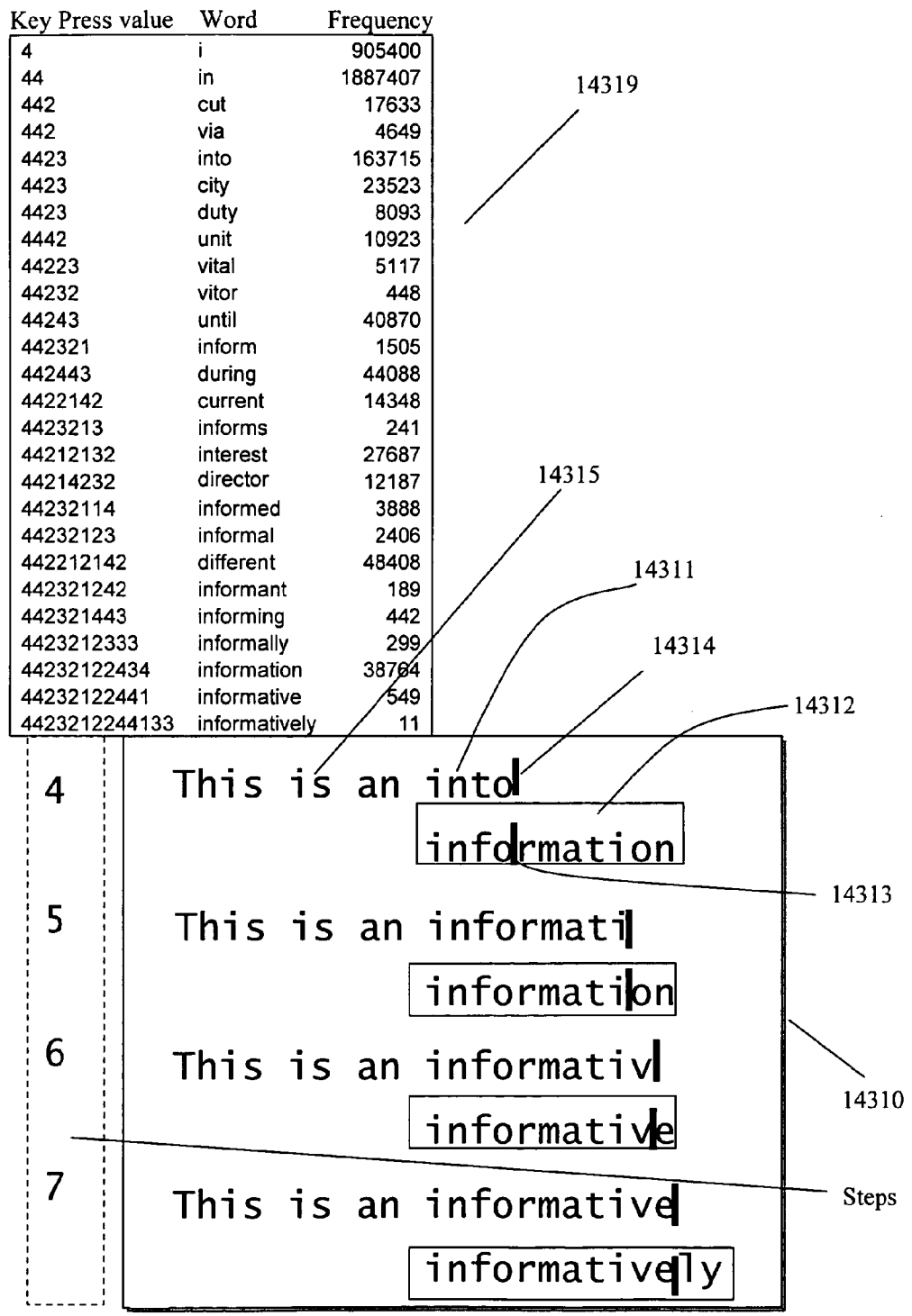
FIG. 19b shows a database of words used with the data entry system and an output presented to the user, in accordance with one embodiment of the invention.

As an example, FIG. 19*b* shows a database of words 14319 of the invention. By considering the keypad 14309 of FIG. 19*a*, in order to enter the word "informative" (e.g. in this example, by providing key presses, without speaking), after pressing the keys corresponding to the first four beginning characters of the word, based on the first procedure (e.g. as shows in step 4), the system may propose a first word (e.g. the word "into") 14311 by inserting it in the line of text 14315 on the screen 14310, and preferably simultaneously, based on the second procedure the system may also propose a second word (e.g. the word "information") 14312 as an alternative by for example printing it under the first word (e.g. "into"). In addition to the cursor 14314 positioned at the end of the first word 14311, a cursor 14313 may automatically be placed within the corresponding position of the second word 14312. To continue, the user may have different choices such as using one of the following methods:

1) pressing the key corresponding to the next character (e.g. "r") of the desired word (e.g. "informative"). Or 2) providing a predefined input signal such as a predefined pressing action on a predefined key to replace the word "into" by the word "information" within the line of text 14315. Or 3) providing a predefined input signal such as a predefined pressing action on a predefined key to replace the first word (e.g. "into") having N characters that is proposed by the first procedure, by N+1 beginning characters (e.g. "infor") of the second word (e.g. "information") proposed by the second procedure. This may permit to enter precise letters of at least the beginning of the desired word without the need of pressing the keys corresponding to the letters. Obviously, each additional the predefined input signal (e.g. the pressing action on the predefined key) may add a character same as the following character/letter of the second word to the N+1 characters. Or 4) providing a predefined input signal such as a predefined pressing action on a predefined key to replace the first word (e.g. "into"), by the longest chain of beginning characters (e.g. "informati") of the second word (e.g. "information") proposed by the second procedure, wherein the chain of characters is the beginning characters of all of the words of the database of words of the invention that correspond to the same sequence of key presses corresponding to the chain of characters.

In this example, by for example using one of the above-mentioned methods 3, or 4, the user may replace the word "into" by the chain of characters "informati" (e.g. see step 5). The user, then (e.g. see step 6), may, for example, press the key 14304 corresponding to the letter "v". Based on the word predictive system of the invention, the system may add the letter "v" to the end of the chain of characters "informati" to provide "informativ" as the first choice, and, obviously may print the word "informative" (e.g. in this example, the combined input signals providing the beginning characters of the word proposed as the first choice correspond to two words "informative" and "informatively", wherein the word "informative" has higher priority) as the second choice by the second procedure. The user, then (see step 7), may press the key 14301 corresponding to the letter "e". Based on the word predictive system of the invention, the system may add the letter "e" to the first chain of characters "informativ" to provide the word "informative" as the first proposed word. At this step, the system may also provide the word "informatively" (e.g. the combined input signals providing the word "informative" as the first choice may correspond to the beginning characters of only one word, "informatively"), by the second procedure. The user may provide an end-of-the-word signal such as providing a space character to terminate the entry of the desired word, "informative".

It must again be noted that for better accuracy and having still less display fluctuations, during the entry of a word the user may also provide corresponding speech information based on the principles of (e.g. press-and-speak) the data entry systems of the invention. As an example, and for comparison purpose, FIG. 19c shows the steps of the entry of the word "informative" by providing input information (e.g. key presses) without speaking (e.g. such as described above) and FIG. 19d shows the steps of the entry of the same word, "informative", by providing input information (e.g. key presses) wherein at the step 3 in addition to the key press corresponding to the letter "f", the user speaks the letter. By considering the input information, the system may provide the word "udf" by the first procedure, and also propose the word "information" by the second procedure at this step (e.g. in this example, the word information is proposed at an earlier step by the second procedure, comparing to the entry of the same word by the example of FIG. 19c).

As mentioned before, when using the predictive data entry systems of the invention, a user may modify a word during the entry of an end-of-a-word signal such as a space character. For this purpose, when for example, pressing the space key, the user may speak at least one of the characters (e.g. such as a letter) of the word. The at least one spoken character may be any of the characters of the word. For example, in order to enter the words "this way" by using the keypad 14300 of FIG. 19a, the user may first press the keys 14302, 14301, 14304, 14303 (e.g. respectively, corresponding to the letters of the word "this"), without speaking. The system may not detect any speech during the entry (e.g. providing the key presses corresponding to the letters) of the word, therefore, the system may provide the word (e.g. "this") having the highest priority among the words of the database, corresponding to the key presses only (e.g. provided in the absence of speech). At the end of the entry of the word, the user may press the "Space" key without speaking to provide a space character after the word. The user, then, may proceed to the entry of the word "way" by, for example, pressing the keys corresponding to the (e.g. chain of) letters "wa" without speaking, and presses the corresponding to the letter "y" and speaks the letter. The key presses and speech information provided by the user may correspond to at least two words "may" and "way", of the database of word of the system. The system may output the word "may" having the highest priory among the words corresponding to the user's input information (e.g. key presses and speech provided by the user for entering the word). Different methods of correction have been described in detail before. According to one method of the invention, at the end of the entry of the word, if the word proposed by the system is not the one desired by the user, while (e.g. preferably) providing a predefined signal such as pressing the "Space" key, the user may speak (e.g. at least) one of the letters of the word as additional input information corresponding to the word. By considering (e.g. preferably, all of) the input information already provided, and the additional information, the system may provide a new search process and provide a new result. In this example, (e.g. preferably) while pressing the "Space" key, the user may say the letter "w". By considering the information already provided (e.g. resulting the word "may") and the speech of the letter "w" (e.g. corresponding to the key 14301), the system may (e.g. by replacing the letter "m" in the word "may") provide the word "way" (e.g. in this example, the letter "w" may not replace the letter "y", because the letter "y" was, already, precisely been entered by pressing its corresponding key and speaking the letter "y"). It is understood that in this example, along with modification, the system may provide a space character after the word. In another example, in order to enter the word "no", if the user presses the keys 14304, 14303, without speaking, the system may provide the word "is" corresponding to the input information and having the highest corresponding priority. The user may then press the "Space" key and say one of the letters (e.g. "n") of the desired word, "no". The system may provide the word "no" that corresponds to the combined (e.g. initial key presses, and the additional speech) information provided by the user. Still in another example, in order to with the word "ok", the user may provide key presses 14303, 14303 without speaking. The system may provide the word "so" having the highest priority. The user may then press the "Space" key and for example say the letter "k". In this example, the letter corresponds to two (e.g. both) key presses. The system may consider words of the dictionary corresponding to the key presses and that at least one of the letters of each of the words (e.g. in the location corresponding to the key press corresponding to the letter "k") contains the letter "k", and provides the word having the highest priority. In this example, the word "ok" may be provided.

It must be noted that the correction procedures of the invention may be performed during (e.g. in the middle of) the entry of a word. For example, if during (e.g. in the middle of) the entry of a word, (e.g. predefinely, with/without providing a correction signal) the user provides a speech information, the speech information may correspond to a predefined key press information provided for the entry of the word before providing the speech information. I must be noted that according to one method, the speech information may be predefined to correspond to a key press that may be provided after providing the speech information.

Still it must again be noted that although in many cases key presses without speaking may be enough for the entry of a desired word, according to the principles of the word predictive data entry systems of the invention, the screen of the device may propose different words during providing the key presses. In order to reduce or even sometimes eliminate the screen fluctuation (e.g. specially, for long words), during the input of the key presses corresponding to a word, the user may provide the speech information corresponding to least some of the (e.g. preferably, the beginning) characters/letters of the word so that to enter the characters precisely. This may significantly reduce the screen fluctuation. For example, by using the keypad 14300 of FIG. 19a, during the entry of the words "for" by key presses only, the system may propose the chains of characters "a", "to", "for". For example, if during the first key pressing action, the user would also have spoken the letter "f", the system would have proposed the chains of characters "f", "fo", "for" (e.g. no screen fluctuation in this example).

As mentioned before, during the entry of a word through the word predictive data entry systems (e.g. of the invention), at an instance of input information, (e.g. key pressing action, and speech information if required), the system may propose a word/chain-of-characters wherein its beginning characters are different from the word/chain-of-characters proposed at the preceding instance of input information corresponding to the word that was provided by the user (e.g. display fluctuates). According to one embodiment of the invention, if the user desires to keep the preceding chain of characters and add additional character(s) to the chain of characters to provide the desired word, he may provide a predefined input signal after inputting information corresponding to the preceding chain of characters. For example, by considering the keypad 14300 of FIG. 19a, in order to enter the word "then", if the user provides single pressing actions on the corresponding keys without speaking, the system may provide the word "been" having higher priority than the word "then". The first three key presses provided by the user may provide the word "the". In order to inform the system to keep the chain of letters (e.g. "the"), before providing the input information corresponding to the next character(s) (e.g. "n") the user may provided a predefined interaction (e.g. such as a double pressing action or a gliding action, etc.) on a predefined key. The user, then, may provide the input information corresponding to the letter (e.g. presses the key 14304). The predictive system of the invention considers the chain of characters "the" (e.g. and not the input information corresponding to the chain of characters) and the input information corresponding to the letter "n" (e.g. in this example, the predictive system looks for a word having the highest priority among the words beginning with the chain of letters "the" and ending with a one of the letters "iucdnvj", and provides the word "then"). The user, then, may provide an-end-of-a-word signal such as a space character to terminate the entry of the word.

As mentioned before in detail, the input information corresponding to a character of a word may also include information regarding the preceding (e.g. and/or the following) characters of the word. For example, a single pressing action on the key 14301 may inform the word predictive system that the system should consider one of the letters "ehmqwz" in its predicting procedure for the entry of the current word. On the other hand, also as an example, another interaction (e.g. such as, a double pressing action, a longer pressing action (e.g. press and holding action on a key for a predefined laps of time), pressings simultaneously another key and the key, etc.) on the key 14301 may inform the word predictive system that, for example, the current input information belongs to the following word (e.g. obviously, it also informs the system that the entry of the previous word is ended). With continuous reference to the previous embodiment and by considering the principles just described, the input signal informing the system to keep the preceding chain of characters ("e.g. "the") may be provided during providing the input information corresponding to the following character (e.g. the letter "n", in this example) of the word (e.g. "then"). For the same propose, according to another method, a predefined speech input (e.g. saying "keep", "end", etc.) may be provided during/along-with the key interaction corresponding to the following character. For example, in addition to a single pressing action on the key corresponding to the letter "n", the user may also say "keep" to inform the system that it may consider the chain of character "the" as the beginning characters of the desired word combined with the additional information just inputted (e.g. single pressing action on the key corresponding to the letter "n").

It must be that including input signal corresponding to previous or following characters within the input information provided for the entry of a word, may be confusing for the user. Therefore, the input signals may, preferably, be provided separately (e.g. as described in detail).

Figure 23:
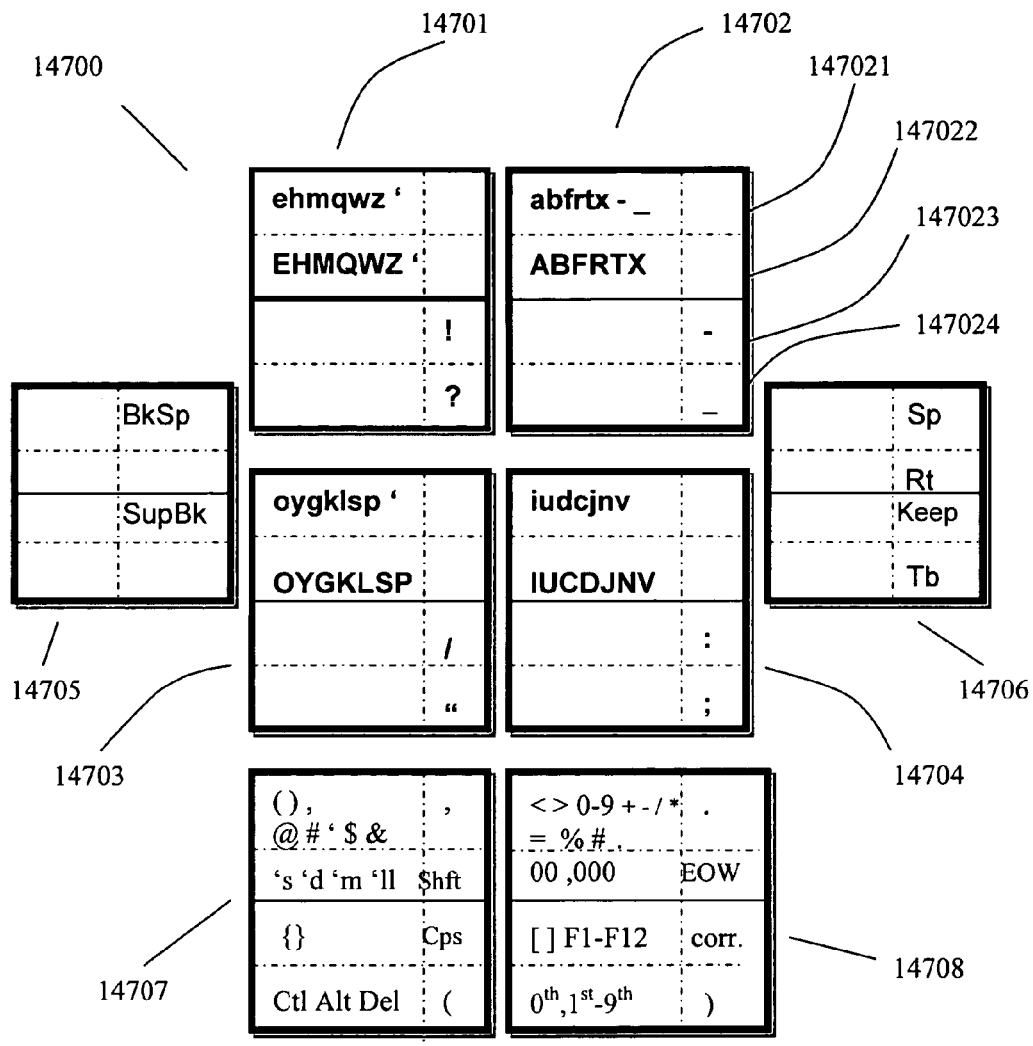
FIG. 23 shows an exemplary keypad of the invention that may be used with the data entry systems, in accordance with one embodiment of the invention.

FIG. 23 shows as an example, a keypad of the invention 14700 wherein symbols such as substantially, all of the symbols (e.g. letters, punctuations marks, commands, functions) of a PC keyboard are assigned to its keys. The keypad is created based on at least some of principles of the predictive data entry systems of the invention. For example, English letters are assigned to four of its keys 14701, 14702, 14703, 14704, such that:

letters having ambiguously resembling speech, separately from each other, are assigned to different keys. and/or;

letters, separately from each other, are assigned to different keys such that when entering a word by using the word predictive methods of the invention based on key presses (e.g. and speech if required/provided) preferably, most frequently used words correspond to different sequence of key presses such that (e.g. during the entry of a text) in most cases the intended word may be entered by pressing/interacting-with the keys corresponding to the letters/characters of the word, without requiring additional input information (e.g. speech, handwriting, etc., for entering precise characters). Also, preferably, the assignment may be such that the number of words corresponding to a same sequence of key presses being minimized.

letters, separately from each other, are assigned to different keys such that when entering a text, user may interact with the four keys as evenly as possible. and/or;

If the system also uses handwriting (e.g. in-addition-to or by-replacing the speech information) for the entry of at least some of the letters of a word, to augment the accuracy of handwriting, the system may permit entering precise letter/character by handwriting on a corresponding sensitive key to which the a letter is assigned, in this case) letters having ambiguous writing graphs may be assigned to different keys.

It must be noted that exemplary keypad 14700 and letter assignments to the keys of the keypad based on at least one of the principles as described are shown as an example, other letter assignments to the keys of a keypad based on at least one of the principles may be considered. For example, the keypad 13200 of FIG. 8 (e.g. partially shown. The keypad may have more keys as described in many embodiments. Here only the keys to which letters of the Roman/English alphabet are assigned, are shown) is also constituted based on the principles described above.

Based on the principles of the predictive data entry systems of the invention, by referring to one of the keys 14702 as an example, characters "abfrtx-_" 147021 (e.g. letters are in lowercase) may be considered by the system as part of the elements that may constitute a word through the word predictive systems of the invention. The input information corresponding to any of the characters may be providing a first predefined type of interaction with (e.g. a single pressing action on) the key. Providing the first predefined type of interaction (e.g. with the key) without providing a corresponding speech may correspond to one of the characters (e.g. letters), ambiguously, and providing the predefined interaction (e.g. with the key) combined with providing a (e.g. predefined speech corresponding to one of the characters may provide the character (e.g. letter), precisely.

In this example, providing a second predefined type of interaction with (e.g. a double pressing action on, pressing-and-holding action for (at least) a predefined laps of time on, etc.) the key 14702 may correspond to any of the ambiguous letters, but in uppercase 147022, and providing the predefined interaction combined with providing a speech corresponding to one of the letters may provide the letter, precisely in uppercase.

With continuous reference to the keypad 14700, based on the principles of the predictive data entry systems of the invention, as an example, by referring to the key 14702, providing a third predefined type of interaction with (e.g. a single gliding action on, pressing a modifier key 14707 and preferably simultaneously providing a single pressing action on, etc.) the key 14702 may correspond to a character (e.g. in this example, the character "-" 147023) that may not be considered by the system as part of the elements that may constitute a word (e.g. as mentioned previously, an out-of-a-word character) through the word predictive systems of the invention. Providing the third type of interaction (e.g. predefined as with/without speech) may provide the corresponding character, by the character by character data entry system of the invention, without going through the (e.g. searching and selecting methods of the) word predictive procedures of the invention.

In this example, providing a fourth predefined type of interaction with (e.g. a double gliding action on, pressing a modifier key 14707 and preferably simultaneously providing a double pressing action on, pressing a modifier key 14707 and preferably simultaneously providing a pressing-and-holding action for at least a predefined laps of time on, etc.) the key 14702 may correspond to a (e.g. another) character (e.g. in this example, the character "_" 147024) that may not be considered by the system as part of the elements that may constitute a word through the word predictive systems of the invention.

The principles corresponding to the key 14702 as described may be applied to the keys of any keypad used with the combined data entry systems of the invention, wherein the keypad has a reduced number of keys and wherein each at least some of the keys represent several letters of a language. in this example, the principles corresponding to the key 14702 as described may also be applied to the keys, 14701, 14703, 14704 (e.g. for the entry of the corresponding characters).

Regarding the key 14706, in this example, providing the first predefined type of interaction with (e.g. a single pressing action on) the key 14706 may correspond to providing a space character. Providing the second predefined type of interaction with (e.g. a double pressing action on, etc.) the key may correspond to (e.g. PC keyboard) "Enter" command.

Providing the third predefined type of interaction with (e.g. a single gliding action on, pressing a modifier key 14707 and preferably simultaneously providing a single pressing action on) the key 17606 may correspond to keeping the proposed beginning chain of character of the preceding instance of input information the entry of a word through the predictive methods of the invention (e.g. as described previously in detail). Providing the fourth predefined type of interaction with (e.g. a double gliding action on, pressing a modifier key 14707 and preferably simultaneously providing a double pressing action on, pressing a modifier key 14707 and preferably simultaneously providing a pressing-and-holding action for at least a predefined laps of time on, etc.,) the key 14706 may correspond to "Tab" function.

The principles corresponding to the key 14706 as described may also be applied to the key 14705. For example, providing the first predefined type of interaction with the key 14705 without speaking may correspond to providing the "BkSp" command. Also for example, providing the third predefined type of interaction with the key 14705 without speaking may correspond to "SupBk" (e.g. Super/Special Back Space command, deleting more than one character, as described in the references incorporated herein, filed by this inventor).

Each of the keys 14707 and 14708 may at least function as at least a modifier (e.g. "Shift") key.

Regarding to the key 14707, in this example, providing the first predefined type of interaction with the key without speaking may correspond to providing the "," character. To enter any of the characters "( ) @ # ' $ &", the user may provide the predefined first type of interaction with the key 14707 and speak the character.

Providing the second predefined type of interaction with the key 14707 without speaking may correspond to "Shift" function. To enter any of the combined chain of characters "'s", "'d", "'m", "'ll" (e.g. chain of characters including apostrophe character, as described in detail before), the user may provide the second predefined type of interaction with the key 14707 and provide a speech information corresponding to the combined chain of characters (e.g. according to another method of symbol assignment, each of the chain of characters may be assigned to the key representing the first letter of the chain of characters).

With continuous reference to the keypad 14700, based on the principles of the predictive data entry systems of the invention, as an example, by referring to the key 14707, providing the third predefined type of interaction with the key 14707 without speaking may correspond to "CapsLock" function. In this example, providing the fourth predefined type of interaction with the key 14707 without speaking may correspond to a character/symbol (e.g. in this example, the character "(").

The principles corresponding to the key 14706 as described (e.g. key interactions, and the corresponding speech when provided) described for the key 14707 may apply to the key 14708. For example, providing the first predefined type of interaction with the key 14708 without speaking may correspond to providing the "." character. To enter any of the (e.g. arithmetic) characters "< >0-9+-/*=% #", the user may provide the first predefined type of interaction with the key 14707 and speak the character.

Providing the second predefined type of interaction with key 14708 without speaking may correspond to "EOW" function (e.g. "end-of-a-word signal, usually used to provide compound words, as described before). To enter any of the chain of digits (e.g. "00" "000" "000,000", having corresponding respective speeches, "hundred", "thousand, "million") the user may provide the second predefined type of interaction with the key 14708 and provide a speech information corresponding to the chain of digits.

With continuous reference to the keypad 14700, based on the principles of the predictive data entry systems of the invention, as an example, by referring to the key 14708, providing the third predefined type of interaction (e.g. here, the modifier key being used with the key 14708, may be the key 14707) with the key 14708 without speaking may correspond to "Correction" key (e.g. "correction key indicator indicating the beginning of a correction/selection procedure for correcting proposed words by the predictive data entry systems of the invention, as described before). In order to provide one of the F1 to F12 functions, the user may provide the third predefined type of interaction and provide a predefined speech information corresponding to the function (e.g. for example saying the number of the function.

In this example, providing the fourth predefined type of interaction (e.g. here, the modifier key being used with the key 14708, may be the key 14707) with the key 14708 without speaking may correspond to a character/symbol (e.g. in this example, the character ")". In order to enter combined digit- and-letter chain of characters (e.g. $0^{th}$, $1^{st}$, $2^{nd}$, $3^{rd}$, $4^{th}$ . . . , $9^{th}$), the user may provide the fourth predefined type of interaction and provide a speech information corresponding to the combined chain of characters (e.g. saying "zero", "first", "second", "third", "fourth", . . . , "ninth", respectively).

It must be noted that the assignment of the symbols to the keys and the different types of interactions are used as demonstration only. Any of the symbols may be assigned to an (e.g. a key) interaction different from the one it is assigned in this example. Also other (e.g. key) interactions may be considered for the keypad.

As may have been noticed, several predefined type of interactions with each key of a keypad in the absence of a speech or in the presence of corresponding speech may be used for the entry of (e.g. different) corresponding symbols (e.g. letters, chain of characters, punctuation mark characters, function, etc.). By considering these principles and also considering other parameters such as using different number of keys, etc., many type of keypads may be provided to be used with the (e.g. predictive) data entry systems of the invention. For example, at least one of the PC keyboard functions (e.g. Ctrl, Alt, Del), may be assigned to the key 14707 wherein any of the functions may be inputted by providing the corresponding interaction (e.g. in this example, providing the fourth predefined type of interaction with the key 14707 and providing the corresponding predefined speech information assigned to the keyboard function).

Figures 20, 20A:
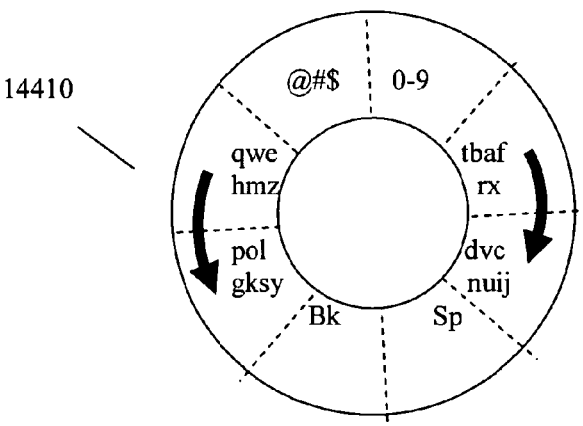
FIGS. 20 through 20a show an exemplary media player having a circular sensitive keypad used with the data entry system, in accordance with one embodiment of the invention.

As mentioned before, the data entry systems of the invention may be used with a circular touch sensitive surface such as the one used with the iPOD (e.g. audio, video, etc.) player to search and/or select a content (e.g. a song, a movie, etc). In addition to a gliding actions on the circular surface (e.g. for selecting a content from a list), the circular surface may also respond to tapping actions (e.g. on predefined positions on its surface) to duplicate a keypad used with the data entry systems of the invention for entering data such as text. FIG. 20 shows as an example, a circular touch sensitive surface as described. The circular surface may have several predefined zones wherein each zone may correspond to a key of a predefined (e.g. an imaginary) keypad of the system. In this example, the zones 14401 to 14406, may duplicate at least some of the principles of a keypad of the invention as described in the references incorporated herein, filed by this inventor. For example, to four keys 14401, 14402, 14403, 14404, substantially, all of the letters of a language may be distributively assigned.

According to one embodiment of the invention, the keypad may be used with the combined data/text entry systems of the invention such that the tapping actions on the zones may be used for entering text, and (e.g. circular) gliding actions on the circular surface may be used for selecting purpose. For example, in order to enter the word "bull", according to one embodiment of the invention, the user may press the corresponding keys 14402, 14404, 14403, 14403, without providing speech (e.g. the predictive system of the invention may be based on key presses only, or the user may not desire to speak, etc.). The system may show to the user the list of words 14412 corresponding to the input information (e.g. the frequency of use figures are shown indicatively). The user may then, provide a (e.g. circular) gliding action 14410/14411 on the circular surface so that to navigate within the list to select the desired word. For example, after choosing the desired word, the user may provide a tapping action of the center zone 14407 of the circular keypad so that to select/enter the word. According to another example, in addition to the key presses, while pressing for example the first key 14402, the user may speak the corresponding letter, "b". In this case, the system may show the list 14413 (e.g. the frequency of use figures are shown indicatively). The user may then, provide a (e.g. circular) gliding action 14410/14411 on the circular surface so that to navigate within the list to select the desired word.

The procedure of data entry as described may be applied for content search and selection. For example, by using the tapping actions (e.g. and eventually, providing the corresponding speech) the user may enter a textual content information corresponding to the partial or full characters of a content (e.g. the content's title), and after providing (e.g. by the system) the list of the contents corresponding to user's input information (e.g. by for example, printing them on the screen), the user may use gliding actions on the surface to select his/her desired content.

It must be noted that the circular keypad showed in this example is provided to an example only. It is understood that other types of keypads may be considered by people skilled in the art. For examples, as shown in FIG. 20a circular keypad 14410 having eight predefined zones duplicating eight keys used with the data entry systems of the invention may be considered.

Figure 21:
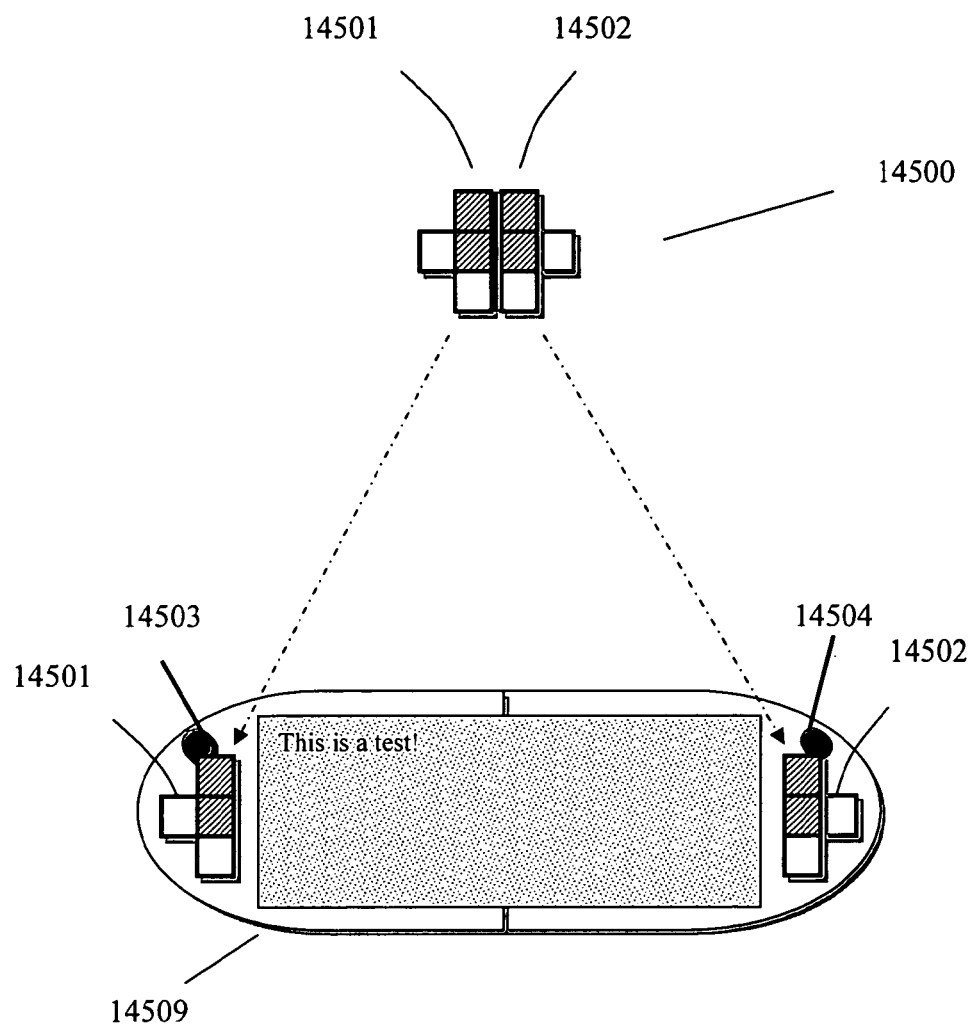
FIG. 21 shows an exemplary extendable electronic device using the data entry system, in accordance with one embodiment of the invention.

As shown as example in FIG. 21, according to one embodiment of the invention, an external keypad 14500 used with the data entry systems of the invention may be manufactured such that to be split to form at least in two portions 14501, 14502, wherein each of the portions may be independently/separately attached (e.g. and each of the portions preferably independently, and preferably wirelessly, connected) to the corresponding electronic device 14509 to be used with the data entry systems of the invention. The split portions may be designed such that to be attachable to each other to form the integrated keypad 14500 and be used as an external keypad with the electronic device (e.g. and being used with the data entry systems of the invention). In this example, (e.g. as an example) to four of the keys (e.g. darker keys in the drawing) substantially all of the letters of a language may be assigned. The integrated keypad may comprise at least one microphone to be used with the data entry system of the invention. For example, each portion of the split keypad may comprise an integrated microphone such that when the keypad is in split position on the sides of the electronic device, the microphones 14503, 14504 are also distributed on the sides of the electronic device to permit better capture of the user's voice.

Figure 22A:
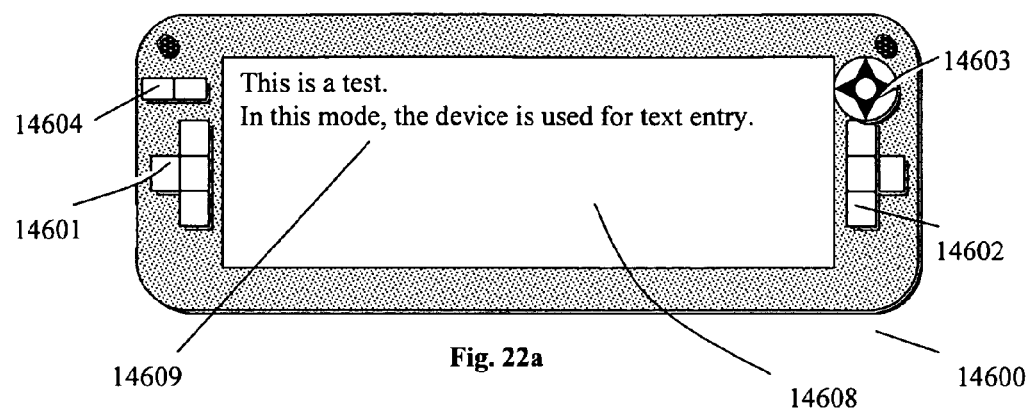
FIGS. 22a through 22b show exemplary telecommunication devices using the data entry system, in accordance with one embodiment of the invention.
Figure 22B:
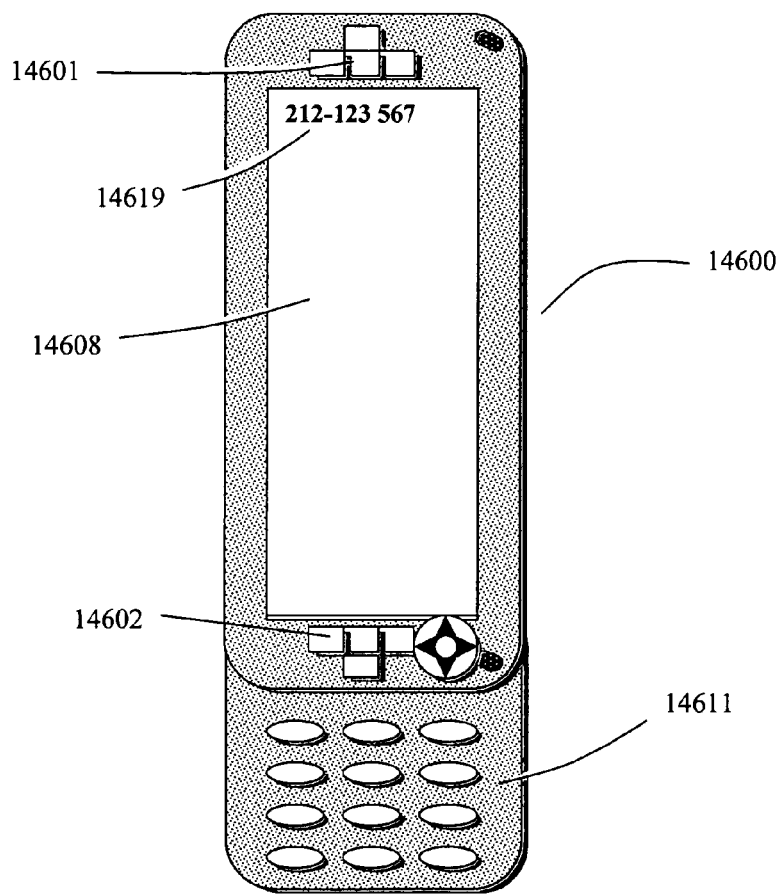

The telephone keypad has become a familiar dialing means for telephones. Therefore the keypad may be included in most voice communication devices. According of one embodiment of invention, a voice and/or data communication device that may use the data entry (e.g. including the predictive) systems of the invention, may include, both, the telephone keypad (e.g. for dialing) and a (e.g. split) keypad of the invention (e.g. for data/text entry). As known, the telephone keypad occupies a substantial portion of the surface of the corresponding side of the telephone, reducing the surface assigned to the display unit on the side. In order to overcome the problem, the keypad may be manufactured such that to be extended out of the body of the device (e.g. preferably in the direction of the axis of the longest dimension of the device, as shown in FIG. 22*b*). FIG. 22*a* shows as an example, a voice and/or data communication device 14600 including the (e.g. combined) data entry systems of invention using a keypad split into two portions 14601, 14602. The device may also include a telephone-type keypad (e.g. not shown, here it is in retracted position). When the telephone keypad is in retracted position or the when user enters data such as text by using the split keypad through the data entry systems of the invention, the display unit 14608 may (e.g. preferably, automatically be in landscape position to permit better viewing of a text 14609 printed on the screen. The device may also include a pointing 14613 and selecting 14614 means to duplicate the computer mouse functions on the screen (e.g. with the data entry systems of the invention). FIG. 22*b* shows the same device 14600 (e.g. the device of FIG. 22*a*) wherein its telephone keypad portion 14611 is extended out of the body of the device. When the keypad is in extended position, the display unit 14608 of the device may (e.g. preferably, automatically) change the orientation (e.g. to be in portrait position) so that to be suited to the telephone keypad in order to show the input such as a telephone number 14619 provided through the telephone keypad 14611.

It must again been noted that instead of or addition to a voice recognition system, a lip reading system may be used with the data entry systems of the invention to recognize the user's speech. For example, the lip reading system may work accurately with the predictive data entry systems of the invention because the systems require less speech and mostly speech of isolated letters. This may permit a still more discrete data entry procedure.

Figure 23A:
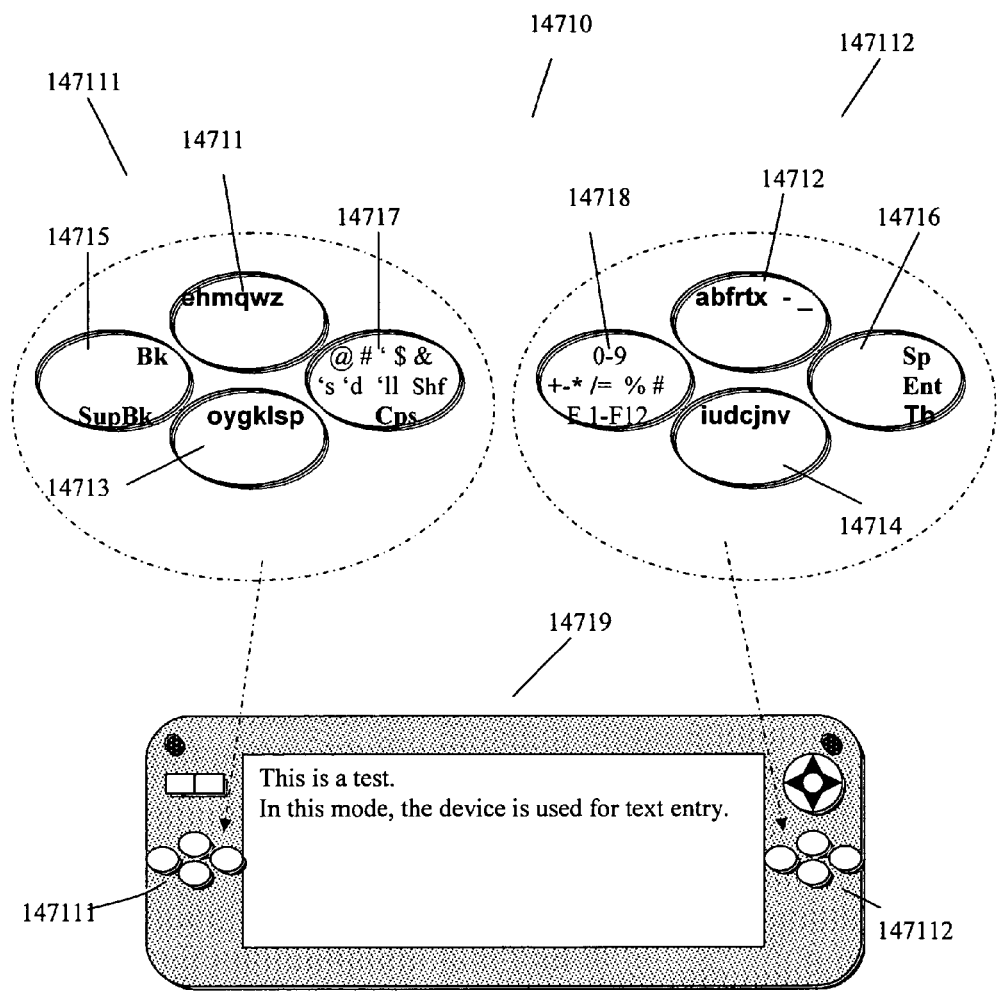
FIG. 23a shows an exemplary keypad from figure having oval keys and different key configuration, where the keys of the keypad are split into two groups on an electronic device for use with the data entry system, in accordance with one embodiment of the invention.

As mentioned and shown in the references incorporated herein, filed by this inventor, keypads used with data entry systems (e.g. including predictive data entry systems) of the invention may have different key configuration (e.g. for different type of use) and, obviously, the keys of the keypad may have different shapes. Also as mentioned, for example, the keys may be split into two groups and being positioned on opposite sides on a surface of the corresponding electronic device. For example, the keys 14701 to 14708, (e.g. and their functionality) of the keypad 14700 of FIG. 23, may be duplicated/manufactured such that, as shown in FIG. 23*a*, the keys (in this example, 14711 to 14718, respectively-to/duplicating the keys 14701 to 14708, of FIG. 23) may be oval (e.g or round) shaped. The keys may be split in two group of keys 147111, 147112, and being attached-to/integrated on opposite sides on a surface of the corresponding electronic device 14719. The configuration of the keys of each group relating to each other may duplicate the configuration of the keys of a directional keypad (e.g. of an electronic gaming consol). In this example, in each group, two of the keys (e.g. preferably, those to which the letters are assigned) are positioned in a column position, wherein a third key of the group is positioned on the right side of the two keys, between them, and the fourth key of the group is positioned on the right side of the two keys, between them Preferably, a mobile data entry system may preferably allow the data entry when user is in motion. Holding a mobile device requires using some of the user's finger. Therefore ideally user's thumbs may be used for data entry. The configuration of the keys as described here may permit letter keys being under user's thumbs, so that during writing a word, user's finger do not have to travel over the keys. By using the user's thumbs, this configuration permits to enter the letters of a text, quickly.

Figure 24A:
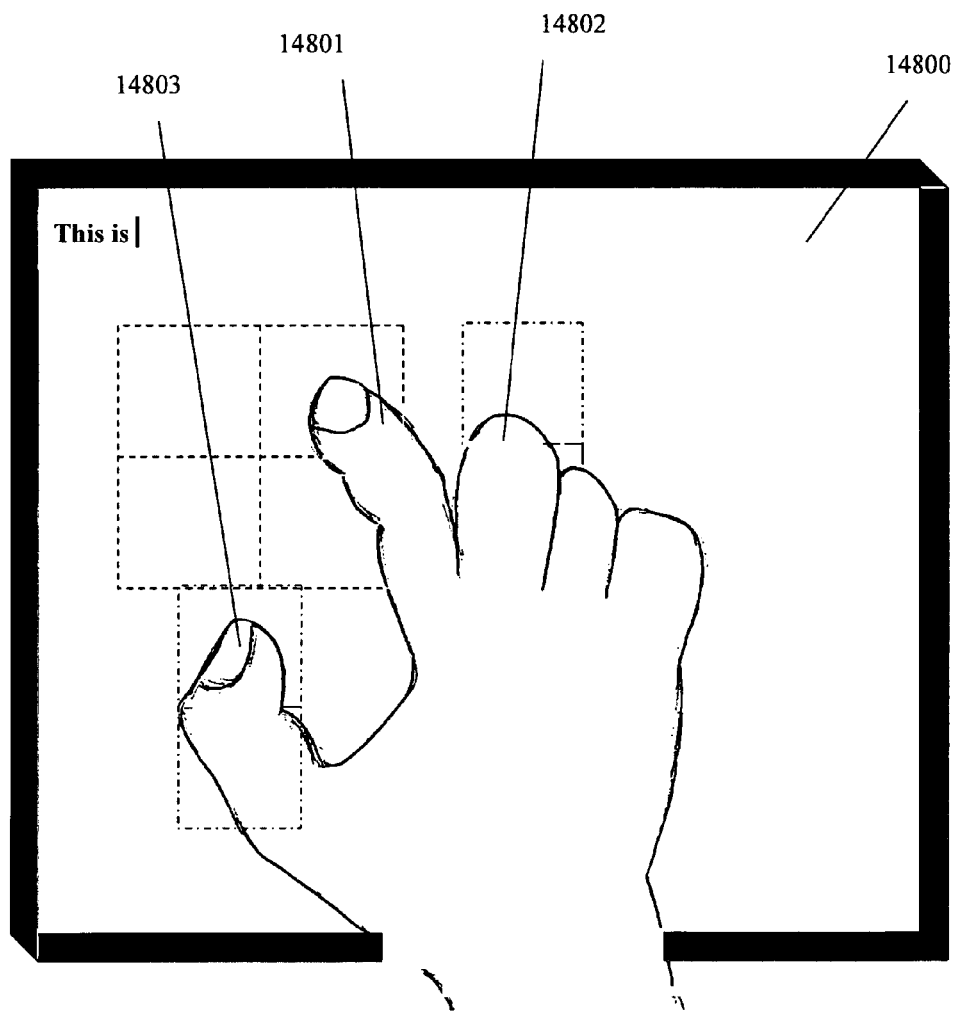
FIG. 24a shows a user's fingers interacting with electronic devices duplicating the keys and key interactions of a keypad used with the data entry system, in accordance with one embodiment of the invention.

Using input means such as the on-screen keypads/keyboards for data entry through the data entry systems of the invention has been described in detail in the references incorporated herein, filed by this inventor. Also, using other input means such as user's fingers, finger caps, glove, stylus, etc., to duplicate the keys and the interactions with the keys of a keypad (e.g. having few keys such as eight keys, such as the keypad 14700 of FIG. 23) used with the data entry systems of the invention has been described in detail in different the references incorporated herein, filed by this inventor (e.g. Obviously, the input means may also be used with the predictive data entry systems of the invention). For example, as shown in FIG. 24*a* and described before, a dynamic keypad having at least four (e.g. to eight) keys (e.g. wherein to four of the keys at least the letters of a language are distributively assigned based on the principles as described in this and the references incorporated herein, filed by this inventor) may be provided by user's finger interactions on a surface. The principles for defining the keys of a dynamic keypad and interaction with them has been described in detail in the references incorporated herein, (e.g. and briefly in this patent application) filed by this inventor. As mentioned before, the dynamic keypad may be used with the data entry systems (e.g. including predictive data entry systems) of the invention. For example, by finger interactions on a sensitive surface such as on the (e.g. touch) screen 14800 of a Tablet PC, with at least one of his fingers such as the pointer 14801 (e.g. or the stylus), as described in detail before, the user may duplicate at least the keys 14701 to 14704 of the keypad 14700 of FIG. 23 and the interaction with the keys (e.g. single pressing action, double pressing action, gliding action, etc.). Even pressing-and-holding a key (e.g. shift key) and (e.g. simultaneously) pressing another key may be provided. For example, the user may provide a press-and-holding action by his thumb 14803 (e.g. situated on the left side relative to his pointer finger 14801) on the screen and simultaneously provide, for example, a corresponding interaction with (e.g. single pressing action, double pressing action, etc.) with his pointer finger 14801 on a desired key of the dynamic keypad. To each of the combined interactions a corresponding group of symbols of the invention may be assigned. Also, for example, the user may provide a press-and-holding action by his forefinger 14802 (e.g. situated on the right side relative to his pointer finger 14801) on the screen and simultaneously provide, for example, a corresponding interaction with (e.g. single pressing action, double pressing action, etc.) with his pointer finger 14801 on a desired key of the dynamic keypad. To each of the combined interactions a corresponding group of symbols of the invention may be assigned). It must be noted, that the system may respond differently for each of press and holding interactions (e.g. situated at the left side, or right side of the pressing actions on the dynamic keypad). It must be noted that user's fingers duplicating a predefined keypad shown and described here are used as an example. Obviously, based on principles of the invention, the user may use different fingers to provide the keypad or other keypads.

Figure 24B:
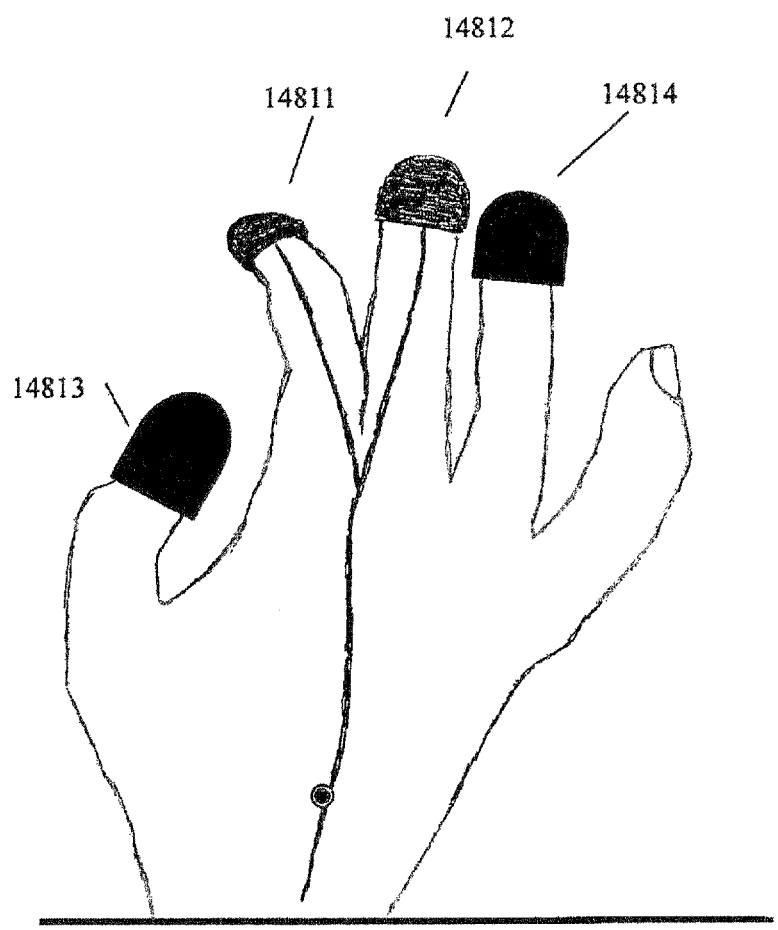
FIG. 24b shows user's fingers wearing finger caps, providing interactions duplicating the keys and key interactions of a keypad used with the data entry system, in accordance with one embodiment of the invention.

A means and method of input consisting of providing interactions such as pressing (e.g. tapping) actions (e.g. and/or gliding actions) by a portion (e.g. with the tip portion, flat portion, etc.) of a finger wearing a finger cap having (e.g. integrated) touch sensitive systems/surface wherein each finger may duplicate one or more (e.g. preferably, two) keys of a keypad of the invention and using them with the data entry systems of the invention, has been described in detail (e.g. as described in detail in the patent applications, for example, a single or double tapping action with the tip portion of a finger/finger-cap may duplicate/correspond-to respectively to a single or double pressing action on a first predefined key of an predefined keypad model. Also for example, a single or double tapping action with the flat portion of a (e.g. the) finger/finger-cap may duplicate/correspond-to respectively a single or double pressing action on a second predefined key of the predefined keypad model The means and methods of interaction may eliminate the use of a touch sensitive panel such as the touch screen of an electronic device for user's input interaction). Obviously, the means and method of input may be used with the data entry (e.g. including the predictive) systems of the invention. Also as described in previous patent applications and by considering the example of FIG. 24b, by using four fingers 14811 to 14814 each wearing a finger cap of the invention, a keypad of the invention such as the keypad 14700 of FIG. 23 and the interaction with the keys of the keypad (single pressing action, double pressing action, gliding action, etc.) may be duplicated and be used with the predictive data entry systems of the invention.

For example, providing an interaction such as a predefined pressing action (e.g. such as single, or double, or longer, etc., pressing action) with the flat portion of finger cap 14811 may correspond to interacting (e.g. providing the interaction) with key 14701 of the keypad 14700. Also for example, providing an interaction such as a predefined pressing action with the tip portion of finger cap 14811 may correspond to interacting (e.g. providing the interaction) with key 14703 of the keypad 14700. Also for example, providing an interaction such as a predefined pressing action with the flat portion of finger cap 14812 may correspond to interacting (e.g. providing the interaction) with key 14702 of the keypad 14700. Also for example, providing an interaction such as a predefined pressing action with the tip portion of finger cap 14812 may correspond to interacting (e.g. providing the interaction) with key 14704 of the keypad 14700.

Also for example, providing an interaction such as a predefined pressing action with the flat portion of finger cap 14813 may correspond to interacting (e.g. providing the interaction) with key 14705 of the keypad 14700. Also for example, providing an interaction such as a predefined pressing action with the tip portion of finger cap 14813 may correspond to interacting (e.g. providing the interaction) with key 14707 of the keypad 14700. Also, for example, providing an interaction such as a predefined pressing action with the flat portion of finger cap 14814 may correspond to interacting (e.g. providing the interaction) with key 14706 of the keypad 14700. Finally, for example, providing an interaction such as a predefined pressing action with the tip portion of finger cap 14814 may correspond to interacting (e.g. providing the interaction) with key 14708 of the keypad 14700.

Even pressing-and-holding a key (e.g. shift/modifier key) and (e.g. simultaneously) pressing another key may be duplicated. For example, the user may provide a press-and-hold action with the flat portion of his finger (e.g. obviously, finger cap) 14813 on a surface, and provide a desired pressing action with for example, the tip portion of the finger cap 14811, without speaking, to provide the character "/" (e.g. to duplicate the interaction required for the entry of the character when using the keypad 14700 of FIG. 23).

A method of interaction based on interacting with different portions of a user's finger (e.g. tip, flat) on a touch sensitive to surface to provide a different input signal for each of the different portions touching the sensitive surface (e.g. wherein the system recognizes the portion based on the size of the contacted area of the surface) to duplicate the keys of a keypad of the invention having few key and used with the data entry systems of the invention have been described in detail in the references incorporated herein, filed by this inventor. The method of interaction may be used with the predictive data entry systems of the invention. Using the system of interaction may eliminate the need of the finger caps of in above-mentioned embodiment. For example, each of the fingers of a user (e.g. by using the tip and flat portion for interacting with a touch sensitive surface) may duplicate two keys of the corresponding keypad model of the system. When user type a text (e.g. by using the principles of the embodiment), based on the location of the contact impact of a user's finger on the sensitive surface (e.g. for example, by considering that during a sequence of data entry, typing/tapping action with any portion of a different user's finger on a surface is usually provided within a same different vertical zone on the surface) relating to the location of the contact impact of the other user's fingers (e.g. on different vertical zones) on the surface, the system may recognize the finger, and by considering the portion of the finger (e.g. tip or flat) by which the interaction has been provided the system may relate the interaction to the corresponding key of the predefined keypad of the invention.

As mentioned before, a handwriting recognition system may be used for the entry of one or more precise (e.g. unambiguous) characters of a word wherein at least one of other characters of the word being ambiguously entered (e.g. by for example, pressing/gliding on a key to which several characters are assigned) to enhance the recognition of the predictive data entry system. In the examples above (e.g. such as those shown and described in FIGS. 20 to 24b, when using hard or soft keys, or when using finger, finger cap, glove, etc, to duplicate key interactions, in addition to tapping/gliding actions corresponding to key interactions, the user may write characters such as letters on a/the corresponding sensitive surface such as a touch screen. According to one method, the system may be designed such that to distinguish between handwriting actions, and tapping/gliding actions (e.g. interacting-with/duplicating-interactions-with the keypad). According to another method, tapping actions may correspond to key interactions, and gliding actions may correspond to handwriting. According to another method, tapping/gliding action on the (e.g. soft) keys of the keypad of the system may correspond to key interactions, and writing (e.g. tapping, gliding) on the sensitive-surface/touch screen (e.g. on a zone out of the zone of) the keypad may correspond to handwriting input (e.g. in the example of media player of FIGS. 20 to 20a, the zone 14407 may be used for handwriting.).

It is understood that examples provided are for demonstration only. Other fingers, other fingers having finger caps, different number of fingers or finger caps, stylus, glove, etc., may be used with the combined (e.g. including predictive) data entry systems of the invention.

It must be noted that, although, in different embodiments different keypads such as a telephone-type keypad or a keypad having at least four keys wherein to four of the keys at least substantially all of the letters of a language are assigned, have been used to demonstrate the principles of different embodiments of the invention, obviously, any other kind of keypad having any number of keys wherein at least some of the keys of the keypad are ambiguous, any type of keys such as hard or soft keys, any configurations of symbols assigned to any predefined type of interaction with the keys of the keypad, etc., may be used with the embodiments of the combined data entry systems of the invention.

Although in many paragraphs describing the combined data entry systems of the invention, "keys" have been used to describe the embodiments, it is understood that other input means used by predefined types of interactions to provide different predefined input signals, may be considered to replace to duplicate/replace the keys and key interactions in the embodiments of the invention. For example, use's interactions such as finger or finger cap interactions and corresponding interactions duplicating the keys and key interactions as described in this and the references incorporated herein, filed by this inventor, may be used in the embodiments.

Note that in some paragraphs the term "pressing" have been as an example of a type of interaction with a key, the interaction may be any other type of interaction such as touching/gliding/pointing-to, etc, with a key.

It must be noted that although in many paragraphs a keypad (e.g. or few keys) have been used to demonstrate an embodiment of the combined data entry systems of the invention, it is understood that the keypad having some ambiguous keys (e.g. an ambiguous key have been described before).

For not frequently repeating the principles of the data entry systems of the invention, in many paragraphs of this application there is mentioned that one or more symbol such as character/word/portion-of-a-word/function, etc., may be assigned to a key (e.g. or an input object other than a key). It is understood that unless otherwise mentioned, the symbols, generally, are intended to be assigned to a predefined simplest interaction with the key which may be a single-pressing action on the key (as explained in many embodiments of the invention).

Although in different embodiments of the invention, a voice recognition system (e.g. having a microphone, may have been mentioned to be used to perceive and recognize a user's speech, a lip-reading system (e.g. having a camera), may be used instead-of or in-addition-to the voice recognition system to perceive and recognize the user's speech (or vise versa).

Also as mentioned before, some or all of the methods of the data entry systems of the invention may use linguistically rules text entry recognition systems such as the number of a syllable of possibly-matched word, the number of words of a possibly-recognized sentence, the position of a word within a phrase, etc. These matters are known by the people skilled in the art.

It must be noted that in some paragraphs the term "portion-by-portion" have been used for simplifying the term "at-least-a-portion-of-a-word (e.g. by at-least-a-portion-of-a-word".

Note that, although for simplifying reason, in many paragraphs, the data entry systems of the invention is mentioned in a phrase such as "data entry systems of the invention", "pressing/gliding data entry systems of the invention", "press/glide-and-speak data entry systems of the invention", etc., it is understood that as described in detail in many paragraphs, such phrases refer to the principles of the data entry systems of the invention considering the pressing/gliding actions combined with user's speech information, wherein the speech information is the presence of corresponding speech or in the absence of user's speech (e.g. wherein the systems are generally used with the combined data entry systems of the invention when during the entry of a word at least one precise character of the word is entered through the referred systems and wherein at least one of the key presses provided for the entry of the word is ambiguous). These matters have already been described in detail. Also, in many paragraphs, the data entry systems of the invention combining the press/glide-and speak data entry systems of the invention and the word predictive data entry systems such as the ones of the invention, may have been mentioned in a phrase such as "combined" data entry systems of the invention".

Note that although in many embodiments of the data entry systems of the invention a sensitive surface such as a touch-sensitive pad or a touch screen have been used as examples, it is understood that any other technology detecting and analyzing a user's interaction with any surface may be used to define and/or use the zone/keys of a soft (e.g. dynamic) keypad. For example, as mentioned, the technology may be an optically detecting technology, or an IR technology providing a virtual keypad (e.g. having few keys/zones wherein for example, to 4 keys/zones of the keypad at least substantially all of the letters of a language are assigned) on a (normal) surface and detects the user's finger touching the keys/zones of the keypad.

Also, it must be noted that according to one method, while user enters a word by using the predictive system of the combined data entry systems of the invention, the system may print the most probable word corresponding to the input information provided by the user until that moment (e.g. before providing an end-of-a-word-signal). It is understood that the displayed word may change each time a user presses an additional key corresponding to the word.

For example, obviously, all or part of the principles of the embodiments of this invention and other inventions of this inventor and/or their features may be used separately or being combined together. For example, at-least-one-word/at-least-part-of-a-word of a text may be entered by combining different methods or embodiments of the data entry systems of the invention. For example, tapping/gliding actions on a sensitive surface as described in the references incorporated herein, filed by this inventor (e.g. such as tapping and/or gliding actions provided by user's finger, a pen, a glove, etc., duplicating, for example, interactions with few keys such as with at least four keys of a keypad wherein at least the letters of a language are assigned to few predefined keys such as four keys of the keys as described in detail in this application and the references incorporated herein, filed by this inventor, the glove of the data entry systems of the inventions also duplicating the keys as described in the references incorporated herein, filed by this inventor, etc.), may be used with the predictive data entry systems of the invention.

It must be noted that although in many examples, the input information provided for the entry of a word is mentioned as being based on key presses, it is understood that, if desired/permitted, in addition to a key press (e.g. for better accuracy), the user may also provide the speech corresponding to at least some of the key presses.

It must be noted that although in many paragraphs describing the methods of data entry system of the invention, the input information provided by the user is mentioned as may being correspond to a character of a word, obviously, depending on the architecture of the system, in some cases the input information may correspond to a chain of characters of the corresponding word (e.g. see the portion-of-a-word data entry systems of the invention). Obviously, as mentioned previously in detail, the character date entry systems of the invention combined with portion-of-a-word data entry systems of the invention may be used with the (e.g. word) predictive data entry systems of the invention. For example, to enter the word "action", the user may first press the keys corresponding to the letters "a" and "c", and then provide a gliding action on the key that are predefined to represent the portion-of-a-word "tion", and speak the portion (e.g. saying "shen"). Based on the input information provided by the user, the predictive data entry system of the invention may, for example, look for a word wherein its two beginning characters correspond to the two key presses and that the remaining characters of the word is the chain of characters "tion". The system may consider the word "action", and depending on its frequency of use, the system may propose the word to the user. In the example above, the user could also precisely enter any of the characters "a" or "c" by speaking the letter (e.g. while pressing the corresponding key) to help the system/user to for example, faster/more accurately provide the desired word. Using the combined character and portion-of-a-word data entry systems of the invention with the productive data entry systems of the invention has been previously described in detail. As described before, such system may also include/work-with at least one other data entry system such as an on-screen full keyboard or handwriting input/recognition system to enter precise characters that may correspond to at least a potion of a word. The precise character(s) and additional input information corresponding to the word provided through other data entry methods of the invention such as described in this paragraph, may be considered by the predictive data entry systems of the invention to provide the desired word.

Also for example, the combined data entry systems of the invention may be used/implemented-with (e.g. for example, by using a split keypad of the invention) an extendable computer such as shown (e.g. see FIGS. 70a to 70h and the corresponding description in the incorporated PCT/US04/12082.

It must again be noted that depending on the architecture of the system, the portion-of-a-words of a language may either be included within the dictionary of words database of the language or they may constitute a separate database and be used with the combine (e.g. including the predictive) data entry systems of the invention.

It must be noted that speech information corresponding to a letter is generally speaking the letter.

It must also be noted that key press(es) corresponding to at least one character of a word generally means providing the sequence of key presses corresponding to (sequentially) to the characters.

It must be noted that as described in detail above, providing a predefined interaction with a key may also refer to providing a press-and-holding action on a another key and providing a pressing action on the key.

It must again be noted that although in many paragraphs describing the methods/features of invention key press information have been mentioned for the entry of a word, obviously said methods/features, may consider other input information such as the corresponding speech may be provided by the user, in addition to said key press information.

Thus, while there have been shown and described and pointed out fundamental novel features of the invention as applied to alternative embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto. It is to be understood that the drawings are not necessarily drawn to scale, but that they are merely conceptual in nature.

The invention claimed is:

1. A method for word predictive data entry, comprising:
    receiving via first input means first input signals, each first input signal ambiguously corresponding to any single character of a plurality of characters;
    predicting a first word from a database of words using a word predictive system, the predicted first word corresponding to the received first input signals;
    if the predicted word is not a desired word, receiving via second input means, correction information to precisely identify at least the beginning character of the desired word, each second input signal unambiguously corresponding to a single identified character; and
    predicting a second word from the database of words using a word predictive system, the second word corresponding to the first input signals and to the precisely identified at least beginning character.

2. The method of claim 1, further comprising receiving further correction information to identify subsequent characters of the desired word and predicting another word, if there is another word, following each receipt of further correction information.

3. The method of claim 1, wherein the first input means include four input means to which all the letters of a language are assigned.

4. The method of claim 1, wherein the second input means comprising a keying action.

* * * * *